United States Patent
Monzawa et al.

[11] Patent Number: 5,991,267
[45] Date of Patent: Nov. 23, 1999

[54] FIXED-LENGTH CELL MULTIPLEX TRANSMISSION APPARATUS, FIXED-LENGTH CELL MULTIPLEX TRANSMISSION METHOD, FIXED-LENGTH CELL TRANSMTTING APPARATUS, FIXED-LENGTH CELL MULTIPLEXING APPARATUS, AND FIXED-LENGTH CELL DISTRIBUTING APPARATUS

[75] Inventors: Takashi Monzawa; Shuhei Taniguchi; Jun Asato; Kenji Miura; Yoshimi Toyoda, all of Osaka, Japan

[73] Assignee: Fujitsu Limited, Kanagawa, Japan

[21] Appl. No.: 08/760,681

[22] Filed: Dec. 4, 1996

[30] Foreign Application Priority Data

Apr. 11, 1996 [JP] Japan ................................. 8-089135

[51] Int. Cl.$^6$ ........................... H04L 12/56; H04L 12/54; H04J 3/18; G06F 11/00
[52] U.S. Cl. ........................... 370/230; 370/395; 370/429; 370/477; 370/412
[58] Field of Search ................................... 370/230, 231, 370/236, 395, 397, 412, 413, 414, 415, 416, 417, 418, 428, 429, 468, 477

[56] References Cited

U.S. PATENT DOCUMENTS

| | | | |
|---|---|---|---|
| 5,313,454 | 5/1994 | Bustini et al. | 370/230 |
| 5,491,691 | 2/1996 | Shtayer et al. | 370/395 |
| 5,515,377 | 5/1996 | Horne et al. | 370/395 |
| 5,631,908 | 5/1997 | Saxe | 370/468 |
| 5,675,574 | 10/1997 | Norizuki et al. | 370/230 |
| 5,706,279 | 1/1998 | Teraslinna | 370/232 |
| 5,790,522 | 8/1998 | Fichou et al. | 370/413 |
| 5,812,525 | 9/1998 | Teraslinna | 370/230 |
| 5,867,480 | 2/1999 | Thomas et al. | 370/230 |
| 5,892,766 | 4/1999 | Wicki et al. | 370/413 |

*Primary Examiner*—Alpus H. Hsu
*Assistant Examiner*—Afsar M. Qureshi
*Attorney, Agent, or Firm*—Helfgott & Karas, P.C.

[57] ABSTRACT

A fixed-length cell multiplexing/distributing processing is disclosed. The apparatus for this processing includes a plurality of fixed-length cell transmitting apparatuses, each of which sends a fixed-length cell, and a fixed-length cell multiplexing apparatus which multiplexes the fixed-length cells received from the fixed-length cell transmitting apparatuses and outputs the thus multiplexed cells. One of the plurality of fixed-length cell transmitting apparatuses is configured as a highest-priority fixed-length cell transmitting apparatus. Further, the highest-priority fixed-length cell transmitting apparatus comprises a fixed-length cell storage section and a fixed-length cell read control section. The fixed-length cell multiplexing apparatus comprises a plurality of FIFO storage sections, an FIFO control section, and a multiplexing section. With this structure, information to be notified is divided into fixed-length cells for transmission. The fixed-length cell from the highest-priority fixed-length cell transmitting apparatus is directly output without storing it, thereby accurately performing first-come, first-served processing for fixed-length cells.

28 Claims, 46 Drawing Sheets

FIG. 13(a)

WRITING PROCESSING

| Bit | 00 | 01 | 02 | 03 | 04 | 05 | 06 | 07 | 08 | ------ n | |
|---|---|---|---|---|---|---|---|---|---|---|---|
| Address α | L | L | L | L | L | L | L | L | (H) | | L 08 ARRIVED |
| Address β | L | L | L | L | L | (H) | L | L | L | | L 05 ARRIVED |
| Address γ | L | (H) | L | L | L | L | L | L | L | | L 01 ARRIVED |
| Address δ | L | (H) | (H) | L | L | L | L | L | L | | L 01/02 SIMULTANEOULY ARRIVED |

FIG. 13(b)

READING PROCESSING

| Bit | 00 | 01 | 02 | 03 | 04 | 05 | 06 | 07 | 08 | ------ n | |
|---|---|---|---|---|---|---|---|---|---|---|---|
| Address α | L | L | L | L | L | L | L | L | (H) | | L 08 READ OUT |
| Address β | L | L | L | L | L | (H) | L | L | L | | L 05 READ OUT |
| Address γ | L | (H) | L | L | L | L | L | L | L | | L 01 READ OUT |
| Address δ | L | (H) | L | L | L | L | L | L | L | | L 01 READ OUT |
| Address δ | L | L | (H) | L | L | L | L | L | L | | L 02 READ OUT |

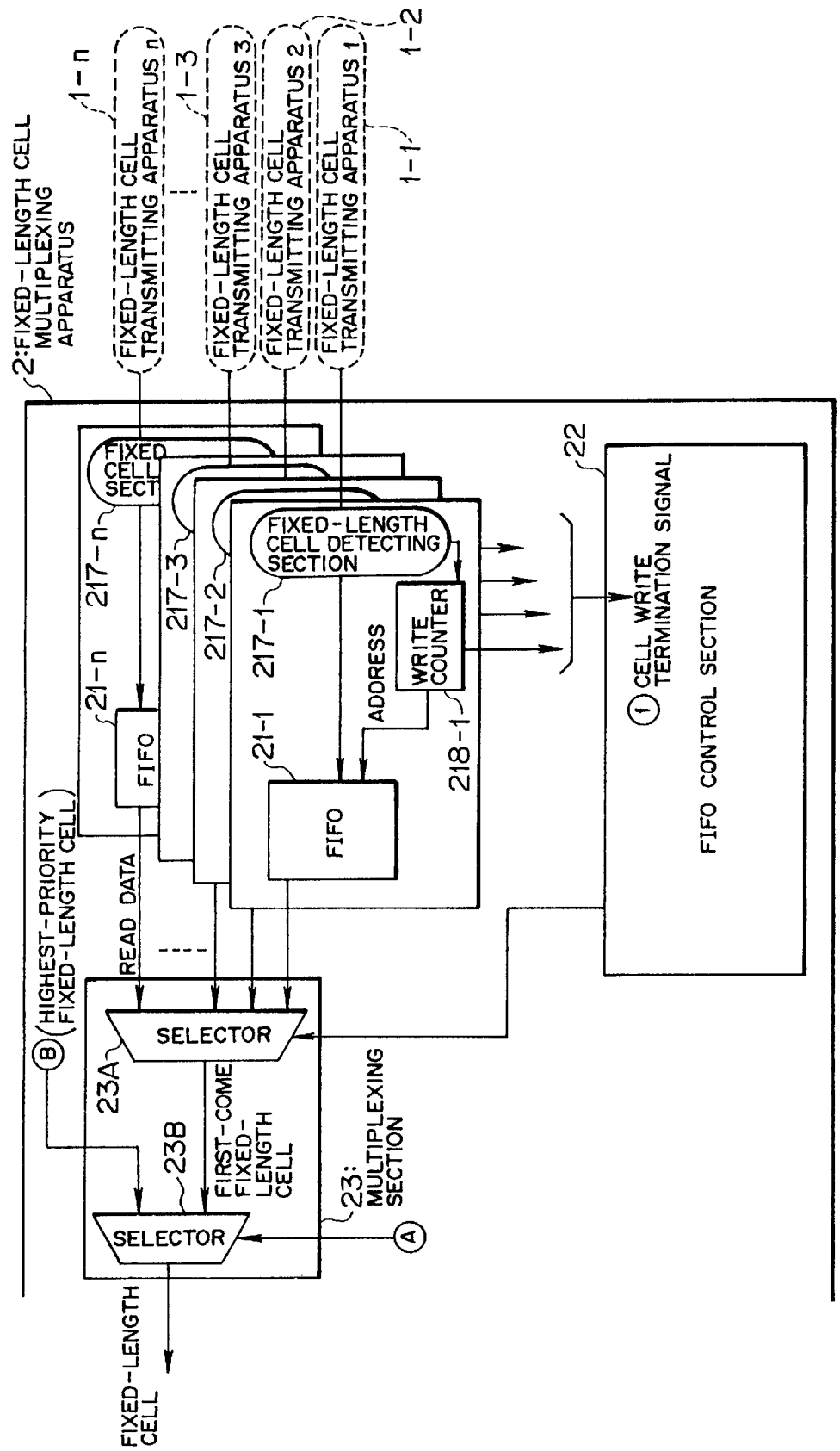

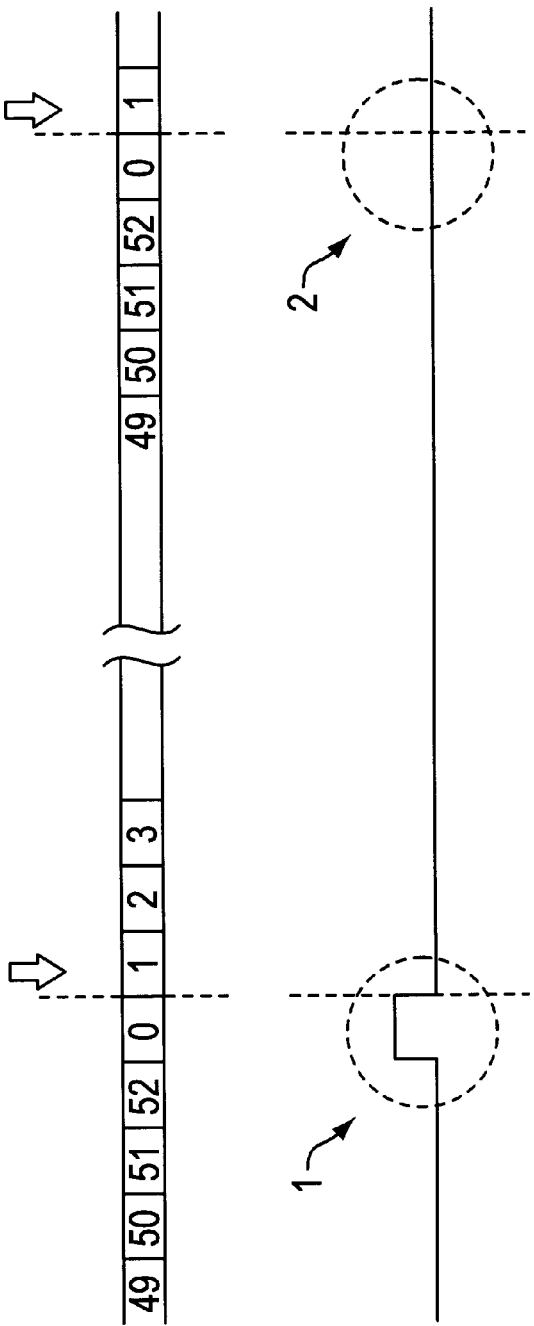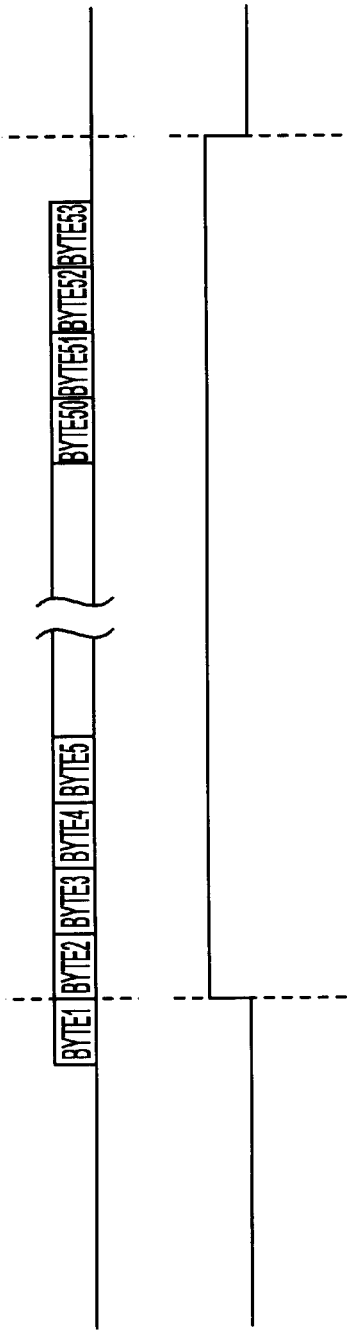
FIG. 17A
53-COUNTING READ COUNTER
FIG. 17B
FP INDICATING THE BEGINNING OF HIGHEST PRIORITY CELL
FIG. 17C
DATA OF HIGHEST PRIORITY CELL Ⓑ
FIG. 17D
SELECT SIGNAL FOR OUTPUTTING HIGHEST PRIORITY CELL Ⓐ

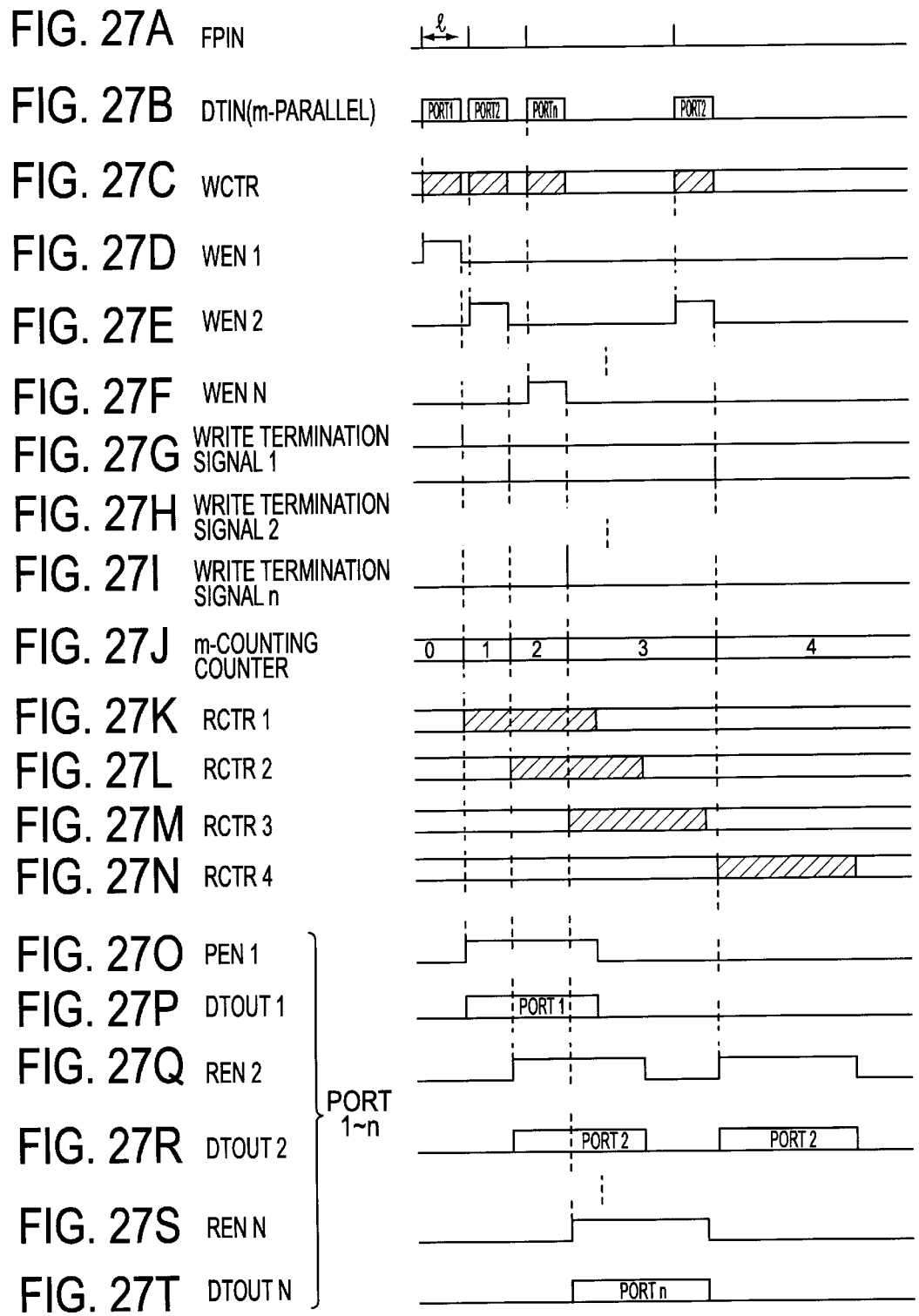

F I G. 29
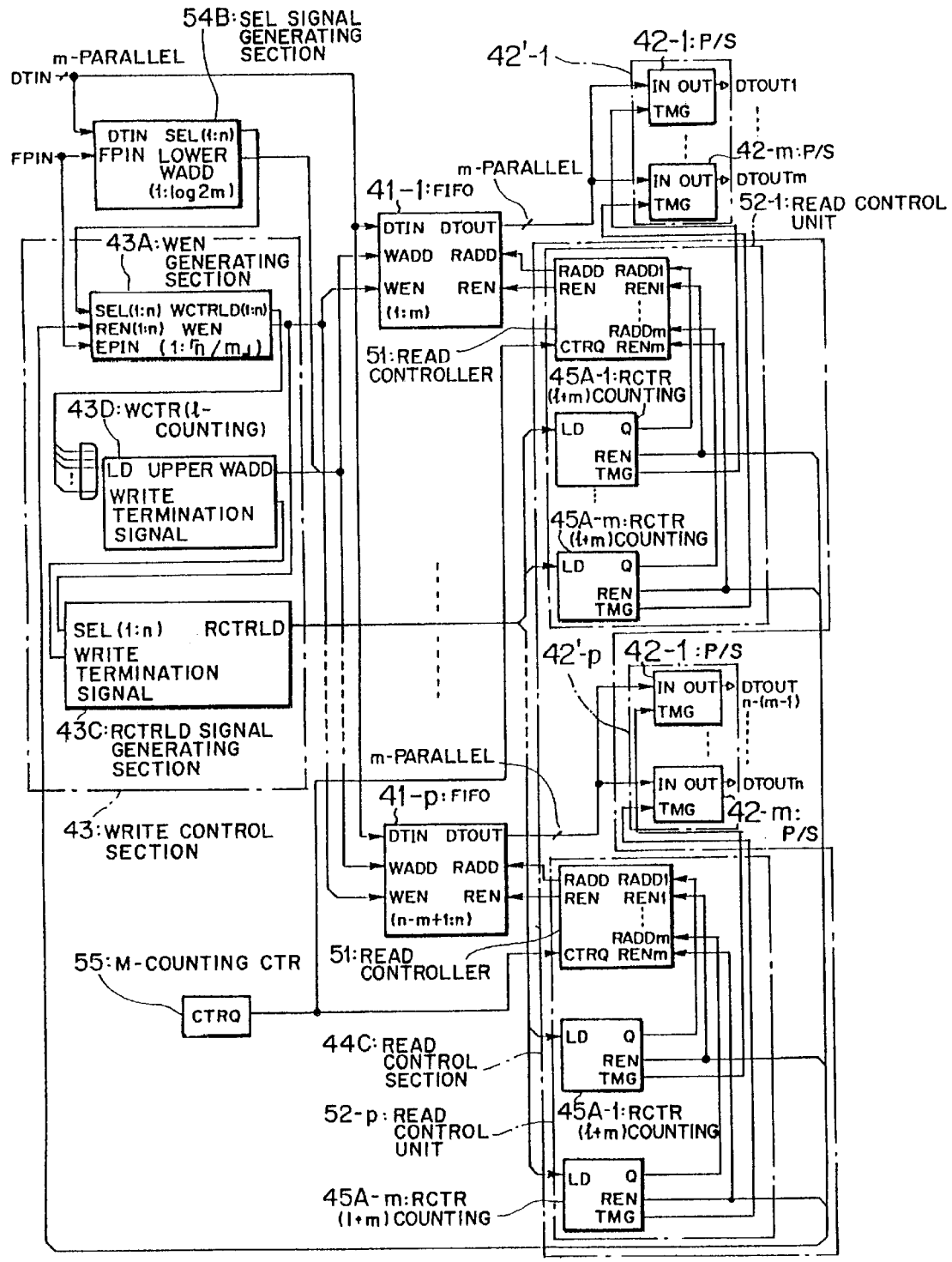

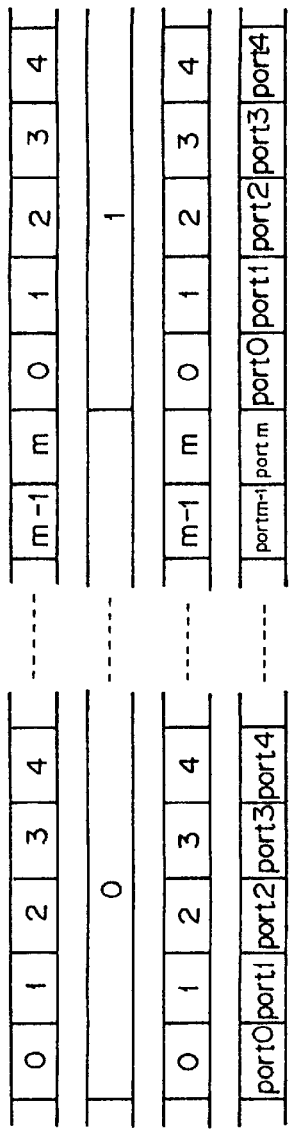

DTIN — 53 BITS, 8-PARALLEL

DTOUT — 424 BITS

FIG. 33(a)
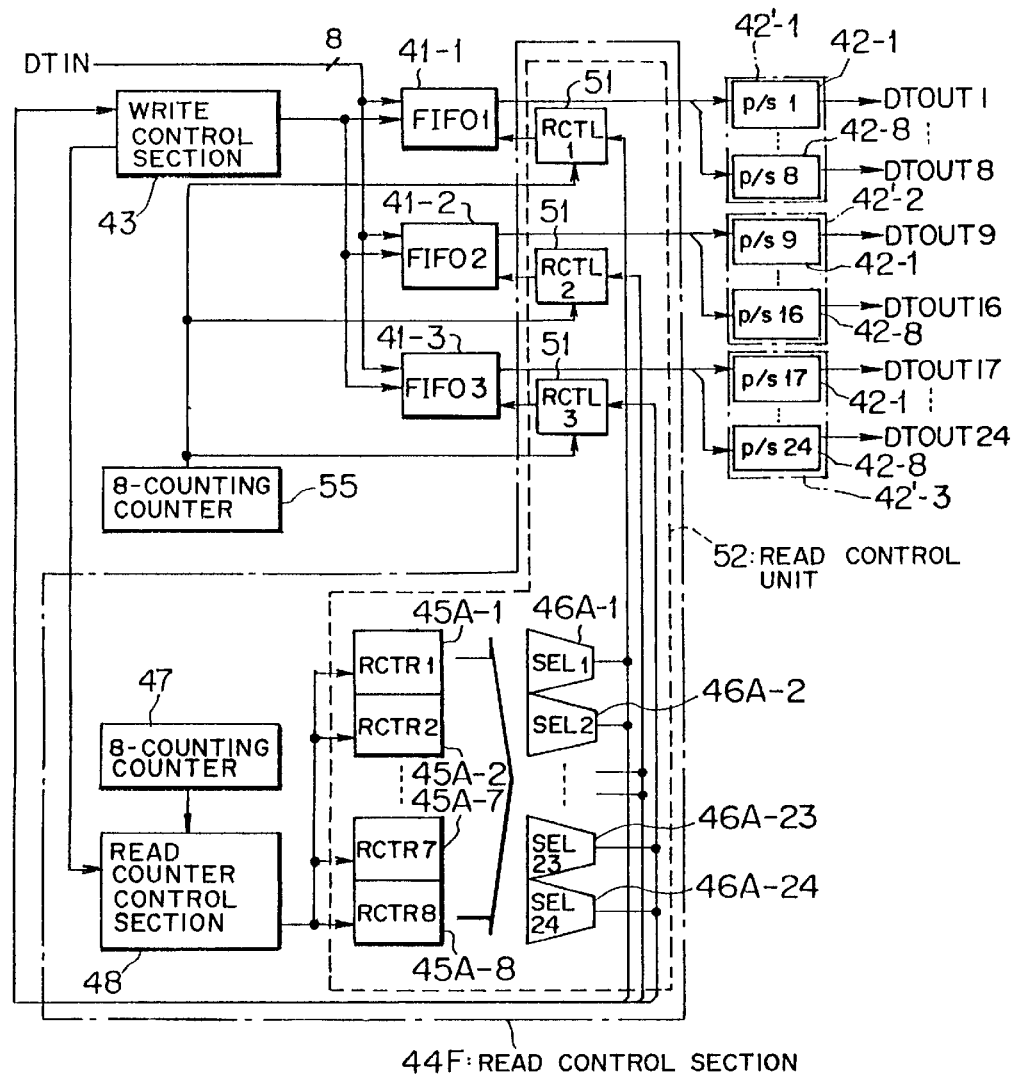
FIG. 33(b)
FIG. 33(c)
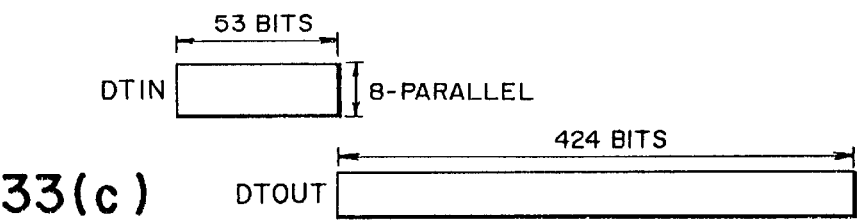

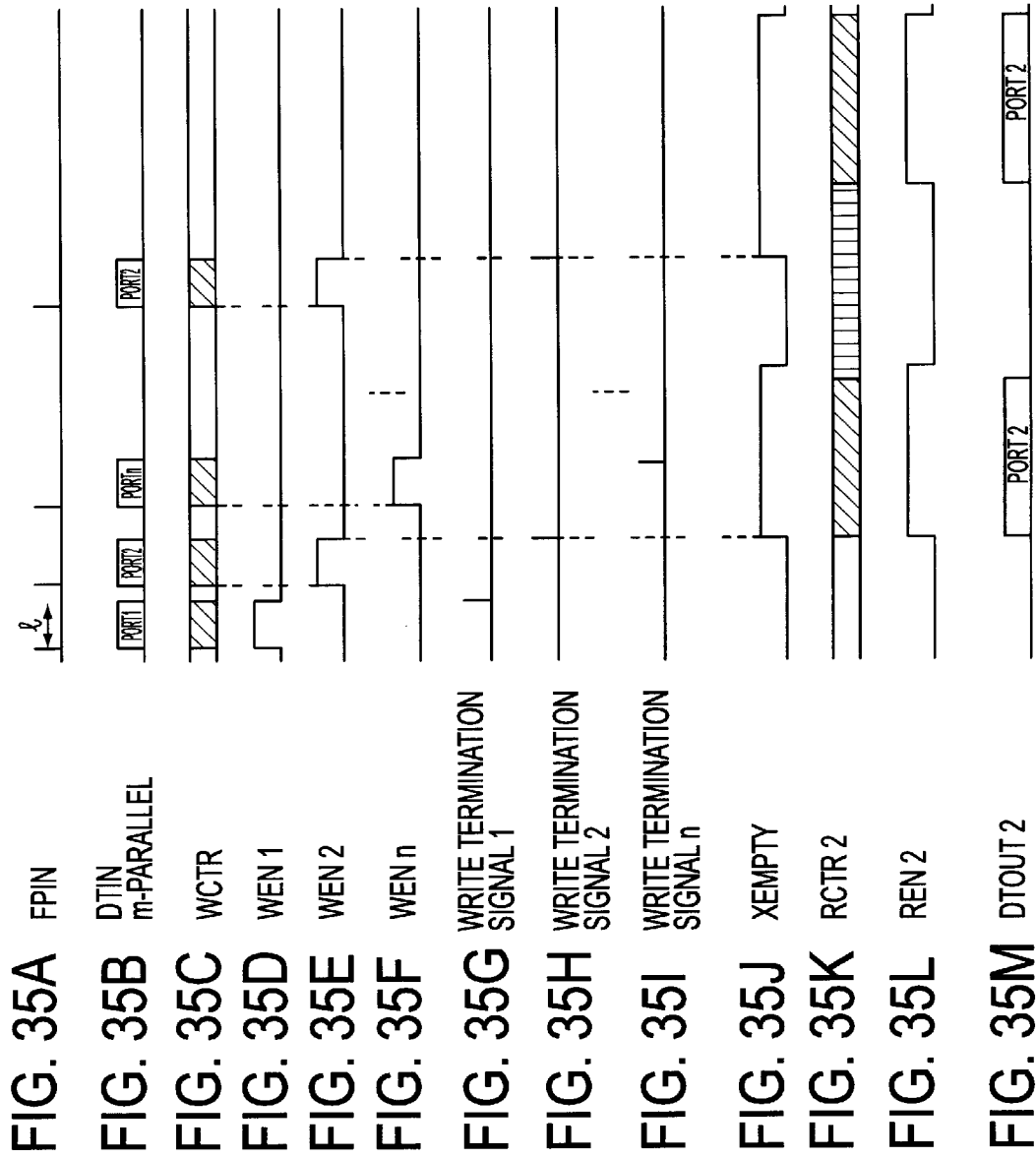

FIG. 38(a)
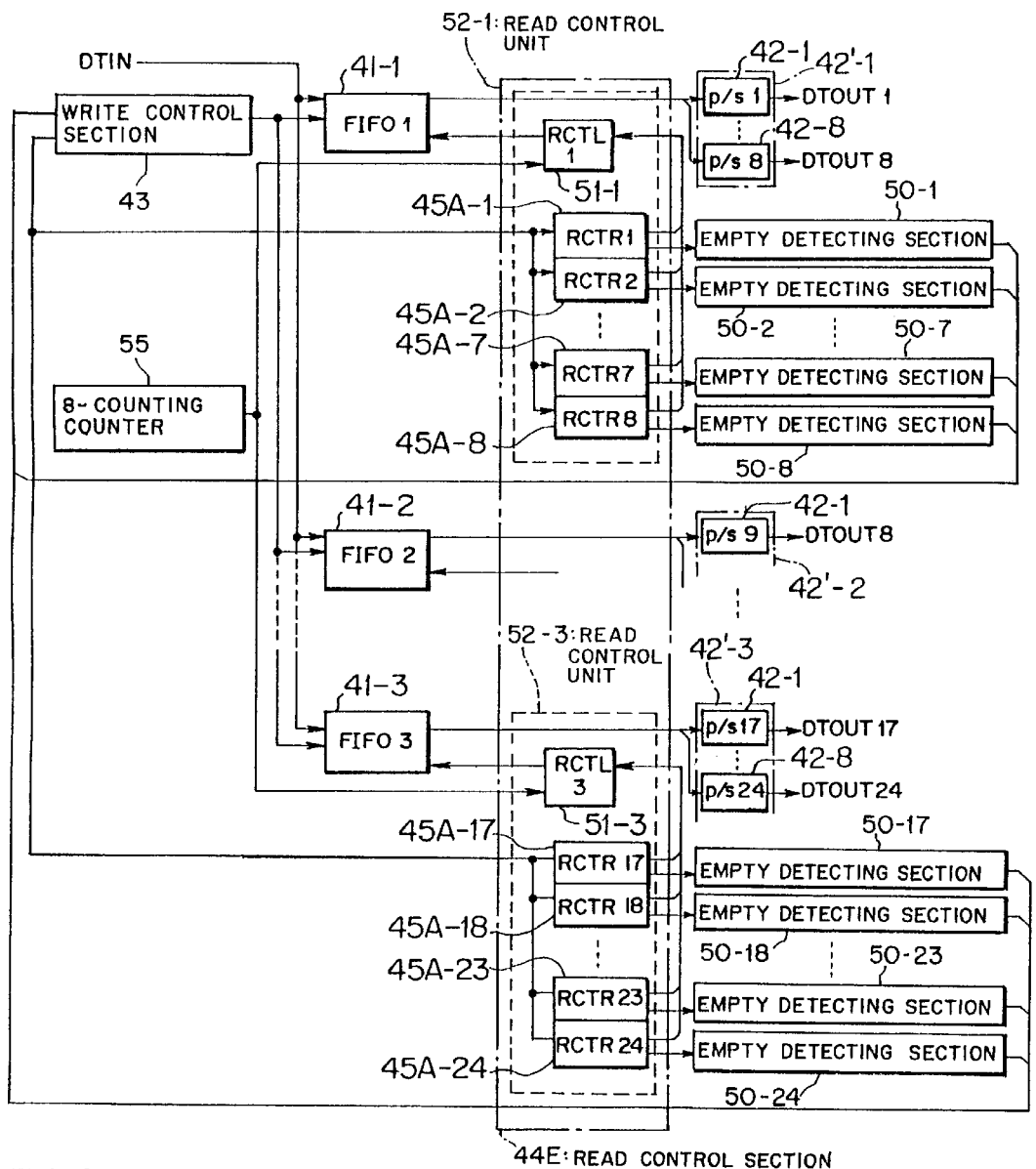
FIG. 38(b)
FIG. 38(c)
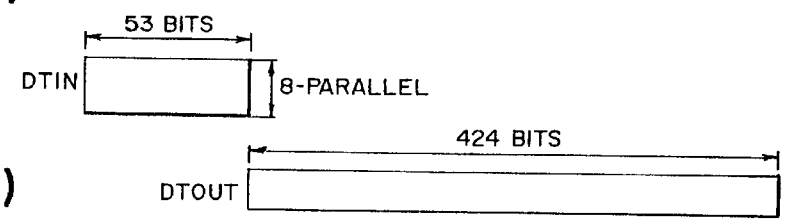

FIG. 45A (RELATED ART) FPIN
FIG. 45B (RELATED ART) DTIN (m-PARALLEL)
FIG. 45C (RELATED ART) WCTR
FIG. 45D (RELATED ART) WEN 1
FIG. 45E (RELATED ART) WEN 2
FIG. 45F (RELATED ART) WEN n
FIG. 45G (RELATED ART) WRITE TERMINATION SIGNAL 1
FIG. 45H (RELATED ART) WRITE TERMINATION SIGNAL 2
FIG. 45I (RELATED ART) WRITE TERMINATION SIGNAL n
FIG. 45J (RELATED ART) RCTR 1
FIG. 45K (RELATED ART) REN 1
FIG. 45L (RELATED ART) DTOUT 1
FIG. 45M (RELATED ART) RCTR 2
FIG. 45N (RELATED ART) REN 2
FIG. 45O (RELATED ART) DTOUT 2
FIG. 45P (RELATED ART) RCTR n
FIG. 45Q (RELATED ART) REN n
FIG. 45R (RELATED ART) DTOUT n

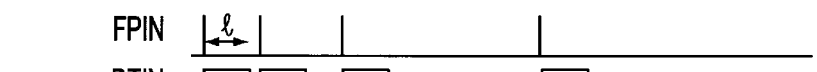
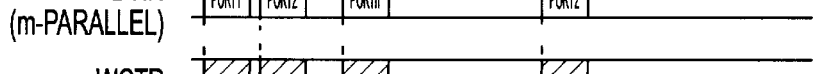
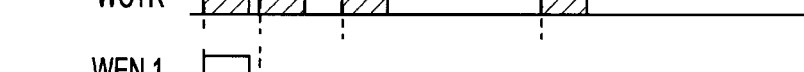
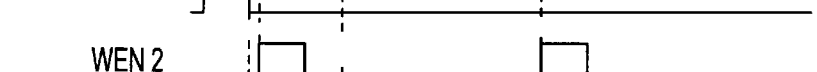
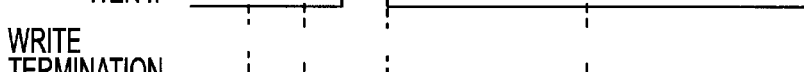
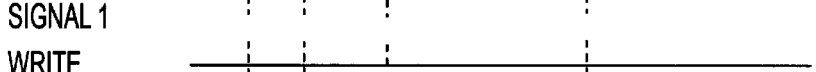
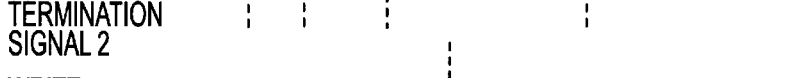
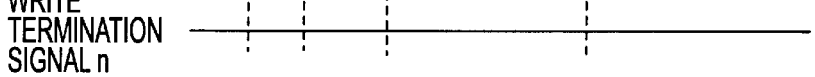
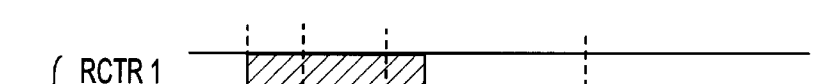
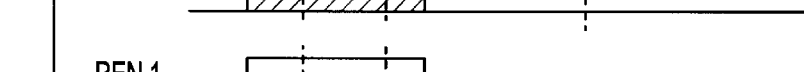
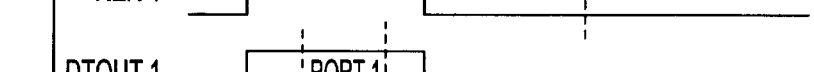
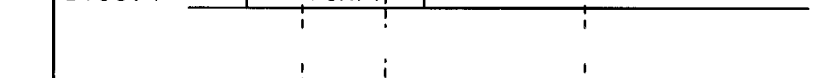
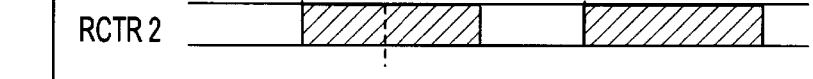
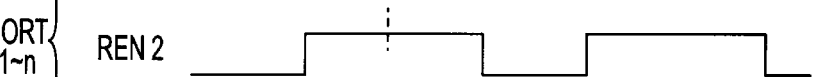
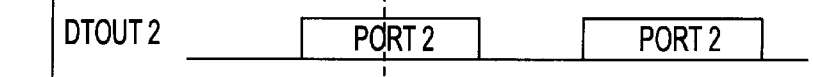
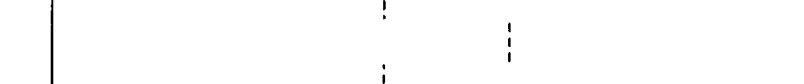

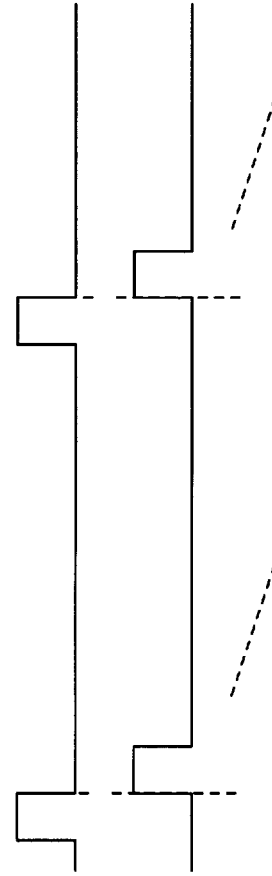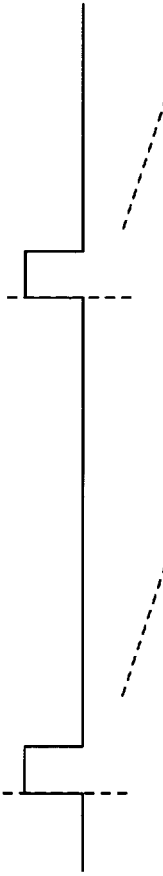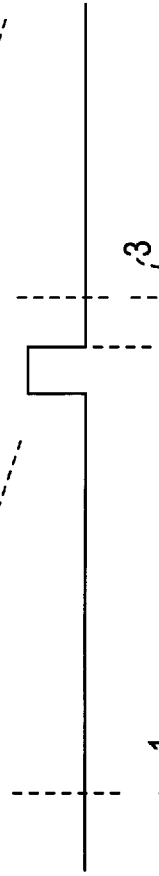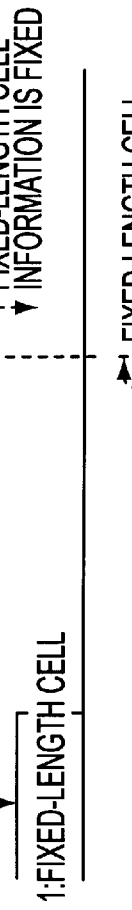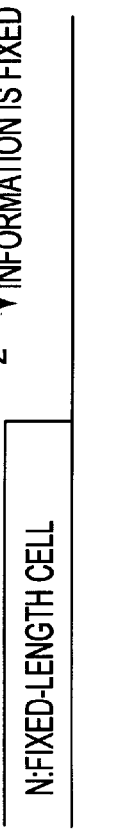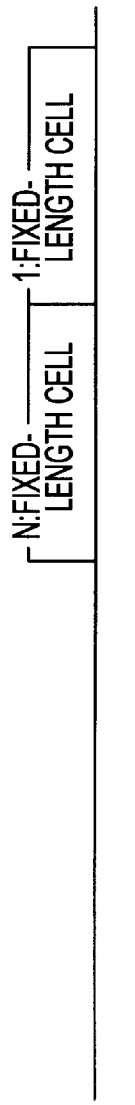
FIG. 46A (RELATED ART) MONITOR ENABLE:1
FIG. 46B (RELATED ART) MONITOR ENABLE:2
FIG. 46C (RELATED ART) MONITOR ENABLE:N
FIG. 46D (RELATED ART) FIXED-LENGTH CELL INPUT TO MULTIPLEXING APPARATUS
FIG. 46E (RELATED ART) FIXED-LENGTH CELL INPUT TO MULTIPLEXING APPARATUS
FIG. 46F (RELATED ART) FIXED-LENGTH CELLS OUTPUT FROM MULTIPLEXING APPARATUS

FIXED-LENGTH CELL MULTIPLEX TRANSMISSION APPARATUS, FIXED-LENGTH CELL MULTIPLEX TRANSMISSION METHOD, FIXED-LENGTH CELL TRANSMTTING APPARATUS, FIXED-LENGTH CELL MULTIPLEXING APPARATUS, AND FIXED-LENGTH CELL DISTRIBUTING APPARATUS

BACKGROUND OF THE INVENTION (1) Field of the Invention

The present invention relates to a fixed-length cell multiplex transmission apparatus, a fixed-length cell multiplex transmission method, a fixed-length cell multiplex transmitting apparatus, a fixed-length cell multiplexing apparatus, and a fixed-length cell distributing apparatus; all of which are suitable for use in a system (e.g., an ATM network) which transfers information to be transferred by dividing it into units of fixed-length cells [ATM (Asynchronous Transfer Mode) cells].

(2) Description of the Related Art

FIG. 39 is a block diagram showing one example of a general fixed-length cell (ATM cell) multiplexing/distributing processing system. As shown in FIG. 39, a fixed-length cell multiplexing/distributing system 501 usually comprises a fixed-length cell multiplexing/distributing processing unit 401 which is connected to a plurality of fixed-length cell transmitting/receiving devices 101-1 to 101-n (n is a natural number). The fixed-length cell multiplexing/distributing processing unit 401 is arranged so as to be able to collect monitor information from each of the fixed-length cell transmitting/receiving devices 101-i (i=1 to n).

The fixed-length cell multiplexing/distributing processing unit 401 comprises a fixed-length cell receiving section (TED LSI) 101, an overhead processing fixed-length cell receiving section (OH LSI) 102, a fixed-length cell multiplexing/distributing device (HUB LSI) 201, and a cell format preparation section (Ti TDC 1500A) 301. The fixed-length cell multiplexing/distributing device 201 comprises a fixed-length cell multiplexing section (Send) 201A and a fixed-length cell distributing section (Receive) 201B.

FIG. 40 is a block diagram which shows the configuration of the previously described general fixed-length cell multiplexing/distributing device 201. As shown in FIG. 40, the fixed-length cell multiplexing section 201A of the fixed-length cell multiplexing/distributing device 201 multiplexes fixed-length cells (sending-side processing), and the fixed-length cell distributing section 201B distributes the received fixed-length cells (receiving-side processing).

When the fixed-length cell multiplexing/distributing device 201 in the fixed-length cell multiplexing/distributing processing unit 401 receives information (fixed-length cells) from each fixed-length cell transmitting/receiving device 101-i other than the fixed-length fixed-length cell transmitting device 101-1, i.e., each of the cell transmitting/receiving devices 101-2 to 101-n, start-stop synchronous sections 202-2 to 202-n in the fixed-length cell multiplexing section 201A first carry out start-stop asynchronous processing for the input cells, and SPS (Start Parity Stop) bit detecting sections 203-1 to 203-n detect a start bit, a parity bit, a stop bit, etc.

The fixed-length cell transmitting device 101-1 handles the cells which should be sent in preference to the cells handled by the other fixed-length cell transmitting/receiving devices 101-2 to 101-n. As shown in FIG. 40, the information (OH) sent from the fixed-length cell transmitting device 101-1 is subjected to neither the start-stop synchronous processing performed by the start-stop synchronous sections 202-2 to 202-n nor detection of a start bit, a parity bit, and a stop bit carried out by the SPS bit detecting sections 203-2 to 203-n. The information is received by an acquiring section 206 in synchronous with a frame pulse of the fixed-length cell transmitting device 101-1. In this way, the cells handled by the fixed-length cell transmitting device 101-1 are sent in preference to any other cells.

The fixed-length cells are written into corresponding FIFO (First-in First-out) memory devices 204-2 to 204-n, respectively. At this time, for example, the fixed-length cell multiplexing section 201A monitors the FIFO memory devices 204-2 to 204-n, in that order, with respect to whether or not the cells have been written into the FIFO memory devices 204-2 to 204-n, as shown in FIG. 41. If the cells are written into the FIFO memory devices 204-2 to 204-n, the cells are read from the FIFO memory devices 204-1 to 204-n. The thus-read cells are respectively processed by time-division multiplexing in a multiplexing section 205, so that each cell is sent.

The fixed-length cell multiplexing/distributing system 501 gives priorities to the information items (i.e., fixedlength cells) which the fixed-length cell multiplexing/distributing processing unit 401 receives from the respective fixed-length cell transmitting/receiving devices 101-1 to 101-n. As a result, the proportion of the fixed-length cells lost due to receipt of excessive traffic is reduced, so that the cell loss ratio of the fixed-length cells which are sent preferentially (priority cells) is prevented from exceeding a predetermined level, thereby guaranteeing desired quality.

That is, even if the fixed-length cell to be processed is in excess of the maximum permissible amount, it becomes possible to send a priority cell by discarding such an amount of the information that the quality of the information is not significantly affected. As a result of this, the efficiency of multiplexing of the fixed-length cells can be improved.

On the other hand, when the fixed-length cell distributing section 201B receives a fixed-length cell, a write control section 43 detects, from the received fixed-length cell, the port number of a port to which the received cell is to be distributed. The received cell is then distributed to a corresponding one of the FIFO memory devices 204-1 to 204-n.

The thus-distributed cell is temporarily held in a corresponding one of the FIFO memory devices 204-1 to 204-n, and in a corresponding one of SPS bit adding sections 207-1 to 207-n, there is then added to the cell a start bit, a parity bit, and a stop bit . The resultant cell is then sent to the fixed-length cell transmitting/receiving device 101-i. The sending of a priority cell is not carried out in the above distributing operation.

FIG. 42 is a block diagram showing the internal configuration of the previously described fixed-length cell transmitting device 101-1. As shown in FIG. 42, the fixed-length cell transmitting device 101-1 comprises a fixed-length cell storage section (RAM) 150, a read counter 151, a JK flip-flop (JK-FF) circuit 153, an edge detecting section 154, and decoders 155-1 to 155-3.

The fixed-length cell storage section 150 stores input fixed-length cell data, and the read counter 151 reads the fixed-length cell data from the fixed-length cell storage section 150 in synchronism with internal frames each corresponding to a single fixed-length cell.

The JK flip-flop circuit 153 outputs a required signal on the basis of both a RAM write termination signal, which is output when the data have been written into the fixed-length cell storage section 150, and a signal output from a decoder 155-3 which will be described later. The edge-detecting section 154 detects the leading edge or trailing edge of the pulse signal output from the JK flip-flop circuit 153.

The decoder 155-1 generates a read enable signal for use in the fixed-length cell storage section 150, and the decoder 155-2 sends a frame pulse signal for use in the fixed-length cell multiplexing section 201A to the fixed-length cell multiplexing section 201A. The decoder 155-3 generates a RAM read termination signal which represents the completion of the reading of the fixed-length cell data.

When the fixed-length cell data are entered (i.e., written) into the fixed-length cell storage section 150 of the fixed-length cell transmitting device 101-1, the RAM write termination signal, for example, as shown in FIG. 43(g) is input to the JK flip-flop 153. As a result, the output of the JK flip-flop circuit 153 is switched to the high level, as shown in FIG. 43(h).

When the output of the edge detecting section 154 is switched to the high level, the read counter 151, which receives the output from the JK flip-flop circuit 153, starts a loading operation, so that the read counter 151 outputs its Q (data) output to the fixed-length cell storage section 150 as a read address (RADD) signal, as shown in FIG. 43(b). At this time, the read counter 151 further outputs a read enable (REN) signal as shown in FIG. 43(c) to the fixed-length cell storage section 150 via the decoder 155-1. A signal which is switched to the high level in synchronism with the read enable signal is output through the decoder 155-2 to the fixed-length cell multiplexing section 201A as a frame pulse for use in the fixed-length cell multiplexing section 201A, as shown in FIG. 43(e).

As previously described, when the fixed-length cell storage section 150 receives the read address signal and the read enable signal, a cell is read from the fixed-length cell storage section 150. When the reading of the cell has been completed, a RAM read termination signal as shown in FIG. 43(f) is output from the read counter 151 to the decoder 155-3. Arrows in FIG. 43 indicate timing clock signals.

FIG. 44 is a block diagram showing the configuration of the previously described fixed-length cell distributing section 201B. In brief, the fixed-length cell distributing section 201B is designed so as to carry out the processing in reverse to that of the multiplexing operation carried out by the fixed-length cell multiplexing section 201A. As shown in FIG. 44, the fixed-length cell distributing section 201B comprises a select (SEL) signal generating section 54A, a write control section 43, the FIFO memory (RAM) devices 204-1 to 204-n, read counters (RCTR) 45C-1 to 45C-n, and parallel/serial (P/S) converts 42-1 to 42-n.

The FIFO memory devices 204-1 to 204-n are disposed so as to correspond to respective output ports (DTOUT 1–n). Each of the FIFO memory devices 204-1 to 204-n stores a received fixed-length cell which in this case, comprises m parallel data strings (m is a natural number). The SEL signal generating section 54A detects the port number of a port to which the fixed-length cell is to be output, from the data of each fixed-length cell input as m-parallel data. The SEL signal generating section 54A then generates a signal (a port selecting signal) corresponding to the detected port number. For example, as shown in FIGS. 45(a) and 45(b), the number of the port to which the received cell is to be output is detected in synchronism with a received frame pulse (FP) signal (in the order of port numbers, that is, in this case, 1, 2, n, and 2). From the detected data is determined proper one of the FIFO memory devices 204-1 to 204-n into which the input cell is to be written, and the determined FIFO memory device is communicated to a write signal generating section 43A.

The write control section 43 writes the input data into the one of the FIFO memory devices 204-1 to 204-n corresponding to the port number that is detected by the SEL signal generating section 54A from the data of the fixed-length cell comprising M parallel data strings (hereinafter referred to as "M-parallel fixed-length cell"). The write control section 43 comprises a write enable signal (WEN) generating section 43A, a write counter (WCTR) 43B, and a read counter load (RCTRLD) signal generating section 43C.

The write signal generating section 43A generates a write enable (WEN) signal and a write counter load (WCRTRLD) signal for each of the FIFO memory devices 204-1 to 204-n corresponding to the respective ports, as shown in FIGS. 45(d) to 45(f). The write enable signal is output to the FIFO memory devices 204-1 to 204-n and the read counter load signal generating section 43C, whereas the write counter load signal is output to the write counter 43B.

The write counter 43B outputs its Q output, as a write address (WADD), to FIFO memory devices 204-1 to 204-n on the basis of information (i.e., a write counter load signal) received from the write signal generating section 43A. The write counter 43B notifies the read counter load signal generating section 43C that the information has been written into the FIFO memory devices 204-1 to 204-n (i.e., the write counter 43B sends a write termination signal to the read counter load signal generating section 43C). For example, when a write counter counts up as shown in FIG. 45(c), a write termination signal is output to the read counter load signal generating section 43C every time the writing of the cell data into the FIFO memory devices 204-1 to 204-n has been finished, as shown in FIGS. 45(g) to 45(i).

Upon receipt of the write enable signal from the write signal generating section 43A, the read counter load signal generating section 43C generates a read counter load signal on the basis of the write termination signal from the write counter 43B. This read counter load signal is input to read counters 45C-1 to 45C-n. The read counter load signal is produced for each of the ports.

In response to the read counter load signal from the read counter load signal generating section 43C, the read counters 45C-1 to 45C-n count up in the manner shown in, for example, FIGS. 45(j), 45(m), and 45(p). The read counters 45C-1 to 45C-n then generate read address (RADD) signals for use in the FIFO memory devices 204-1 to 204-n as well as read enable (REN) signals as shown in FIGS. 45(k), 45(n), and 45(q). The fixed-length cell data are sequentially read from the FIFO memory devices 204-1 to 204-n on the basis of the read enable signals (see FIGS. 45(l), 45(o), and 45(r)). The thus-read fixed-length cell data are sent to P/S converting sections 42-1 to 42-n.

In the multiplexing operation of this type of general fixed-length cell multiplexing/distributing device 201, the FIFO memory devices 204-1 to 204-n corresponding to the ports are monitored, in that order, from the FIFO memory device 204-1 in response to respective monitor enable signals, as shown in FIGS. 46(a) to 46(c). Therefore, if, as shown in FIG. 46(d), the FIFO memory device 204-1 is monitored in accordance with the monitor enable signal (indicated by ① in FIG. 46) before the writing of the fixed-length cell data into the FIFO memory device 204-1 has been completed, the fixed-length cell data are judged as being unfixed. As a result, the fixed-length cell data are not read.

On the other hand, if, as shown in FIG. 46(e), the FIFO memory device 204-n is monitored in accordance with a corresponding monitor enable signal (indicated by ② in FIG. 46) after the writing of the fixed-length cell data into the FIFO memory device 204-n has been completed, the fixed-length cell data of the FIFO memory device 204-n are judged as being fixed. As a result, that fixed-length cell data are read.

The previously described fixed-length cell data, which are received by the FIFO memory device 204-1 and are determined as being unfixed, are read by the next monitor enable signal (indicated by ③ in FIG. 46). Consequently, the data stored in the FIFO memory device 204-1 which stores the highest-priority fixed-length cell data cannot be sent preferentially, and the fixed-length cell data following the highest-priority fixed-length cell data are sent most preferentially, as shown in FIG. 46(f).

The higher the number of virtual channels to be processed, the poorer the authenticity of first-come, first-served processing. If, in the course of the processing carried out in the fixed-length cell multiplexing section 201A and subsequent sections, the amount of the fixed-length cell data exceeds the storage amount of the FIFO memory devices 204-1 to 204-n, the highest-priority fixed-length cell data may be abandoned due to congestion, which in turn results in an increase in the length of delay. In the preferential processing for simultaneously arrived fixed-length cells, it is substantially impossible to accurately specify the port whose fixed-length cell is to be preferentially output, because of the difference in the order of monitor positions.

With regard to the distribution processing, each port is provided with the corresponding one of the FIFO memory devices 204-1 to 204-n, and read control sections (i.e., the read counters) are provided so as to correspond to the number of the memory devices, which resulting in an increase in a circuit scale. Further, the subsequent fixed-length cell data are immediately output after certain fixed-length cell data have been output, which makes it difficult to distinguish these two fixed-length cells from each other and, eventually, this results in inferior processing capability.

SUMMARY OF THE INVENTION

The present invention has been conceived in view of the above-described drawbacks, and a first object of the present invention is to make it possible to accurately carry out first-come, first-served processing for fixed-length cells, in which for the processing of multiplexing cells, one of several fixed-length cell transmitting apparatuses is configured as a highest-priority fixed-length cell transmitting apparatus for sending a fixed-length cell to be sent most preferentially, and the fixed-length cell output from the highest-priority fixed-length cell transmitting apparatus is directly output without being stored.

A second object of the present invention is to make it possible to reduce the number of FIFO memory sections each capable of storing a fixed-length cell input as M-parallel data, as well as the number of read counters for the FIFO memory sections, thereby minimizing a circuit scale necessary for the processing of distributing cells.

To these ends, a fixed-length cell multiplex transmission apparatus, according to the present invention, comprises a plurality of fixed-length cell transmitting apparatuses, each of which sends a fixed-length cell, and a fixed-length cell multiplexing apparatus which multiplexes the fixed-length cells received from the fixed-length cell transmitting apparatuses and outputs the thus multiplexed cells. One of the plurality of fixed-length cell transmitting apparatuses is configured as a highest-priority fixed-length cell transmitting apparatus which sends a fixed-length cell to be sent most preferentially. Further, the highest-priority fixed-length cell transmitting apparatus comprises a fixed-length cell storage section for storing the fixed-length cell, and a fixed-length cell read control section which reads the fixed-length cell from the fixed-length cell storage section in synchronism with internal frames each corresponding to a single fixed-length cell. The fixed-length cell multiplexing apparatus comprises a plurality of FIFO storage sections in which the fixed-length cells received from the fixed-length cell transmitting apparatuses other than the highest-priority fixed-length cell transmitting apparatus are written, and from which the fixed-length cells are read, in the order of arrival, an FIFO control section which controls the writing of the fixed-length cells into, and the reading of the same from, the plurality of FIFO storage sections, and a multiplexing section which directly outputs the fixed-length cell received from the highest-priority fixed-length cell transmitting apparatus without storing it, and outputs the fixed-length cells, which are stored after having been received from the fixed-length cell transmitting apparatus other than the highest-priority fixed-length cell transmitting apparatuses, at a timing other than the timing at which the highest-priority fixed-length cell transmitting apparatus outputs.

According to another aspect of the present invention, there is provided a fixed-length cell multiplex transmission apparatus, according to the present invention, comprising a plurality of fixed-length cell transmitting apparatuses, each of which sends a fixed-length cell, a fixed-length cell multiplexing apparatus which multiplexes the fixed-length cells received from the fixed-length cell transmitting apparatuses and outputs the thus multiplexed cells, and a fixed-length cell processing apparatus which receives the multiplexed cell output from the fixed-length cell multiplexing apparatus and subjects the thus received cells to desired processing. The fixed-length cell processing apparatus comprises a storage section for fixed-length cell processing which sequentially stores the multiplexed output from the fixed-length cell multiplexing apparatus, and a storage amount information notification section which carries out the notification of information regarding the storage amount of the storage section for fixed-cell processing. One of the plurality of fixed-length cell transmitting apparatuses is configured as a highest-priority fixed-length cell transmitting apparatus which sends a fixed-length cell to be sent most preferentially. Further, the highest-priority fixed-length cell transmitting apparatus comprises a fixed-length cell storage section for storing the fixed-length cell, a fixed-length cell read control section which reads the fixed-length cell from the fixed-length cell storage section in synchronism with internal frames each corresponding to a single fixed-length cell, and a fixed-length cell read-inhibit control section which inhibits the fixed-length cell read control section from reading the fixed-length cell if the storage amount of the storage section for fixed-length cell processing is in excess of a predetermined storage amount on the basis of the storage amount information received from the storage amount information notification section of the fixed-length cell processing apparatus. The fixed-length cell multiplexing apparatus comprises a plurality of FIFO storage sections in which the fixed-length cells received from the fixed-length cell transmitting apparatuses other than the highest-priority fixed-length cell transmitting apparatus are written, and from which the fixed-length cells are read, in the order of arrival, and a multiplexing section which directly outputs the fixed-length cell received from the highest-priority fixed-length cell transmitting apparatus without storing it, and outputs the fixed-length cells, which are stored after having been received from the fixed-length cell transmitting apparatuses other than the highest-priority fixed-length cell transmitting apparatus, at a timing other than the timing at which the highest-priority fixed-length cell transmitting apparatus outputs.

According to still another aspect of the present invention, there is provided a fixed-length cell multiplex transmission method for use in a system made up of a plurality of fixed-length cell transmitting apparatuses, each of which sends a fixed-length cell, a fixed-length cell multiplexing apparatus which multiplexes the fixed-length cells received from the fixed-length cell transmitting apparatuses and outputs the thus multiplexed cells, wherein one of the plurality of fixed-length cell transmitting apparatuses is configured as a highest-priority fixed-length cell transmitting apparatus for sending a fixed-length cell to be sent most preferentially. The method comprises the steps of: sending the fixed-length cell from the highest-priority fixed-length cell transmitting apparatus in synchronism with internal frames each corresponding a single fixed-length cell; asynchronously sending the fixed-length cells from the fixed-length cell transmitting apparatuses other than the highest-priority fixed-length cell transmitting apparatus; storing, in the fixed-length cell multiplexing apparatus in the order of arrival, the fixed-length cells received from the fixed-length cell transmitting apparatuses other than the highest-priority fixed-length cell transmitting apparatus; outputting directly the fixed-length cell received from the highest-priority fixed-length cell transmitting apparatus without storing it; and outputting the fixed-length cells, which are stored after having been received from the fixed-length cell transmitting apparatuses other than the highest-priority fixed-length cell transmitting apparatus, at a timing other than the timing at which the highest-priority fixed-length cell transmitting apparatus outputs.

According to yet another aspect of the present invention, there is provided a fixed-length transmitting apparatus for sending a fixed-length cell to a fixed-length cell multiplexing apparatus which multiplexes the fixed-length cells received from the fixed-length cell transmitting apparatuses and outputs the thus multiplexed cells. The fixed-length transmitting apparatus comprises a fixed-length cell storage section for storing the fixed-length cell to be sent to the fixed-length cell multiplexing apparatus; and a fixed-length cell read control section which reads the fixed-length cell from the fixed-length cell storage section in synchronism with internal frames each corresponding to a single fixed-length cell when the fixed-length cell is sent to the fixed-length multiplexing apparatus.

According to a further aspect of the present invention, there is provided a fixed-length cell multiplexing apparatus which multiplexes a fixed-length cell output from a plurality of fixed-length cell transmitting apparatuses, each sending a fixed-length cell, and outputs the thus multiplexed cell. The multiplexing apparatus comprises a plurality of FIFO storage sections in which the fixed-length cells received from the fixed-length cell transmitting apparatuses other than a highest-priority fixed-length cell transmitting apparatus are written, and from which the fixed-length cells are read, in the order of arrival, wherein the highest-priority fixed-length cell transmitting apparatus sends a fixed-length cell to be sent most preferentially in synchronism with internal frames each corresponding to a single fixed-length cell; an FIFO control section which controls the writing of the fixed-length cells into, and the reading of the same from, the plurality of FIFO storage sections; and a multiplexing section which directly outputs the fixed-length cell received from the highest-priority fixed-length cell transmitting apparatus without storing it, and outputs the fixed-length cells, which are stored after having been received from the fixed-length cell transmitting apparatuses other than the highest-priority fixed-length cell transmitting apparatus, at a timing other than the timing at which the highest-priority fixed-length cell transmitting apparatus outputs.

According to the fixed-length cell multiplex transmission apparatus, the fixed-length cell multiplex transmission method, and the fixed-length cell multiplexing apparatus of the present invention, the fixed-length cell multiplexing apparatus is not provided with an FIFO storage section for storing the fixed-length cell to be processed first (i.e., the highest-priority fixed-length cell), so that the highest-priority fixed-length cell is output so as to pass through the fixed-length cell multiplexing apparatus. As a result, it is possible to prevent the highest-priority fixed-length cell from being abandoned due to congestion. Further, it is possible to send the highest-priority fixed-length cell with the minimum delay by multiplex transmission. Therefore, the other fixed-length cells can be efficiently sent by multiplex transmission, which makes it possible to reduce and simplify the circuit scale of each FIFO memory device. The first-come, first-served processing which also includes simultaneous-arrival processing can be executed accurately.

Further, according to the present invention, it is possible to determine the priorities of the fixed-length cells on the basis of an instruction in the form of an external signal if the plurality of fixed-length cells have been simultaneously received. As a result, it becomes possible to arbitrarily change the priorities in the simultaneous-arrival processing in accordance with the traffic of the fixed-length cell multiplex transmission apparatus. Therefore, the processing of required information can be quickly carried out, which in turn significantly contributes to the flexibility in constructing the fixed-length cell multiplex transmission apparatus.

According to the present invention, it is possible to automatically change the priority of the fixed-length cell according to the count value of the simultaneous arrival counter by incrementing the count values of the simultaneous arrival counter when the fixed-length cells simultaneously arrive at the fixed-length cell multiplexing apparatus. In consequence, it becomes possible to provide every fixed-length cell transmitting apparatus with an equal priority without fixing the priority.

According to a furthermore aspect of the present invention, there is provided a fixed-length cell distributing apparatus which distributes the M-parallel fixed-length cell data to N ports (N>M). The distributing apparatus comprises FIFO storage sections the number of which is N and in which the fixed-length cells are written, and from which the fixed-length cells are read, in the order of input; parallel/serial converters provided so as to respectively correspond to the FIFO storage sections; a write control section for detecting information regarding a port, to which the fixed-length cell data are to be output, from the M-parallel fixed-length cell data and for writing the fixed-length cell data to the FIFO storage section corresponding to the detected output port; and a read control section which reads the fixed-length cell data from the FIFO storage section. The read control section further comprises M read counters capable of outputting a timing signal for reading the fixedlength cell data from the FIFO storage section; a selector disposed on the output side of the M read counters for feeding an output from the M read counters to any of the FIFO storage sections as a cell read signal; an M-counting counter which carries out a counting operation in response to the completion of writing of the fixed-length cell data to the FIFO storage section; a read counter control section for incrementing the read counters which have ordinal number information corresponding to the count values of the M-counting counter; and a selector control section which controls the selector on the basis of information received from the read counter control section.

According to the fixed-length cell distributing apparatus of the present invention, as a result of the read control section being provided with the selector, the M-counting counter, the read counter control section, and the selector control section, the number of read counters is reduced. Hence, it is possible to significantly reduce the circuit scale without changing the distributing capability of the fixed-length cell distributing apparatus. The fixed-length cell distributing apparatus of this type is very effective in distributing the fixed-length cell data to great many ports.

According to a still further aspect of the present invention, there is provided a fixed-length cell distributing apparatus which distributes the M-parallel fixed-length cell data to N ports (N>M). The distributing apparatus comprising FIFO storage sections the number of which is N and in which the fixed-length cells are written, and from which the fixed-length cells are read, in the order of input; parallel/serial converters provided so as to respectively correspond to the FIFO storage sections; a write control section for detecting information regarding a port, to which the fixed-length cell data are to be output, from the M-parallel fixed-length cell data and for writing the fixed-length cell data to the FIFO storage section corresponding to the detected output port; a read control section which reads the fixed-length cell data from the FIFO storage section. The read control section further comprises M read signal supply sections which outputs a signal for reading the fixed-length cell data from the FIFO storage section; and a read signal selecting section which selects a read signal fed from the read signal supply section and feeds the thus selected read signal to a desired FIFO storage section.

According to another aspect of the present invention, there is provided a fixed-length cell distributing apparatus which distributes the M-parallel fixed-length cell data to N ports (N>M). The distributing apparatus comprises FIFO storage sections the number of which is P, in which the fixed-length cells corresponding to the number of M ports are written, and from which the fixed-length cells are read, in the order of input (P is the minimum integer greater than N/M); parallel/serial converters whose total number is P×M and in which M parallel/serial converters are provided for each of the FIFO storage sections; a write control section for detecting information regarding a port, to which the fixed-length cell data are to be output, from the M-parallel fixed-length cell data and for writing the fixed-length cell data to the FIFO storage section corresponding to the detected output port; a read control section which reads the fixed-length cell data from the FIFO storage section. The read control section includes P read control units, each comprising M read counters each capable of outputting a timing signal for reading the fixed-length cell data from the FIFO storage section; and a read controller which receives timing signals from the read counters and which time division-multiplexes the signals for reading the fixed-length cell data at M times the speed of signals for writing the fixed-length cell data so as to output the thus time division multiplexed signal to the corresponding FIFO storage section.

According to the fixed-length cell distributing apparatus of the present invention, the number of FIFO storage sections is reduced compared to the number of output ports. Further, because the read control section is provided with the read control unit which includes the read counter and the read controller, the circuit configuration of the FIFO storage section can be simplified, which significantly contributes to the flexibility of the system construction even in this case.

According to yet another aspect of the present invention, there is provided a fixed-length cell distributing apparatus which distributes the M-parallel fixed-length cell data to N ports (N>M). The distributing apparatus comprises FIFO storage sections the number of which is P and in which the fixed-length cells corresponding to the number of M ports are written, and from which the fixed-length cells are read, in the order of input (P is the minimum integer greater than N/M); parallel/serial converters whose total number is P×M and in which M parallel/serial converters are provided for each of the FIFO storage sections; a write control section for detecting information regarding a port, to which the fixed-length cell data are to be output, from the M-parallel fixed-length cell data and for writing the fixed-length cell data to the FIFO storage section corresponding to the detected output port; and a read control section which reads the fixed-length cell data from the FIFO storage section. The read control section includes a read control unit which comprises M read counters each capable of outputting a timing signal for reading the fixed-length cell data from the FIFO storage section; N timing signal selectors which selectively output timing signals fed from the read counters; and P read controller which receive the timing signals selected by each of the timing signal selectors and which time division-multiplexes the signals for reading the fixed-length cell data at M times the speed of signals for writing the fixedlength cell data so as to output the thus time division multiplexed signals to the corresponding FIFO storage section.

According to the fixed-length cell distributing apparatus of the present invention, the number of the FIFO storage sections and the number of the read counters are reduced compared to the number of output ports. As a result, it is possible to significantly reduce a circuit scale without changing the capability of distributing the fixed-length cell data.

According to a further aspect of the present invention, there is provided a fixed-length cell distributing apparatus which distributes the M-parallel fixed-length cell data to N ports (N>M). The distributing apparatus comprises FIFO storage sections number of which is N and in which the fixed-length cells are written, and from which the fixed-length cells are read, in the order of input; parallel/serial converters provided so as to respectively correspond to the FIFO storage sections; a write control section for detecting information regarding a port, to which the fixed-length cell data are to be output, from the M-parallel fixed-length cell data and for writing the fixed-length cell data to the FIFO storage section corresponding to the detected output port; and a read control section which reads the fixed-length cell data from the FIFO storage section and inhibits the reading of the next fixed-length cell data for a predetermined period of guard time after the reading of the current fixed-length cell data.

The fixed-length cell data distributing apparatus of the present invention comprises an (L+α)-counting read counter and an empty condition detecting section. The fixed-length cell to be output to each port is provided with the guard time, which makes it possible to ensure a time interval of α between the fixed-length cell data to be read. As a result, the fixed-length cell data can be easily distinguished from each other. It is possible to accept the writing of the fixed-length cell data to the FIFO storage section even in the course of the guard time, which results in improved processing capability of the fixed-length cell distributing system.

BRIEF DESCRIPTION OF THE DRAWINGS

FIGS. 13(a) and 13(b) are diagrams for explaining first-come, first-served processing/simultaneous-arrival processing according to the first embodiment of the present invention;

FIG. 16 is a block diagram for explaining a method of controlling FIFO storage sections carried out by the FIFO control section according to the first embodiment of the present invention;

FIGS. 17(a) to 17(d) are timing charts for explaining the operation of a fixed-length cell multiplexing apparatus according to the first embodiment of the present invention;

FIGS. 27(a) to 27(t) are timing charts for explaining the operation of the fixed-length cell distributing apparatus according to the second embodiment of the present invention;

FIG. 29 is a block diagram showing a first modification of the fixed-length cell distributing apparatus according to the second embodiment of the present invention;

FIGS. 30(a) to 30(j) are timing charts for explaining the operation of the fixed-length cell distributing apparatus according to the first modification of the second embodiment of the present invention;

FIGS. 33(a) to 33(c) are diagrams for explaining the operation of the fixed-length cell distributing apparatus according to the second modification of the second embodiment of the present invention;

FIGS. 35(a) to 35(m) are timing charts for explaining the operation of the fixed-length cell distributing apparatus according to the third modification of the second embodiment of the present invention;

FIGS. 38(a) to 38(c) are diagrams for explaining the operation of the fixed-length cell distributing apparatus according to the fourth modification of the second embodiment of the present invention;

FIGS. 45(a) to 45(r) are timing charts for explaining the operation of the fixed-length cell distributing apparatus; and FIGS. 46(a) to 46(f) are timing charts for explaining the operation of a fixed-length cell multiplexing apparatus.

DESCRIPTION OF THE PREFERRED EMBODIMENTS (a) Aspects of the Invention

Aspects of the present invention will first be described with reference to the accompanying drawings.

Figure 1:
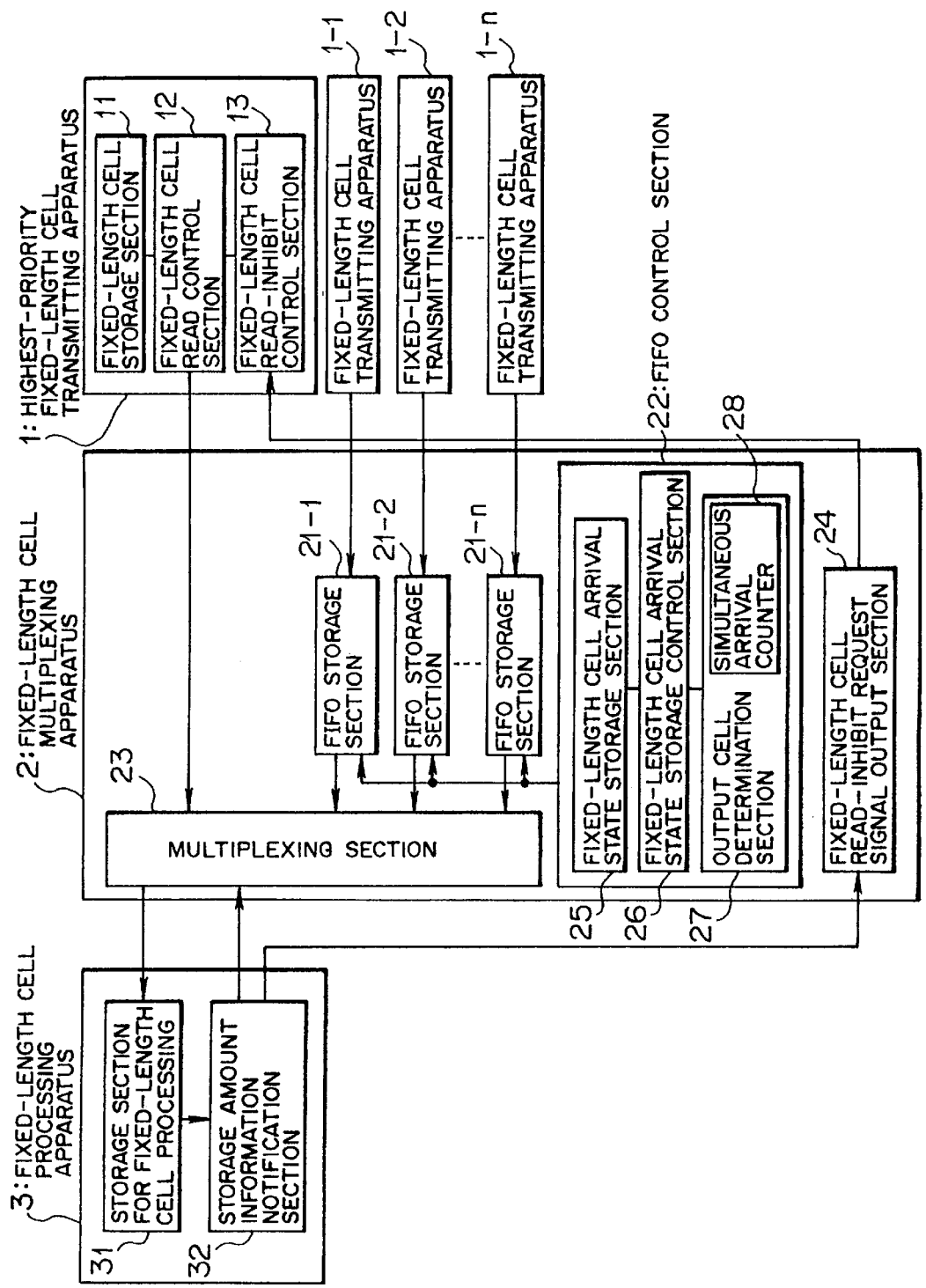
FIG. 1 is a block diagram showing an aspect of the present invention.

FIG. 1 is a block diagram showing an aspect of the present invention. The fixed-length cell multiplex transmission apparatus shown in FIG. 1 comprises fixed-length cell transmitting apparatuses 1-1 to 1-n (n is a natural number), a highest-priority fixed-length cell transmitting apparatus 1, a fixed-length cell multiplexing apparatus 2, and a fixed-length cell processing apparatus 3.

Each of the fixed-length cell transmitting apparatuses 1-1 to 1-n sends a fixed-length cell. The highest-priority fixed-length cell transmitting apparatus 1 sends a fixed-length cell to be sent most preferentially. This highest-priority fixed-length cell transmitting apparatus 1 comprises a fixed-length cell storage section 11, a fixed-length cell read control section 12, and a fixed-length cell read-inhibit control section 13. The fixed-length cell storage section 11 stores fixed-length cells, and the fixed-length cell read control section 12 reads the fixed-length cell from the fixed-length cell storage section 11 in synchronism with internal frames each corresponding to a single fixed-length cell. The fixed-length cell read-inhibit control section 13 inhibits the fixed-length cell read control section 12 from reading the fixed-length cell if the storage amount of a storage section 31 for fixed-length cell processing is in excess of a predetermined storage amount on the basis of storage amount information received from a storage amount information notification section 32 of the fixed-length cell processing apparatus 3 which will be described later.

The fixed-length cell multiplexing apparatus 2 multiplexes the fixed-length cells received from the fixed-length cell transmitting apparatuses 1-1 to 1-n and outputs the thus multiplexed cells. The fixed-length cell multiplexing apparatus 2 comprises FIFO storage sections 21-1 to 21-n, an FIFO control section 22, a multiplexing section 23, and a fixed-length cell read-inhibit request signal output section 24. The fixed-length cells received from the fixed-length cell transmitting apparatuses 1-1 to 1-n other than the highest-priority fixed-length cell transmitting apparatus 1 are written into the FIFO storage sections 21-1 to 21-n in the order of arrival. Thus written fixed-length cells are read out from the FIFO storage sections 21-1 to 21-n in the order of arrival. The FIFO control section 22 controls the writing of the fixed-length cells into, and the reading of the same from, the plurality of FIFO storage sections 21-1 to 21-n.

The multiplexing section 23 directly outputs the fixed-length cell received from the highest-priority fixed-length cell transmitting apparatus 1 without storing it. Also, the multiplexing section 23 outputs the fixed-length cells, which are stored after having been received from the fixed-length cell transmitting apparatuses 1-1 to 1-n other than the highest-priority fixed-length cell transmitting apparatus 1, at a timing other than the timing at which the highest-priority fixed-length cell transmitting apparatus 1 outputs a fixed-length cell. The fixed-length cell read-inhibit request signal output section 24 outputs a fixed-length cell read-inhibit request signal to the fixed-length cell read-inhibit control section 13 of the highest-priority fixed-length cell transmitting apparatus 1 if it is judged, based on the storage amount information received from the later-described storage amount information notification section 32 of the fixed-length cell processing apparatus 3, that the storage amount of the storage section for fixed-length cell processing is in excess of a predetermined storage amount.

The FIFO control section 22 is provided with a fixed-length cell arrival state storage section 25, a fixed-length cell arrival state storage control section 26, and an output cell determination section 27. The fixed-length cell arrival state storage section 25 simultaneously stores the arrival of the fixed-length cell from each of the fixed-length cell transmitting apparatuses 1-1 to 1-n other than the highest-priority fixed-length cell transmitting apparatus 1. When a fixed-length cell has arrived from any one of the fixed-length cell transmitting apparatuses 1-1 to 1-n, the fixed-length cell arrival state storage control section 26 writes a signal indicating the arrival of the fixed-length cell in the fixed-length cell arrival state storage section 25. Further, the fixed-length cell arrival state storage control section 26 reads the signal indicating the arrival state from the fixed-length cell arrival state storage section 25 in response to a predetermined read request signal.

When the arrival state of the fixed-length cell received from the fixed-length cell transmitting apparatuses 1-1 to 1-n is read from the fixed-length cell arrival state storage section 25, the output cell determination section 27 determines one of the FIFO storage sections 21-1 to 21-n from which a fixed-length data cell is to be read. The output cell determination section 27 is provided with a simultaneous arrival counter 28. The count value of the simultaneous arrival counter 28 is incremented when it is judged that the fixed-length cells simultaneously arrive at the fixed-length cell multiplexing apparatus from the plurality of fixed-length cell transmitting apparatuses 1-1 to 1-n other than the highest-priority fixed-length cell transmitting apparatus 1. The above judgement is made on the basis of the arrival state of the fixed-length cell received from the fixed-length cell transmitting apparatuses 1-1 to 1-n other than the highest-priority fixed-length cell transmitting apparatus 1.

The fixed-length cell processing apparatus 3 receives the multiplexed cells from the fixed-length cell multiplexing apparatus 2, and carries out desired processing for the fixed-length cells. The fixed-length cell processing apparatus 3 comprises the storage section 31 for fixed-length cell processing, and the storage amount notification section 32. The storage section 31 for fixed-length cell processing sequentially stores the multiplexed cells received from the fixed-length cell multiplexing apparatus 2, and the storage amount notification section 32 carries out the notification of information regarding the storage amount of the storage section 31 for fixed-length cell processing.

Therefore, according to the present invention, the fixed-length cell multiplexing apparatus 2 is not provided with the FIFO storage sections 21-1 to 21-n for storing the fixed-length cell to be processed most preferentially (i.e., the highest-priority fixed-length cell), so that the highest-priority fixed-length cell is output while passing through the fixed-length cell multiplexing apparatus 2. As a result, it is possible to prevent the highest-priority fixed-length cell from being abandoned for congestion. Further, it is possible to send the highest-priority fixed-length cell with the minimum delay by multiplex transmission. Therefore, the other fixed-length cells can be efficiently sent by multiplex transmission, which makes it possible to reduce the circuit scale and simplified the circuit for each of the FIFO storage sections 21-1 to 21-n. The first-come, first-served processing which also includes simultaneous-arrival processing can be executed accurately.

Further, according to the present invention, it is possible to determine the priorities of the fixed-length cells on the basis of an instruction in the form of an external signal when a plurality of fixed-length cells have been simultaneously received. As a result, it becomes possible to arbitrarily change the priorities at the time of the simultaneous-arrival processing in accordance with the traffic of the system. Therefore, the processing of required information can be quickly carried out, which in turn significantly contributes to the flexibility in constructing the fixed-length cell multiplex transmission apparatus.

According to the present invention, it is possible to automatically change the priority of the fixed-length cells according to the count value of the simultaneous arrival counter 28 by incrementing the simultaneous arrival counter 28 when the fixed-length cells simultaneously arrive at the fixed-length cell multiplexing apparatus. In consequence, it becomes possible to provide all of the fixed-length cell transmitting apparatuses 1-1 to 1-n with an equal priority without fixing the priority.

Figure 2:
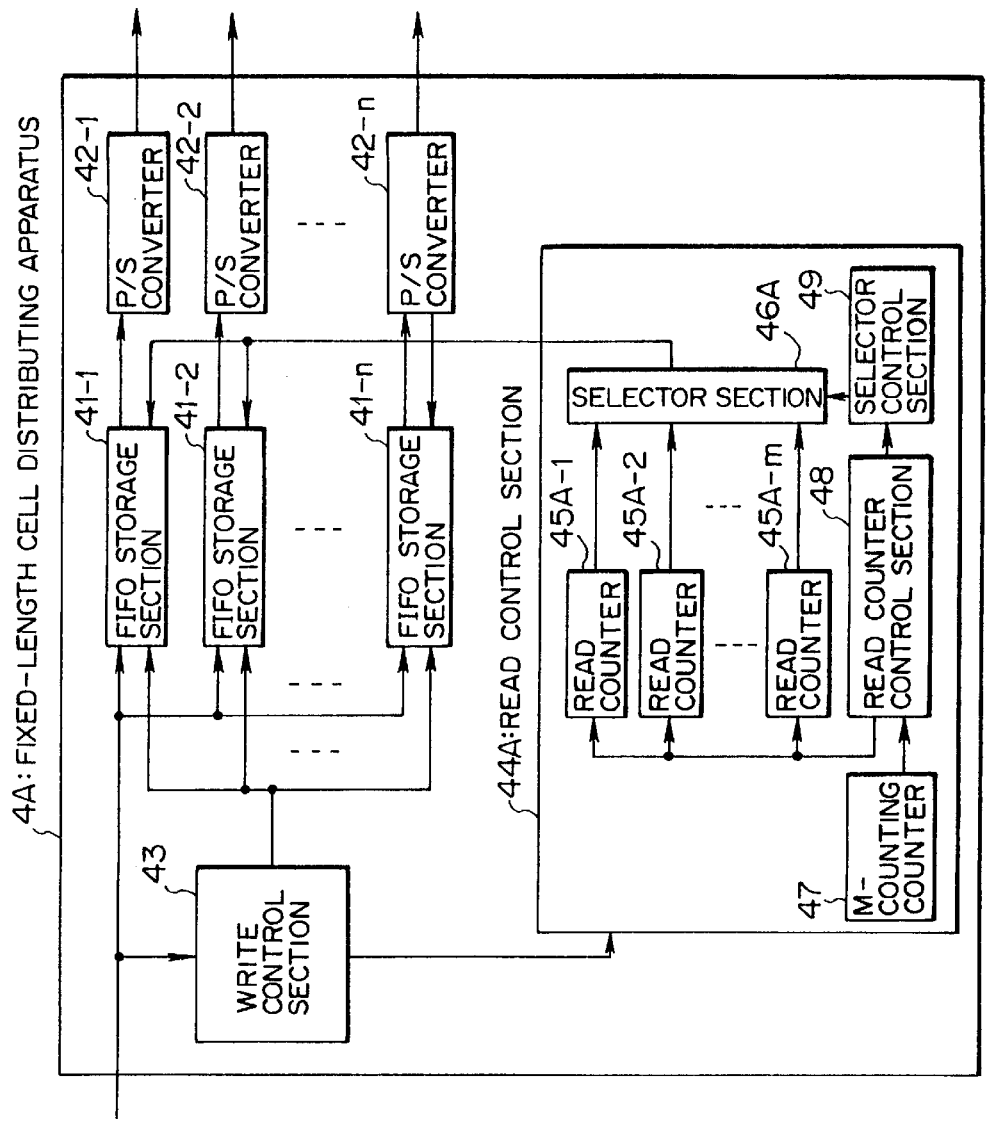
FIG. 2 is a block diagram showing another aspect of the present invention.

FIG. 2 is a block diagram showing another aspect of the present invention. A fixed-length cell distributing apparatus 4A shown in FIG. 2 distributes the M-parallel fixed-length cell data to N ports (N is a natural number greater than M). The fixed-length cell distributing apparatus 4A comprises FIFO storage sections 41-1 to 41-n, parallel/serial (P/S) converters 42-1 to 42-n (n is a natural number), a write control section 43, and a read control section 44A.

The FIFO storage sections 41-1 to 41-n are adapted to store the fixed-length cell data therein in the order of input and to read out the data therefrom in the order of input. The P/S converters 42-1 to 42-n are provided so as to respectively correspond to the FIFO storage sections and convert the data received from the FIFO storage sections 41-1 to 41-n into serial signals. The write control section 43 detects, from the M-parallel fixed-length cell data, information regarding a port to which the fixed-length cell data are to be output, and writes the fixed-length cell data to the FIFO storage section corresponding to the detected output port.

The read control section 44A reads the fixed-length cell data from the FIFO storage sections 41-1 to 41-n. The read control section 44A comprises read counters 45A-1 to 45-m, a selector section 46A, an M-counting counter 47, a read counter control section 48, and a selector control section 49. The read counters 45A-1 to 45A-m output signals for reading fixed-length cell data from the FIFO storage sections 41-1 to 41-n, and the number of the read counters 45A-1 to 45A-m is M (i.e., m=M).

The selector section 46A is connected to the output side of the M read counters 45A-1 to 45A-m and feeds an output from the read counters 45A-1 to 45A-m to any of the FIFO storage sections 41-1 to 41-n (the number of the FIFO storage sections 41-1 to 41-n is N) as a cell read signal. The M-counting counter 47 starts its counting up operation in response to the completion of writing of the fixed-length cell data to the FIFO storage sections 41-1 to 41-n.

The read counter control section 48 increments the read counters 45A-1 to 45A-m which have ordinal numbers corresponding to the count values of the M-counting counter 47. The selector control section 49 controls the selector section 46A on the basis of information received from the read counter control section 48.

Accordingly, in the fixed-length cell distributing apparatus 4A of the present invention, as a result of the read control section 44A being provided with the selector section 46A, the M-counting counter 47, the read counter control section 48, and the selector control section 49, the number of read counters 45A-1 to 45A-m is reduced. Hence, it is possible to significantly reduce the circuit scale without changing the distributing capability of the fixed-length cell distributing apparatus 4A. The fixed-length cell distributing apparatus 4A of this type is very effective in distributing the fixed-length cell data to great many ports.

Figure 3:
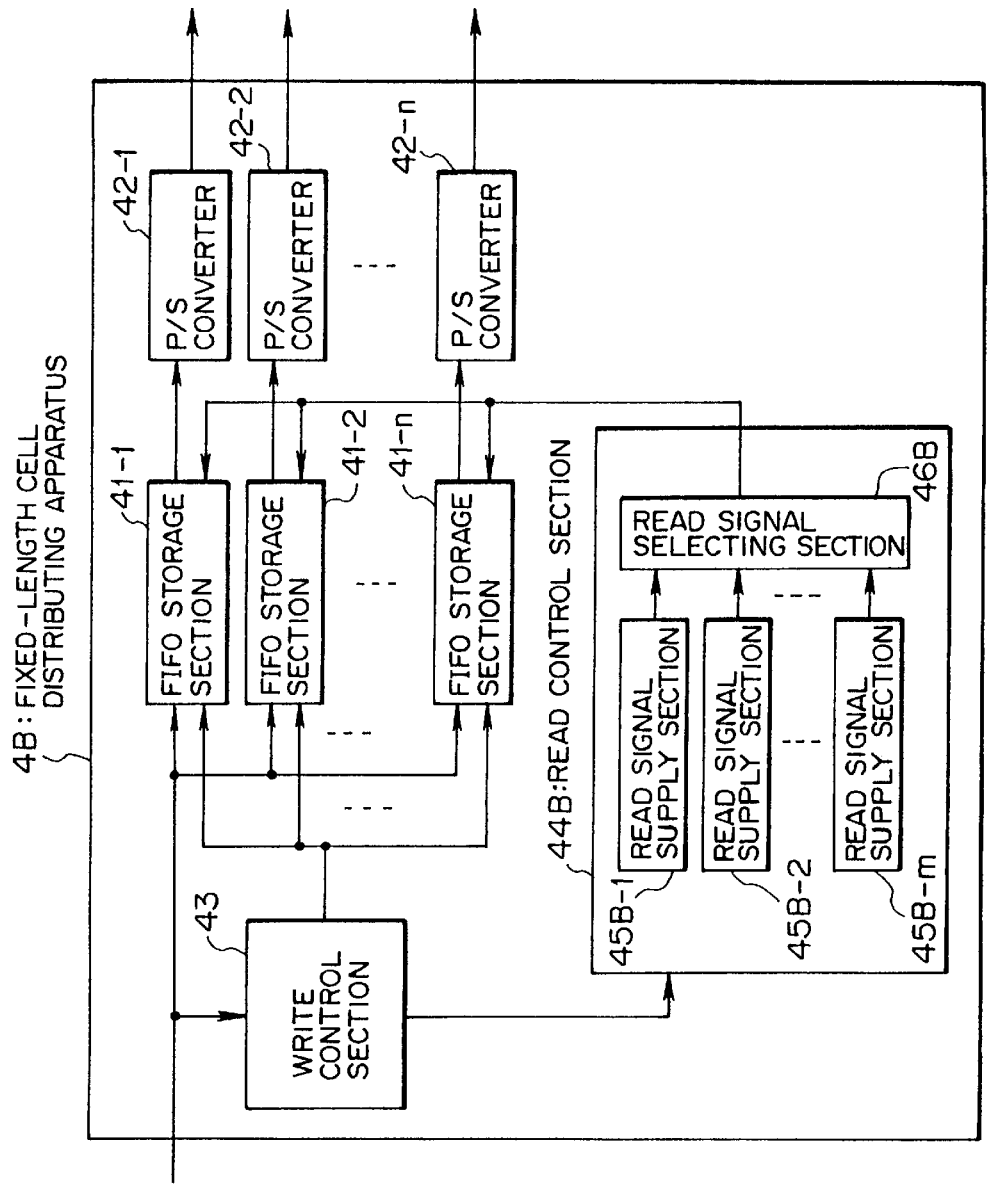
FIG. 3 is a block diagram showing still another aspect of the present invention.

FIG. 3 is a block diagram showing still another aspect of the present invention. A fixed-length cell distributing apparatus 4B shown in FIG. 3 distributes M-parallel fixed-length cell data to N ports (N>M). The fixed-length cell distributing apparatus 4B comprises the FIFO storage sections 41-1 to 41-n, the P/S converters 42-1 to 42-n, the write control section 43, and a read control section 44B.

The read control section 44B reads the fixed-length cell data from the FIFO storage sections 41-1 to 41-n. The read control section 44B comprises read signal supply sections 45B -1 to 45B-m and a read signal selecting section 46B. The read signal supply sections 45B-1 to 45B-m output signals for reading the fixed-length cells from the FIFO storage sections 41-1 to 41-n and the number of the read signal supply sections 45B-1 to 45B-m is M .

The signal selecting section 46B selects a read signal fed from the read signal supply sections 45B -1 to 45B-m and feeds the thus selected read signal to a desired one of the FIFO storage section 41-1 to 41-n.

The FIFO storage sections 41-1 to 41-n, the P/S converters 42-1 to 42-n, the write control section 43, and the empty condition detecting section 50 are respectively the same as those described with reference to FIG. 2.

Figure 4:
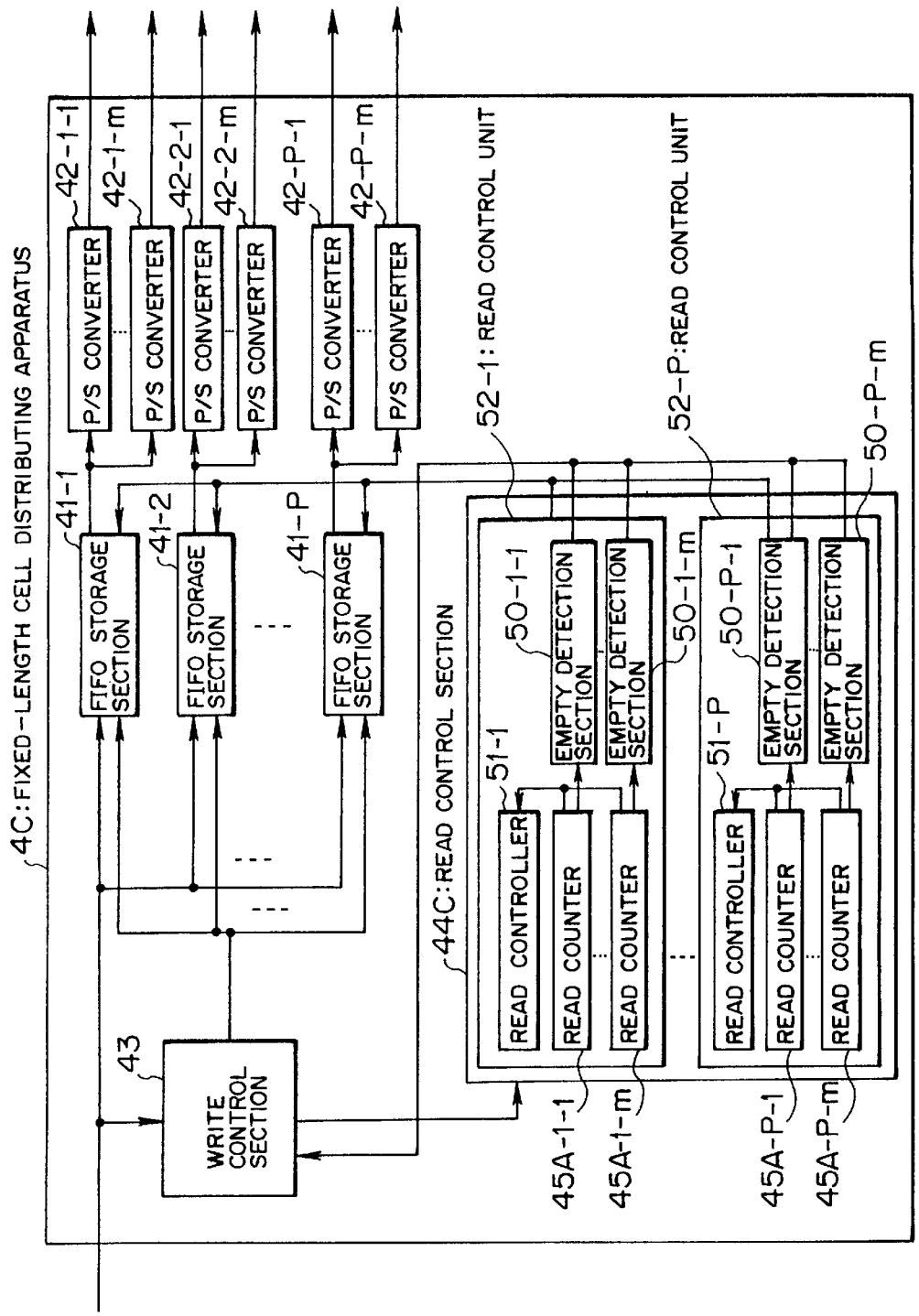
FIG. 4 is a block diagram showing still another aspect of the present invention.

FIG. 4 is a block diagram showing still another aspect of the present invention. A fixed-length cell distributing apparatus 4C shown in FIG. 4 distributes M-parallel fixed-length cell data to N ports (N>M). The fixed-length cell distributing apparatus 4C comprises the FIFO storage sections 41-1 to 41-n, P/S converters 42-1-1 to 42-1-m . . . , 42-P-1 to 42-P-m, the write control section 43, and a read control section 44C.

The FIFO storage sections 41-1 to 41-P are adapted to store therein the fixed-length cells corresponding to M ports in the order of input and to read the cells therefrom in the order of input. The number of the FIFO storage sections 41-1 to 41-P is P (P is the minimum integer greater than NIM). The P/S converters 42-1-1 to 42-1-m ..., 42-P-1 to 42-P-m, the number of which is M, are provided for each of the FIFO storage sections 41-1 to 41-P, and hence the total number of the P/S converters 42-1-1 to 42-1-m ..., 42P-1 to 42-P-m is P×M.

The read control section 44C reads the fixed-length cell data from the FIFO storage sections 41-1 to 41-P, and it is provided with read control units 52-1 to 52-P which comprise the read counters 45A-1 to 45A-m and read controllers 51-1 to 51-m. The read counters 45A-1 to 45A-m are provided output signals for reading fixed-length cell data from the FIFO storage sections 41-1 to 41-P, and the number of the read counters 45A-1 to 45A-m is M.

The read controllers 51-1 to 51-m multiplex, by time-division multiplexing, the signals for reading the fixed-length cell data at M times the speed of a signal for writing the fixed-length cell data, and they output the thus multiplexed signal to the corresponding one of the FIFO storage sections 41-1 to 41-P, while receiving a timing signals from the read counters 45A-1 to 45A-m.

The read control units 52-1 to 52-P comprise the read counters 45A-1 to 45A-m and the read controllers 51-1 to 51P, and the number of the read control units 52-1 to 52-P is P.

The write control section 43 is the same as that described with reference to FIG. 2.

The previously described fixed-length cell distributing apparatus 4C shown in FIG. 4, the read control section 44C may be provided with the empty condition detecting sections 50-1-1 to 50-1-m, . . . , 50-P-1 to 50-P-m. The empty condition detecting sections 50-1-1 to 50-P-m output a signal so as to enable the write control section 43 to write the fixed-length cell data into the FIFO storage sections 41-1 to 41-P if the FIFO storage sections 41-1 to 41-P become empty while the read counters 45A-1 to 45-m are counting up from (L+1) to (L+α).

Therefore, in the fixed-length cell distributing apparatuses 4B and 4C of the present invention, the circuit configuration related to the FIFO storage sections 41-1 to 41-n, 41-1-1 to 41-1-P can be simplified, which significantly contributes to the flexibility in constructing the system.

In the fixed-length cell distributing apparatus 4C shown in FIG. 4, the read control section 44C may be provided with N timing signal selectors 46A-1 to 46A-n which selectively output timing signals fed from the read counters 45A-1 to 45A-m, and read control units 51-1 to 51-P, the number of which is P. By receiving the timing signal selected by the timing signal selecting sections 46A-1 to 46A-n, the read control units 51-1 to 51-P multiplex, by time-division multiplexing, the signals for reading the fixed-length cell data from corresponding ones of the FIFO storage sections 41-1 to 41-P, at M times the speed of a signal for writing the fixed-length cell data, and output the thus multiplexed signal.

Hence, in the fixed-length cell distributing apparatus 4C of the present invention, the number of the FIFO storage sections 41-1 to 41-P and the number of the read counters 45A-1–45A-m are reduced compared to the number of output ports. As a result, it is possible to significantly reduce a circuit scale without changing the capability of distributing the fixed-length cell data.

Figure 5:
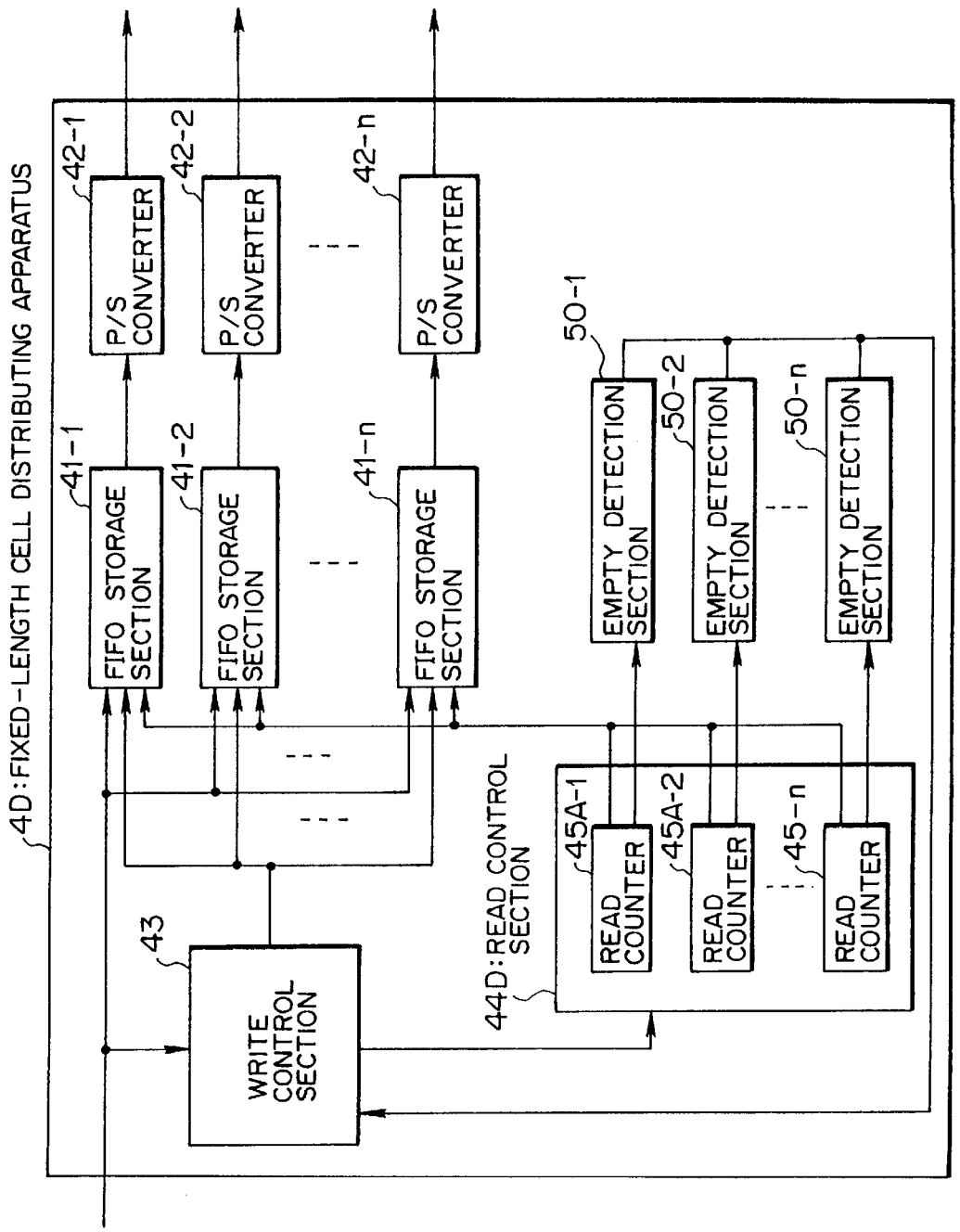
FIG. 5 is a block diagram showing still another aspect of the present invention.

FIG. 5 is a block diagram showing still another aspect of the present invention. A fixed-length cell distributing apparatus 4D also distributes the M-parallel fixed-length cell data to N ports (N>M). The fixed-length distributing apparatus 4D comprises the FIFO storage sections 41-1 to 41-n, the P/S converters 42-1-1 to 42-1-n, the write control section 43, a read control section 44D, and the empty condition detecting sections 50.

The read control section 44D reads the fixed-length cell data from the FIFO storage sections 41-1 to 41-P and inhibits the reading of the next fixed-length cell data for a predetermined period of guard time after the reading of the current fixed-length cell data. The empty condition detecting sections 50 output a signal so as to enable the write control section 43 to write the fixed-length cell data into the FIFO storage sections 41-1 to 41-P if the FIFO storage sections 41-1 to 41-P become empty during the period of guard time.

The FIFO storage sections 41-1 to 41-n, the P/S converters 42-1 to 42-n, and the write control section 43 are the same as those previously described with reference to FIG. 2.

As described above, the fixed-length cell data distributing apparatus 4D of the present invention comprises the (L+α)-counting read counters 45A-1 to 45A-n and the empty detecting section 50. The fixed-length cell to be output to each port is provided with the guard time, which makes it possible to ensure a time interval of α between the fixed-length cell data to be read. As a result, the fixed-length cell data can be easily distinguished from each other. It is possible to accept the writing of the fixed-length cell data to the FIFO storage sections 41-1 to 41-n even in the course of the guard time, which results in improved processing capability of the fixed-length cell distributing system.

(b) First Embodiment of the Invention

With reference to the drawings, a fixed-length cell multiplex transmission system according to a first embodiment of the present invention will be described.

Figure 6:
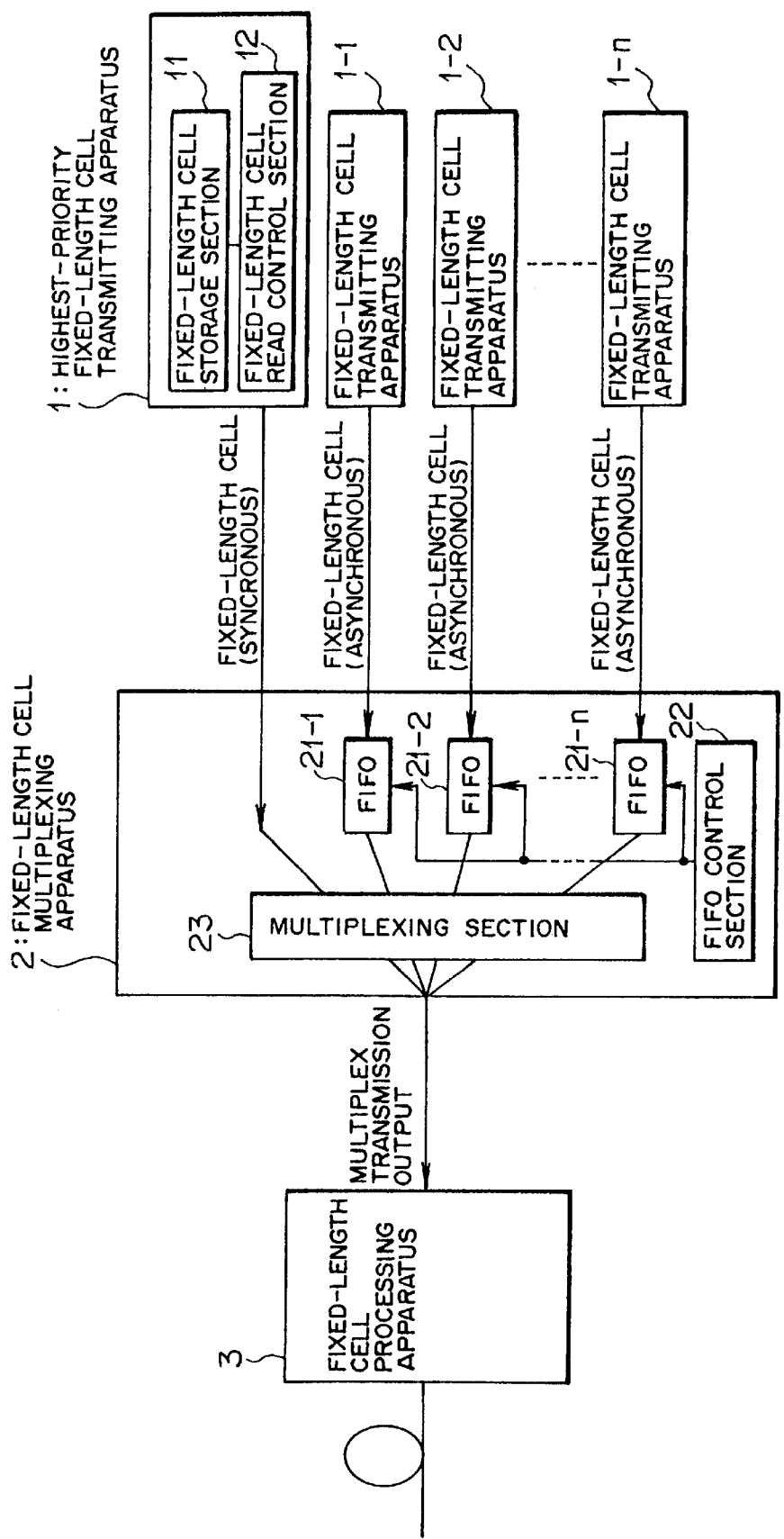
FIG. 6 is a block diagram showing the configuration of a fixed-length cell multiplex system according to a first embodiment of the present invention.

FIG. 6 is a block diagram showing the configuration of a fixed-length cell multiplex system according to a first embodiment of the present invention. The fixed-length cell multiplex system shown in FIG. 6 comprises a highest-priority fixed-length cell transmitting apparatus 1, fixed-length cell transmitting apparatuses 1-1 to 1-n, a fixed-length cell multiplexing apparatus 2, and a fixed-length cell processing apparatus 3.

Each of the fixed-length cell transmitting apparatuses 1-1 to 1-n asynchronously sends a fixed-length cell to the fixed-length cell multiplexing apparatus 2. The highest-priority fixed-length cell transmitting apparatus 1 sends a fixed-length cell to be sent most preferentially. This highest-priority fixed-length cell transmitting apparatus 1 sends the fixed-length cells to the fixed-length cell multiplexing apparatus 2 in synchronism with the internal frames each corresponding to a single fixed-length cell.

The fixed-length cell multiplexing apparatus 2 multiplexes the fixed-length cells received from the fixed-length cell transmitting apparatuses 1-1 to 1-n and outputs the thus multiplexed cells. The fixed-length cell multiplexing apparatus 2 comprises the FIFO storage sections (FIFO) 21-1 to 21-n, the FIFO control section 22, and the multiplexing section 23. The FIFO storage sections 21-1 to 21-n are adapted to store therein the fixed-length cells asynchronously sent from the fixed-length cell transmitting apparatuses 1-1 to 1-n in the order of reception, and to read the cells therefrom in the order of reception. The multiplexing section 23 directly outputs the fixed-length cell received from the highest-priority fixed-length cell transmitting apparatus 1 without storing it. Also, the multiplexing section 23 outputs the fixed-length cells, which are stored in the FIFO storage sections 21-1 to 21-n after having been received from the fixed-length cell transmitting apparatuses 1-1 to 1-n other than the highest-priority fixed-length cell transmitting apparatus 1, at a timing other than the timing at which the highest-priority fixed-length cell transmitting apparatus 1 outputs (i.e., the timing in synchronism with the internal frame of the highest-priority fixed-length cell transmitting apparatus 1). The FIFO control section 22 controls the writing of the fixed-length cells into, and the reading of the same from, the plurality of FIFO storage sections 21-1 to 21-n.

To this end, in addition to the above described configuration, the fixed-length cell multiplexing apparatus 2 further comprises fixed-length cell detecting sections 217-1 to 217-n and write counters 218-2 to 218-n, the number of which corresponds to the number of the FIFO storage sections 21-1 to 21-n. These write counters 218-2 to 218-n are omitted from FIG. 16.

The fixed-length cell detecting sections 217-1 to 217n detect the fixed-length cells sent from the fixed-length cell transmitting apparatuses 1-1 to 1-n, and hence they are disposed so as to respectively correspond to the fixed-length cell transmitting apparatuses 1-1 to 1-n. The fixed-length cell detecting sections 217-1 to 217-n are designed so as to notify the read counters 218-1 to 218-n of the input of the fixed-length cell data by means of an enable signal, and the like.

Each of the read counters 218-1 to 218-n outputs an address of corresponding one of the FIFO storage sections 21-1 to 21-n, to which the input cell is to be written, to the corresponding one of the FIFO storage sections 21-1 to 21-n in response to the enable signal received from the fixed-length cell detecting sections 217-1 to 217-n. Further, the read counters 218-1 to 218-n output a cell write termination signal to the FIFO control section 22.

The multiplexing section 23 comprises selectors 23A and 23B. The selector 23A selectively outputs an input cell in accordance with the select signal from the FIFO control section 22. As a result, the fixed-length cells, which are stored in the FIFO storage sections 21-1 to 21-n after having been received from the fixed-length cell transmitting apparatuses 1-1 to 1-n other than the highest-priority fixed-length cell transmitting apparatus 1, are output with a timing other than the timing at which the highest-priority fixed-length cell transmitting apparatus 1 outputs. The selector 23B selectively outputs the highest-priority fixed-length cell received from the highest-priority fixed-length cell transmitting apparatus 1 and the first-arrival fixed-length cell received from the selector 23A, in response to a select signal for outputting the highest-priority fixed-length cell, thereby multiplexing the above two kinds of cells by time-division multiplexing. For example, it is assumed that the highest-priority fixed-length cell in synchronism with the internal frame of the highest-priority fixed-length cell transmitting apparatus 1, as shown in FIG. 17(c), is selected by a select signal as shown in FIG. 17(d), whereby the thus selected cell is output. In addition, it is assumed that the highest-priority fixed-length cell data are not input (i.e., when the previously described select signal is the L-level). Under these circumstances, the fixed-length cells are selectively output from the FIFO storage sections 21-1 to 21-n.

The fixed-length cell processing apparatus 3 carries out desired processing with respect to the fixed-length cells upon receipt of the multiplexed cells from the fixed-length cell multiplexing apparatus 2.

Figure 8:
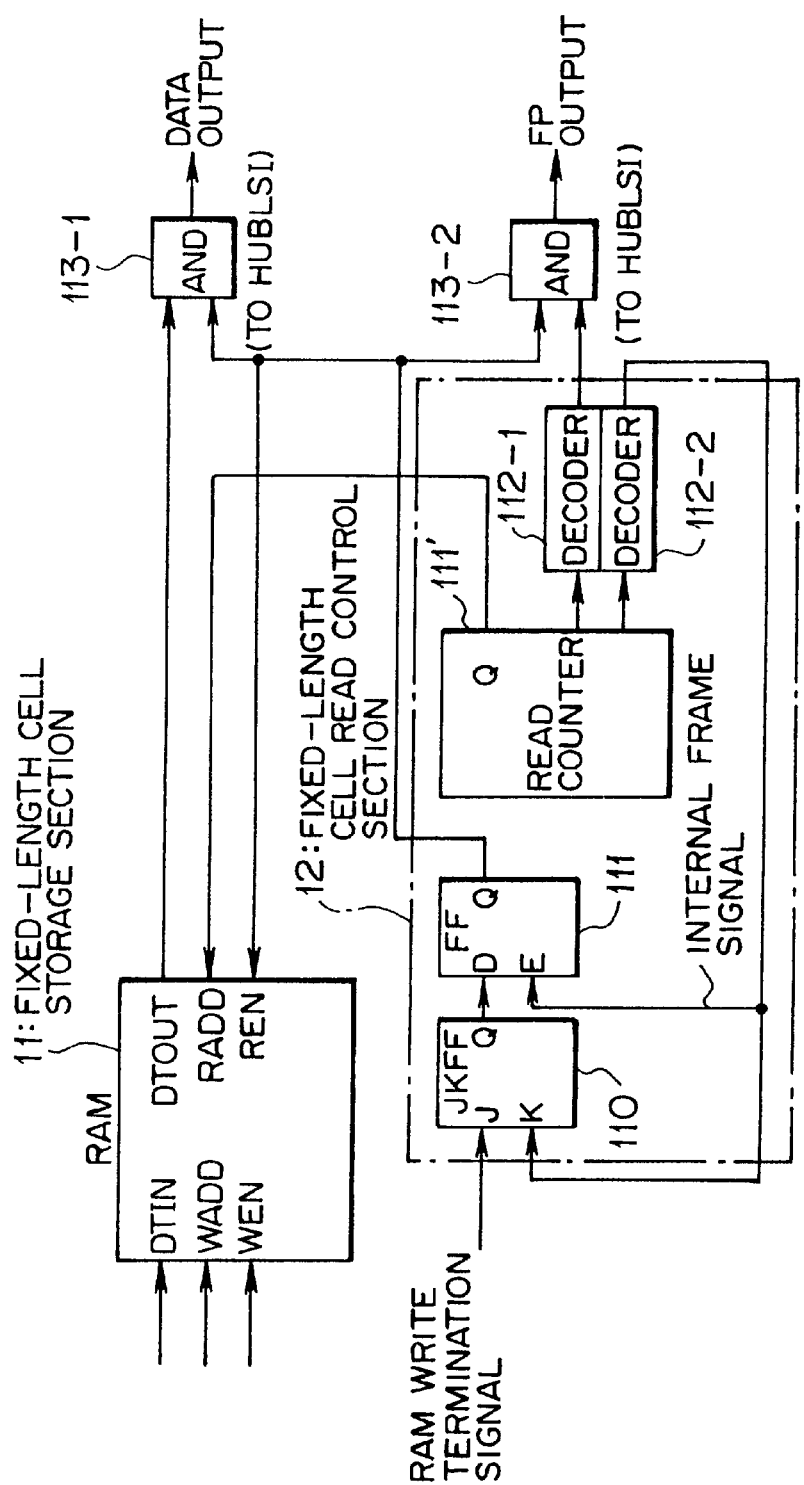
FIG. 8 is a diagram showing the internal configuration of a highest-priority fixed-length cell transmitting apparatus according to the first embodiment of the present invention.

The previously described highest-priority fixed-length cell transmitting apparatus 1 comprises a fixed-length cell storage section (RAM) 11 and a fixed-length cell read control section 12, as shown in FIG. 6. Further, as shown in FIG. 8, the fixed-length cell read control section 12 comprises a JK flip-flop (JK-FF) circuit 110, a flip-flop (FF) circuit 111, a read counter 111', and decoders 112-1 and 112-2. Reference numerals 113-1 and 113-2 denote AND circuits, respectively.

The fixed-length cell storage section 11 stores the input highest-priority fixed-length cell data, and the fixed-length cell read control section 12 reads the fixed-length cell data from the fixed-length cell storage section 11 in synchronism with the internal frames each corresponding a single fixed-length cell.

When the RAM write termination signal, which is output when the fixed-length cell data are written into the fixed-length cell storage section 11, is switched to the H-level, and, subsequently, an output signal (an internal frame signal) of a decoder 112-2 is switched to the H-level, the JK flip-flop circuit 110 maintains its H-level output thereafter. If the output of the decoder 112-2 is switched to the H-level while the output of the JK flip-flop 110 is the H-level, an output of the flip-flop circuit 111 is switched to the L-level. By virtue of the output from the flip-flop circuit 111, the cell data are read from the fixed-length cell storage section 11 during the interval between the first internal frame pulse and the second internal frame pulse after the RAM write termination signal has been received.

The read counter 111' cyclically generates an address (a read address) of the cell data to be read from the fixed-length cell storage section 11, and outputs the thus generated address to the fixed-length cell storage section 11. Further, the read counter 111' outputs a count value corresponding to the output address to each of the decoder 112-1 and 112-2.

The decoder 112-1 and 112-2 decode the count value received from the read counter 111'. The count value decoded by the decoder 112-2 is fed back to the JK flip-flop circuit 110 and the flip-flop circuit 111 as the internal frame signal.

The AND circuits 113-1 and 113-2 respectively carry out a logical AND operation for the input signals. The AND circuit 113-1 carries out a logical AND operation for the fixed-length cell data received from the fixed-length cell storage section 11 and an FF process signal received from the flip-flop circuit 111. As a result, the cell data are output to the fixed-length cell multiplexing apparatus 2 while the FF processing signal is the H-level. On the other hand, the AND circuit 113-2 carries out a logical AND operation for signals received from the decoder 112-1 and the FF process signal received from the flip-flop circuit 111. As a result, a frame pulse signal is output to the fixed-length cell multiplexing apparatus 2.

Figure 9:
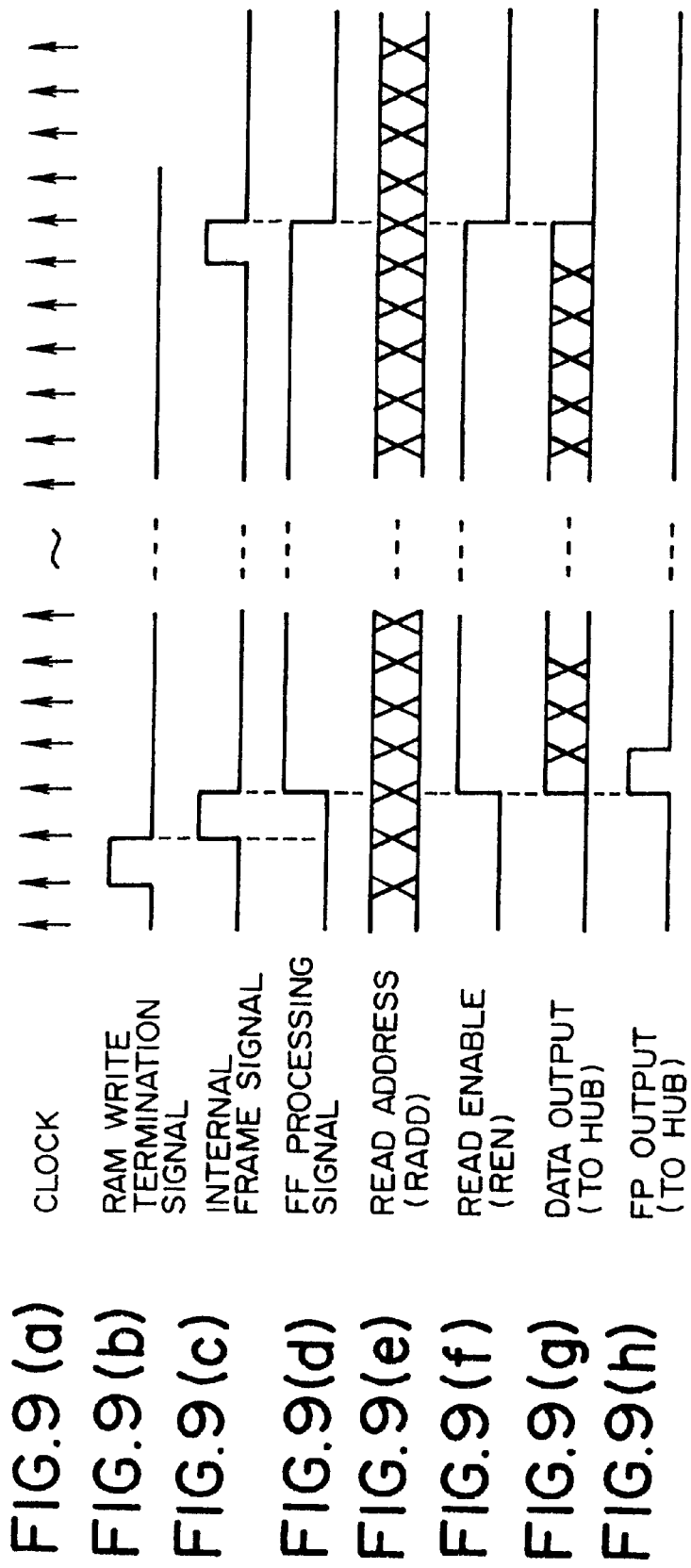
FIGS. 9(a) to 9(h) are timing charts for explaining the operation of the highest-priority fixed length cell transmitting apparatus according to the first embodiment of the present invention.

For example, if the fixed-length cell data are input (written) into the fixed-length cell storage section 11 of the highest-priority fixed-length cell transmitting apparatus 1, the RAM write termination signal (a H-level pulse signal) is input to the JK flip-flop circuit 110, as shown in FIG. 9(b). When the JK flip-flop circuit 110 receives the internal frame signal (the H-level pulse signal) from the flip-flop circuit 111 via the decoder 1122, as shown in FIG. 9(c), after receipt of the RAM write termination signal, the JK flip-flop circuit 110 stores its H-level output, whereby the output from the flip-flop circuit 111 also is switched to the H-level, as shown in FIG. 9(d). In the end, a read enable signal is input to the fixed-length cell storage section 11 (see FIG. 9(f)).

As a result of this, the cell data corresponding to the address received from the read counter 111' are sequentially read from the fixed-length cell storage section 11 in accordance with clock signals as shown in FIG. 9(a) (see FIG. 9(g)). At this time, the AND circuit 113-2 outputs such a signal as shown in FIG. 9(h) as a frame pulse for use in the fixed-length cell multiplexing apparatus 2 in synchronism with a leading edge of the output from the flip-flop circuit 111.

Figure 7:
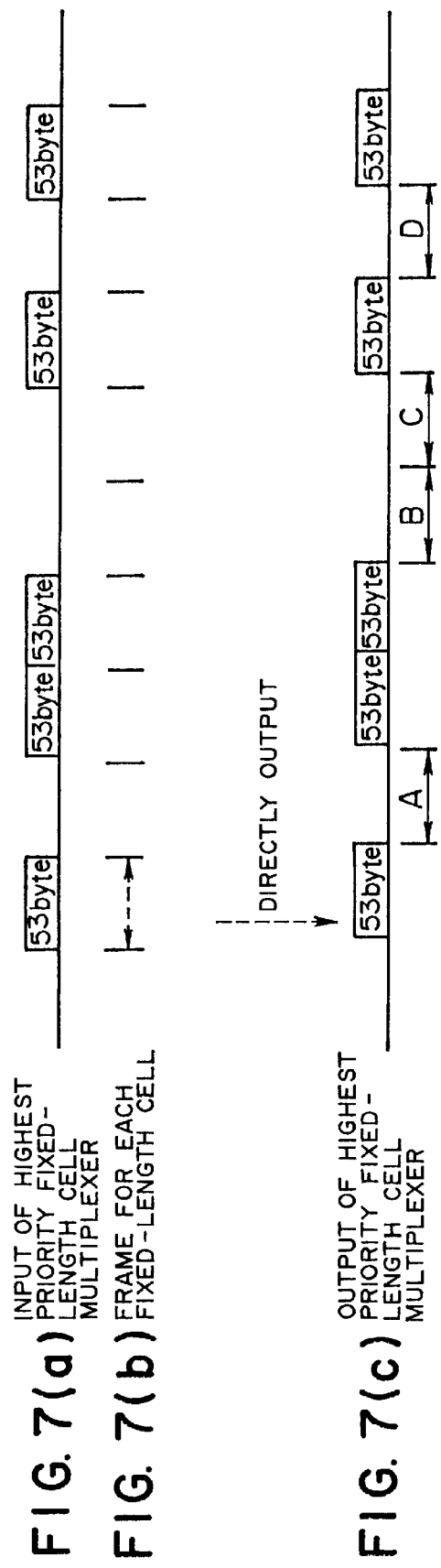
FIGS. 7(a) to 7(c) are timing charts for explaining the multiplex transmission of the highest-priority fixed-length cell and another fixed-length cell according to the first embodiment of the present invention.

Accordingly, for example, the highest-order fixed-length cell (which is 53 bytes long) is output to the fixed-length cell multiplexing apparatus 2 from the previously described highest-priority fixed-length cell transmitting apparatus 1 in synchronism with the internal frame of the highest-priority fixed-length cell transmitting apparatus 1, as shown in FIGS. 7(a) and 7(b). As a result, the interval between the highest-order fixed-length cells which are directly output to the fixed-length cell multiplexing apparatus 2 becomes constant (i.e., an integral multiple of 53 bytes), as designated by A, B, C, and D in FIG. 7(c). The fixed-length cells output from the fixed-length cell transmitting apparatuses 1-1 to 1-n are sequentially inserted in the interval between the highest-order fixed-length cells under the control of the FIFO control section 22, and the thus inserted fixed-length cells are processed by the fixed-length cell multiplexing apparatus 2 by time-division multiplexing. Then, the thus multiplexed cell is output together with the highest-order fixed-length cell.

Figure 10:
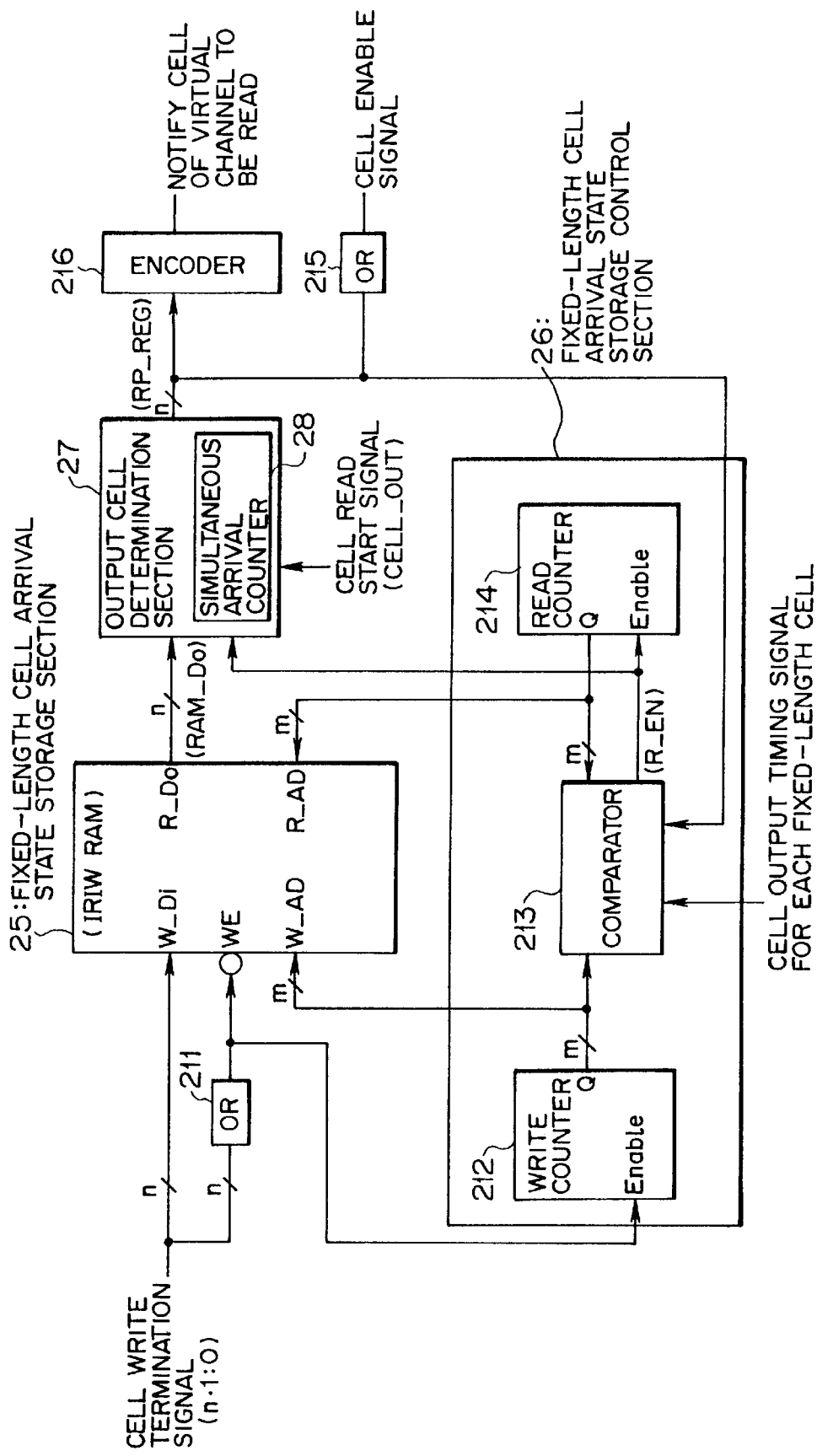
FIG. 10 is a block diagram showing the internal configuration of an FIFO control section according to the first embodiment of the present invention.

FIG. 10 is a block diagram showing the internal configuration of the previously described FIFO control section 22. As shown in FIG. 10, the FIFO control section 22 comprises a fixed-length cell arrival state storage section (RAM) 25, a fixed-length cell arrival state storage control section 26, an output cell determination section 27, OR circuits 211 and 215, and an encoder 216.

The fixed-length cell arrival state storage section 25 simultaneously stores the arrival conditions of the fixed-length cells sent from the fixed-length cell transmitting apparatuses 1-1 to 1-n, and it is capable of simultaneously carrying out writing and reading operations (i.e., the fixed-length cell arrival state storage section 25 is a dual port memory). The fixed-length cell arrival state storage control section 26 writes the arrival state of the fixed-length cell into the fixed-length cell arrival state storage section 25 when the fixed-length cell arrives from any one of the fixed-length cell transmitting apparatuses 1-1 to 1-n, as well as reading the arrival indicating signal from the fixed-length cell arrival state storage section 25 in response to a predetermined read request signal. The fixed-length cell arrival state storage control section 26 comprises a write counter 212, a comparator 213, and a read counter 214.

Figure 11:
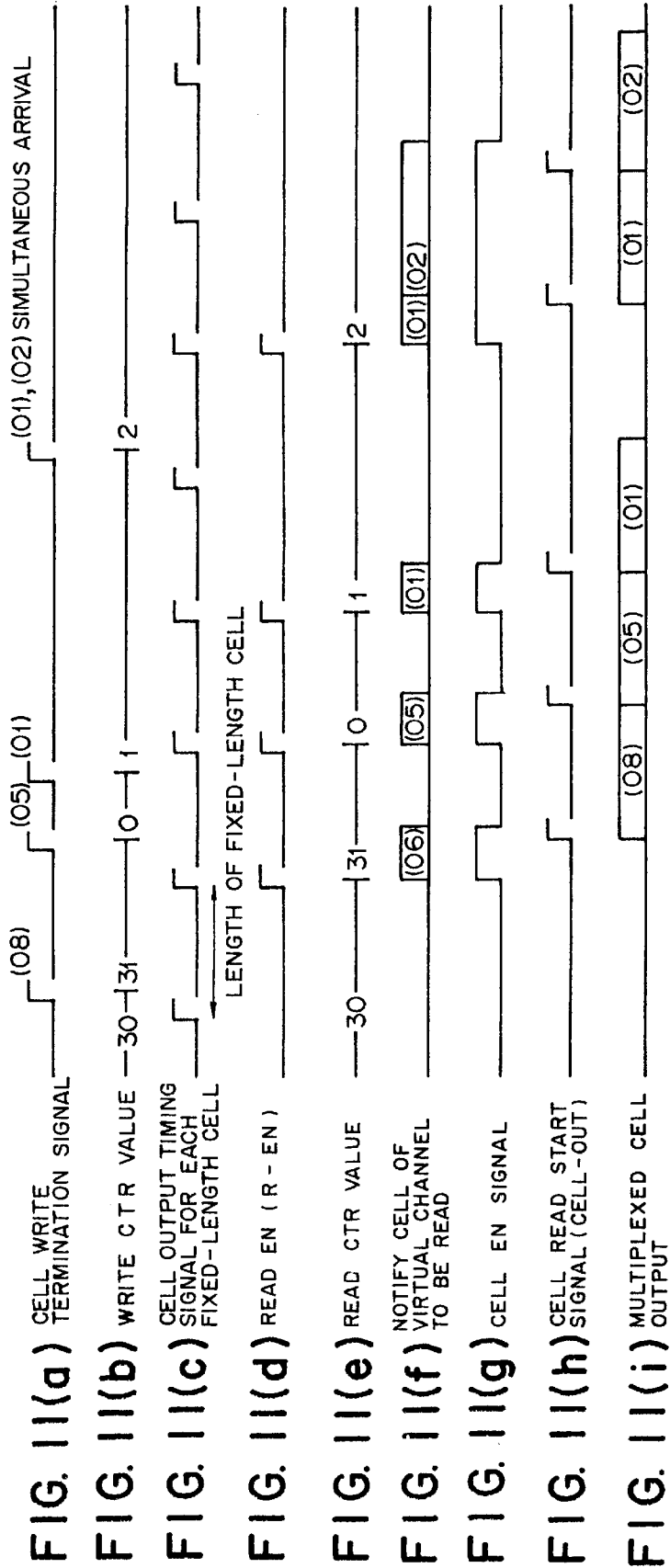
FIGS. 11(a) to 11(i) are timing charts for explaining the operation of the FIFO control section according to the first embodiment of the present invention.

When a signal (i.e., a cell write terminal signal), which represents the completion of the writing of the fixed-length cell into the FIFO storage sections 21-1 to 21-n, is input to the write side of the fixed-length cell arrival state storage section 25 as shown in FIG. 11(a) (W-Di), the write counter 212 increments its count value in response to the enable signal output via the OR circuit 211. The write counter 212 is arranged so as to count up every time the cell write termination signal is input to the fixed-length cell arrival state storage section 25, as shown in FIG. 11(b). The output from this write counter 212 is used as a write address (W-AD) signal for use in the fixed-length cell arrival state storage section 25, as well as being compared with the count value read from the read counter 214 by the comparator 213.

Figure 12:
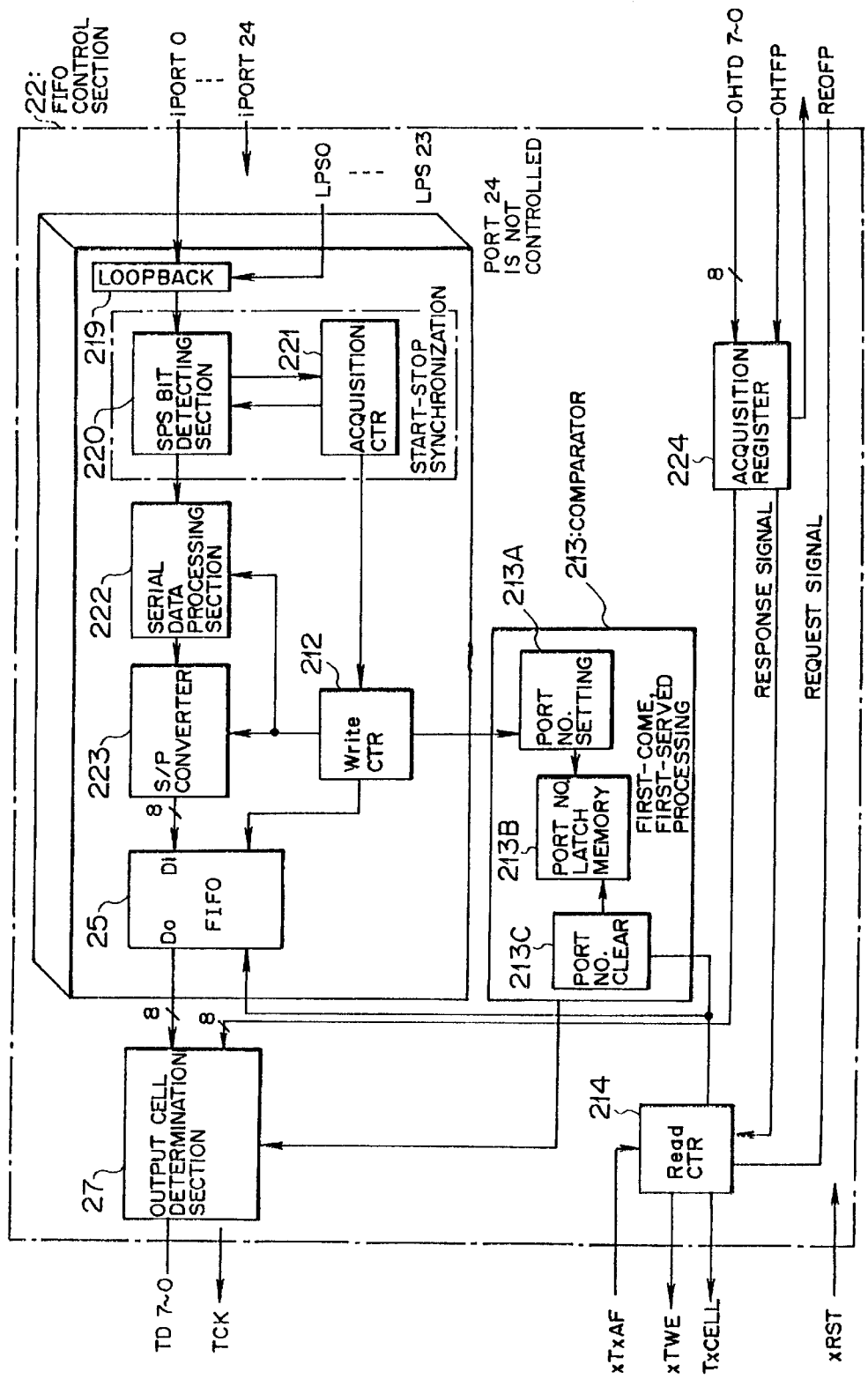
FIG. 12 is a block diagram showing the detailed configuration of the FIFO control section according to the first embodiment of the present invention.

The comparator 213 compares the write count value received from the write counter 212 (see FIG. 11(b)) with the count value read from the read counter 214 (see FIG. 11(e)) in synchronism with output timing of each fixed-length cell as shown in FIG. 11(c). If the count values are different from each other (specifically, if the write count value is larger than the read count value), an enable (R-EN) signal is output to the read counter 214 so as to increment the count value of the read counter 214, thereby reading the data (the data indicating the order of arrival) from the fixed-length cell arrival state storage section 25. The comparator 213 comprises, for example, a port number setting (a port No. setting) section 213A, a port number latch (port No. latch memory) 213B, and a port number cancel (a port No. clear) section 213C, as shown in FIG. 12.

The write count value received from the write counter 212 is written into the port number setting section 213A for each port. The port number latch memory 213B stores information (i.e., a port number) received from the port number setting section 213A. The port number clear 213C clears the information (i.e., the port number) held in the port number latch memory 213B. When the fixed-length cell arrival state storage section 25 receives an address for reading the arrival order data from the read counter 214, the port number clear 213C clears the corresponding port number information.

The read counter 214 generates the read count value on the basis of the enable signal output from the comparator 213, as shown in FIG. 11(e). The read counter 214 sends the thus generated read count value back to the comparator 213 as a count value to be compared with the next write count value. Further, the read counter 214 outputs a read address (R-AD) signal to the fixed-length cell arrival state storage section 25.

When the arrival states (i.e., the arrival order data) of the fixed-length cells received from the fixed-length cell transmitting apparatuses 1-1 to 1-n are read from the fixed-length cell arrival state storage section 25, the output cell determination section 27 determines one of the FIFO storage sections 21-1 to 21-n from which a fix-length cell is to be read. To this end, as shown in FIG. 10, the output cell determination section 27 is provided with a simultaneous arrival counter 28.

The output cell determination section 27 reads data regarding a virtual channel (a port number) to be read, as shown in FIG. 11(f), in response to a cell read start signal (CELL-OUT) as shown in FIG. 11(h). The output cell determination section 27 then outputs the thus read data to the multiplexing section 23 (i.e., the selector 23A; see FIG. 16) via the encoder 216. Further, the output cell determination section 27 detects a cell enable signal as shown in FIG. 11(g) and outputs the thus detected cell enable signal to the multiplexing section 23 by way of the OR circuit 215.

The simultaneous arrival counter 28 increments its count value when the fixed-length cells have simultaneously arrived at the fixed-length cell multiplexing apparatus from the plurality of fixed-length cell transmitting apparatuses 1-1 to 1-n. The OR circuits 211 and 215 carry out logical OR operations for the input signals. The encoder 216 encodes arrival state data (RP-REG) output from the output cell determination section 27.

In addition to the previously described elements, the FIFO control section 22 comprises a loopbag circuit 219, an SPS bit detecting section 220, an acquisition counter 221, a serial data processing section 222, and a serial/parallel (S/P) converter 223, as shown in FIG. 12. The loopbag circuit 219 forms a ring and receives only serial data which agree with specified conditions. The SPS bit detecting section 220 detects a start bit, a parity bit, and a stop bit.

The acquisition counter 221 controls the write counter 212 in synchronism with the positions where the start bit, the parity bit, and the stop bit are detected. The serial data processing section 222 carries out required processing with respect to the serial data, from which the start bit, the parity bit, and the stop bit have been detected, on the basis of the information received from the write counter 212. The resultant data are output to the S/P converter 223. The S/P converter 223 converts the fixed-length cell data (i.e., the serial data) into parallel data.

The operation of the above described FIFO control section 22 will now be described in detail with reference to FIGS. 13 to 15.

When the arrival of the fixed-length cell at the fixed-length cell multiplexing apparatus 2 from the fixed-length cell transmitting apparatuses 1-1 to 1-n is detected, the FIFO control section 22 sets a bit corresponding to a virtual channel number with regard to the arrived cell (a port number of, e.g., "08") [i.e., the bit is set to H] at a memory location in the fixed-length cell arrival state storage section 25 addressed by an address (Address α) received from the read counter 214, as shown in FIG. 13(a). As a result, the data indicating the order in which the cells have arrived are stored in the fixed-length cell arrival state storage section 25.

Similarly, the FIFO control section 22 sequentially counts up the address (Address β→ γ→δ) received from the write counter 212 for the following cells, so as to change the address of the fixed-length cell arrival state storage section 25 to which the arrival order data are to be written, and to set a bit at the corresponding virtual channel numbers, as shown in FIG. 13(a). The arrival state of each cell is then stored in the fixed-length cell arrival state storage section 25. If more than two cells concurrently arrive at the fixed-length cell multiplexing apparatus, bits are set in all of the corresponding virtual channels as shown, e.g., in the row of Address δ in FIG. 13(a).

Every time the writing operation is completed, the FIFO control section 22 sequentially counts up the count values (the addresses) of the read counter 214 by means of the enable signal output from the comparator 213. As a result, the virtual channel number of a cell to be read is notified to the output cell determination section 27, as shown in FIG. 13(b). If more than two bits are set at one address (Address γ) as previously described, the simultaneous arrival counter 28 in the output cell determination section 27, for example, increments its count value (the address). Then, the arrival order data for a smaller virtual channel number are output first, as shown in FIG. 13(b).

Figure 14:
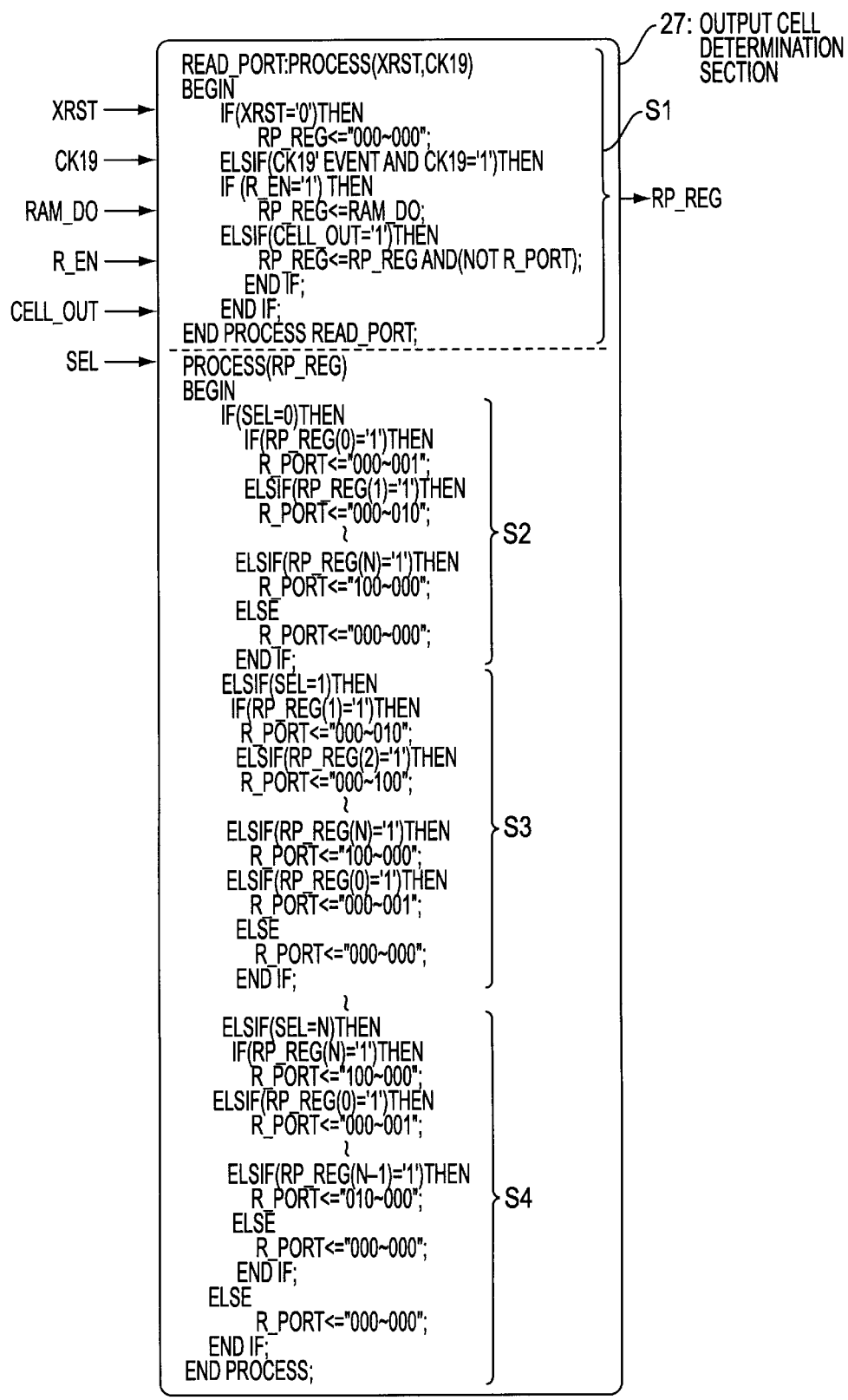
FIG. 14 is a program list for explaining a method of determining a priority of a fixed-length cell in an output cell determination section according to the first embodiment of the present invention.

FIG. 14 is a program list for explaining the operation of the output cell determination section 27. As shown in FIG. 14, the output cell determination section 27 determines the cell to be output on the basis of an initial value (XRST), an internal clock (CK19) of the fixed-length cell transmitting apparatuses 1-1 to 1-n, the fixed-length cell data (RAM-D0) received from the fixed-length cell arrival state storage section 25, the read enable signal (R-EN) received from the comparator 203, a cell read start signal (CELL-OUT) input from the outside, and a select signal (SEL) which selects the simultaneously sent fixed-length cell in accordance with the priority.

That is, the output cell determination section 27 initializes the arrival order data to be output to "000–000", by performing initializing processing such that an initial value=0, an internal clock=1, a read enable signal=1, and a cell read start signal=1, for example, (step S1).

Then, for example, 0 is input from the outside as a select signal for specifying the priority of the fixed-length cell, so that the virtual channel numbers are arranged in the order of 0, 1, . . . , n. Then, the order of the arrival order data to be output is set to "000–001", "000–010", . . . , "100–000" (step S2).

On the assumption that the input select signal is 1, the virtual channel numbers are arranged in the order of 1, 2, . . . , n, 0. As a result, the arrival order data to be output is set to "000–010", "000–100", . . . , "100–000", "000–001" (step S3). The arrival order data to be output are sequentially determined until the select number becomes "n" (step S4).

Figure 15:
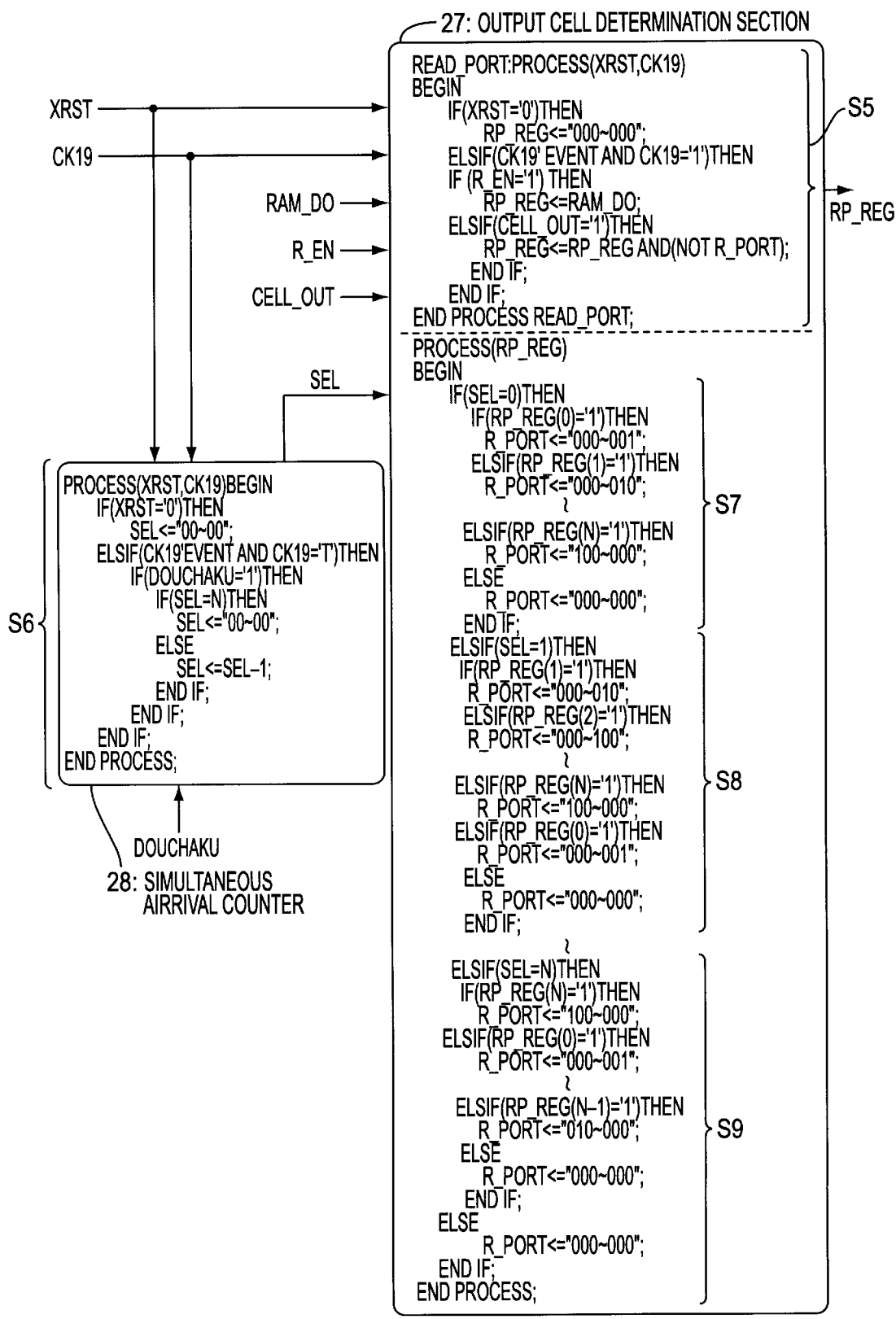
FIG. 15 is a program list for explaining another method of determining a priority of a fixed-length cell in the output cell determination section according to the first embodiment of the present invention.

In the processing of the previously described output cell determination section 27, it is possible to change the priorities of the arrival order data to be output by sequentially changing the value of the select signal (SEL) using the simultaneous arrival counter 28, as shown in FIG. 15.

In this case, the output cell determination section 27 initializes the output start positions of the arrival order data to be output to "000–000", by performing initializing processing such that an initial value=0, an internal clock=1, a read enable signal=1, and a cell read start signal=1, for example, (step S5). Every time more than two cells simultaneously arrive at the fixed-length cell multiplexing apparatus 2, the simultaneous arrival counter 28 increments the select signal which determines the output start position of the arrival order data, and the thus incremented select signal is input to the output cell determination section 27 (step S6). In consequence, the output start positions of the arrival order data to be output, are equally changed with respect to all of the virtual channel numbers (steps S7 to S9).

(b1) Modification of First Embodiment

Figure 18:
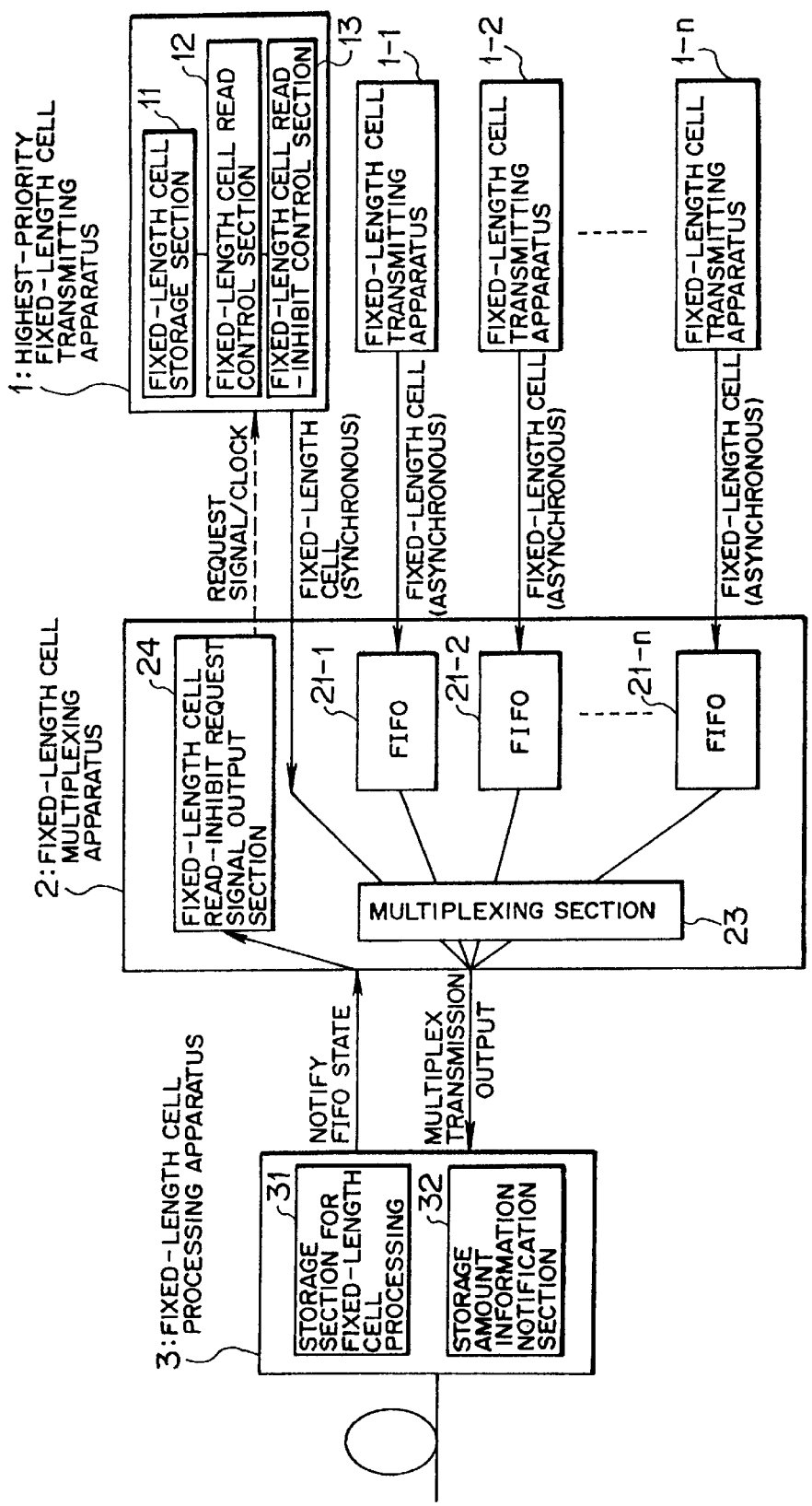
FIG. 18 is a block diagram showing a modification of the fixed-length cell multiplex transmission apparatus according to the first embodiment of the present invention.

FIG. 18 is a block diagram showing a modification of the fixed-length cell multiplex transmission system according to the first embodiment of the present invention. The fixed-length cell multiplex transmission system shown in FIG. 18 comprises the units 1, 1-1–1-n, 2, and 3 having the same functions as the units previously described with reference to FIG. 6. In addition, the highest-priority fixed-length cell transmitting apparatus 1 comprises a fixed-length cell read-inhibit control section 13, the fixed-length cell multiplexing apparatus 2 comprises a fixed-length cell read-inhibit request signal output section 24. Further, the fixed-length cell processing apparatus 3 comprises a storage section 31 for fixed-length cell processing and storage amount notification section 32.

The fixed-length cell read-inhibit control section 13 of the highest-priority fixed-length cell transmitting apparatus 1 inhibits the control performed by the fixed-length cell read control section 12 when it is judged, based on the storage amount information received from a storage amount information notification section 32 of the fixed-length cell processing apparatus 3, that the storage amount of a storage section 31 for fixed-length cell processing is in excess of a predetermined storage amount, i.e., the received side which receives cells from the fixed-length cell multiplexing apparatus 2 is in a congested state. As a result, it is possible to mitigate the traffic of the fixed-length cell processing apparatus 3.

Figure 22:
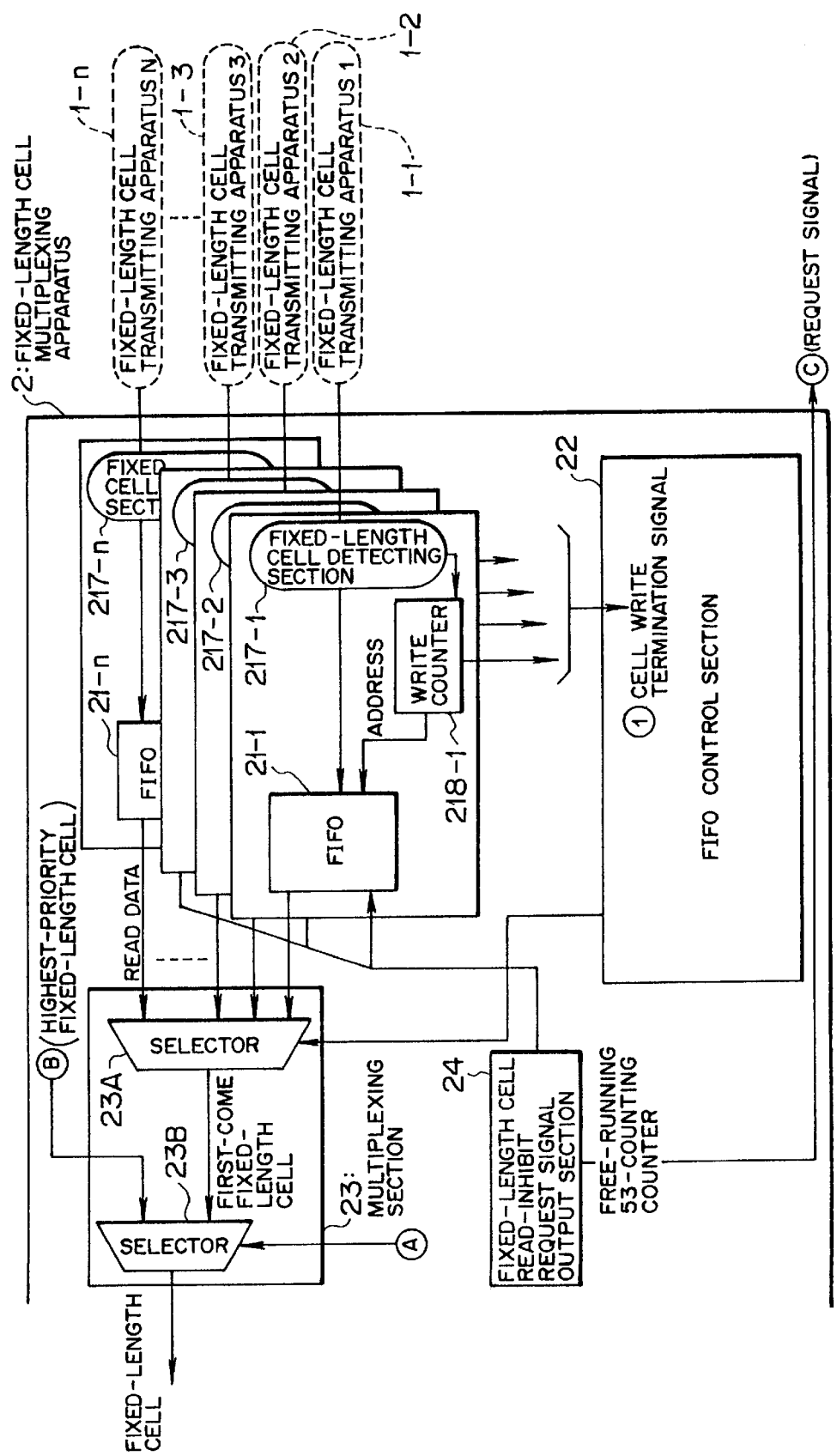
FIG. 22 is a block diagram for explaining a method of controlling FIFO storage sections carried out by the FIFO control section according to a modification of the first embodiment of the present invention.

The fixed-length cell read-inhibit request signal output section (a request signal output section) 24 of the fixed-length cell multiplexing apparatus 2 repeatedly outputs a request signal to the highest-priority fixed-length cell transmitting apparatus 1 in order to read and output the highest-order fixed-length cells at predetermined intervals. The fixed-length cell read-inhibit request signal output section 24 outputs a fixed-length cell read-inhibit request signal to the fixed-length cell read-inhibit control section 13 of the highest-priority fixed-length cell transmitting apparatus 1 if it is judged, based on the storage amount information received from the storage amount information notification section 32, that the storage amount of the storage section for fixed-length cell processing is in excess of a predetermined storage amount. As a result, it becomes possible to control the traffic in the fixed-length cell processing apparatus 3. Further, in this modification of the embodiment, a 53-counting counter is used as the fixed-length cell read-inhibit request signal output section 24, as shown in FIG. 22.

The storage section 31 for fixed-length cell processing of the fixed-length cell processing apparatus 3 sequentially stores the multiplexed output fed from the fixed-length cell multiplexing apparatus 2. The storage amount information notification section 32 notifies the fixed-length cell read-inhibit request signal output section 24 of the information regarding the storage amount of the storage section 31 for fixed-length cell processing.

Figure 19:
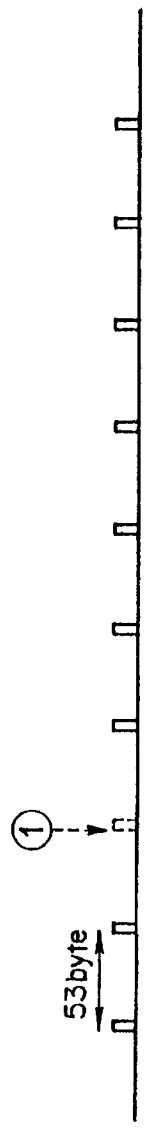
FIGS. 19(a) to 19(d) are timing charts for explaining the multiplex transmission of the highest-priority fixed-length cell and another fixed-length cell according to the modification of the first embodiment of the present invention.

With this arrangement, the request signal is sent from the fixed-length cell read-inhibit request signal output section 24 of the fixed-length cell multiplexing apparatus 2 to the highest-priority fixed-length cell transmitting apparatus 1 in each predetermined period (which is 53 bytes long) in the previously described system, as shown in FIG. 19(a). As a result, the highest-order fixed-length cell is read from the fixed-length cell storage section 11 in synchronism with the request signal. Then, the highest-order fixed-length cell is sent to the fixed-length cell multiplexing apparatus 2 in accordance with the frame pulses from the fixed-length cell read control section 12, as shown in FIGS. 19(b) and 19(c). At this time, if the storage amount of a storage section 31 for fixed-length cell processing of the fixed-length cell processing apparatus 3 is in excess of a predetermined storage amount, that is, if the fixed-length cell multiplexing apparatus 2 has congestion, the fixed-length cell read-inhibit request signal output section 24 of the fixed-length cell multiplexing apparatus 2 is notified of the congestion by the FIFO control section 22.

In response to this notification, the fixed-length cell multiplexing apparatus 2 stops the transmission of the request signal, as designated by ① in FIG. 19(a). The highest-priority fixed-length cell transmitting apparatus 1 is notified so as to inhibit the fixed-length cell read control section 12 from reading the highest-order fixed-length cell. As a result, the fixed-length cell read-inhibit control section 13 of the highest-priority fixed-length cell transmitting apparatus 1 inhibits the fixed-length cell read control section 12 from reading the cell.

Consequently, the highest-order fixed-length cell is not input to the fixed-length cell multiplexing apparatus 2, as shown by a dotted line in FIG. 19(c). Specifically, the fixed-length cell to be processed in the fixed-length cell processing apparatus 3 is deemed as exceeding the predetermined storage amount, and hence the highest-order fixed-length cell is not input at this position.

Even in this case, the interval between the highest-order fixed-length cells which are directly output to the fixed-length cell multiplexing apparatus 2 becomes constant (a multiple integer of 53 bytes) (A, B, C, and D), as shown in FIG. 19(d). The other fixed-length cells are sequentially inserted into that interval between the highest-order fixed-length cells, and they are processed by time-division multiplexing. The thus multiplexed cells are sent together with the highest-order fixed-length cell.

Figure 20:
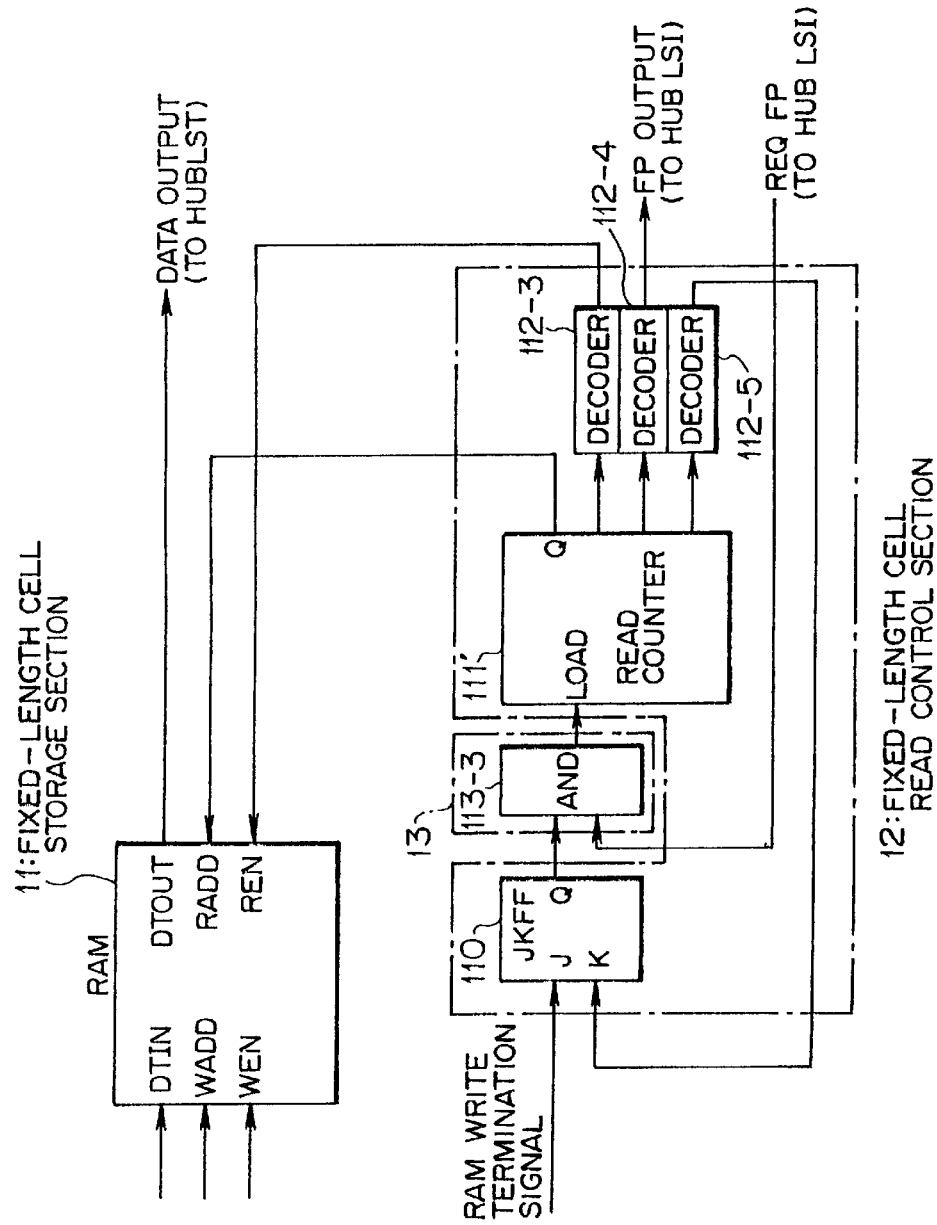
FIG. 20 is a block diagram showing the internal configuration of the highest-priority fixed-length cell transmitting apparatus according to a modification of the first embodiment of the present invention.

FIG. 20 is a block diagrams showing the internal configuration of the highest-priority fixed-length cell transmitting apparatus 1 according to the modification of the first embodiment. As shown in FIG. 20, the highest-priority fixed-length cell transmitting apparatus 1 comprises the RAM (the fixed-length cell storage section) 11 which is the same as that previously described with reference to FIG. 8, the JK flip-flop (JK-FF) circuit 110 which serves as the fixed-length cell read control section 12, the read counter 111', decoders 112-3 to 112-5, and an AND circuit 113-3 which serves as the fixed-length cell read-inhibit control section 13.

The decoders 112-3 to 112-5 respectively decode the count value received from the read counter 111'. The decoder 112-3 outputs the thus decoded value as the read enable (REN) signal for use in the fixed-length cell storage section 11. The decoder 112-4 outputs the thus decoded value as a frame pulse for use in the fixed-length cell multiplexing apparatus 2. The decoder 112-5 outputs the decoded value to the JK flip-flop circuit 110 as a signal used in detecting the leading edge of the RAM write signal.

The AND circuit 113-3 carries out a logical AND operation of the output from the JK flip-flop 110 and the request signal received from the fixed-length cell multiplexing apparatus 2. When the transmission of the previously described request signal from the fixed-length cell multiplexing apparatus 2 is interrupted, the output of the AND circuit 113-3 is switched to the L-level, as a result of which the highest-order fixed-length cell is not read from the fixed-length cell storage section 11.

Figure 21:
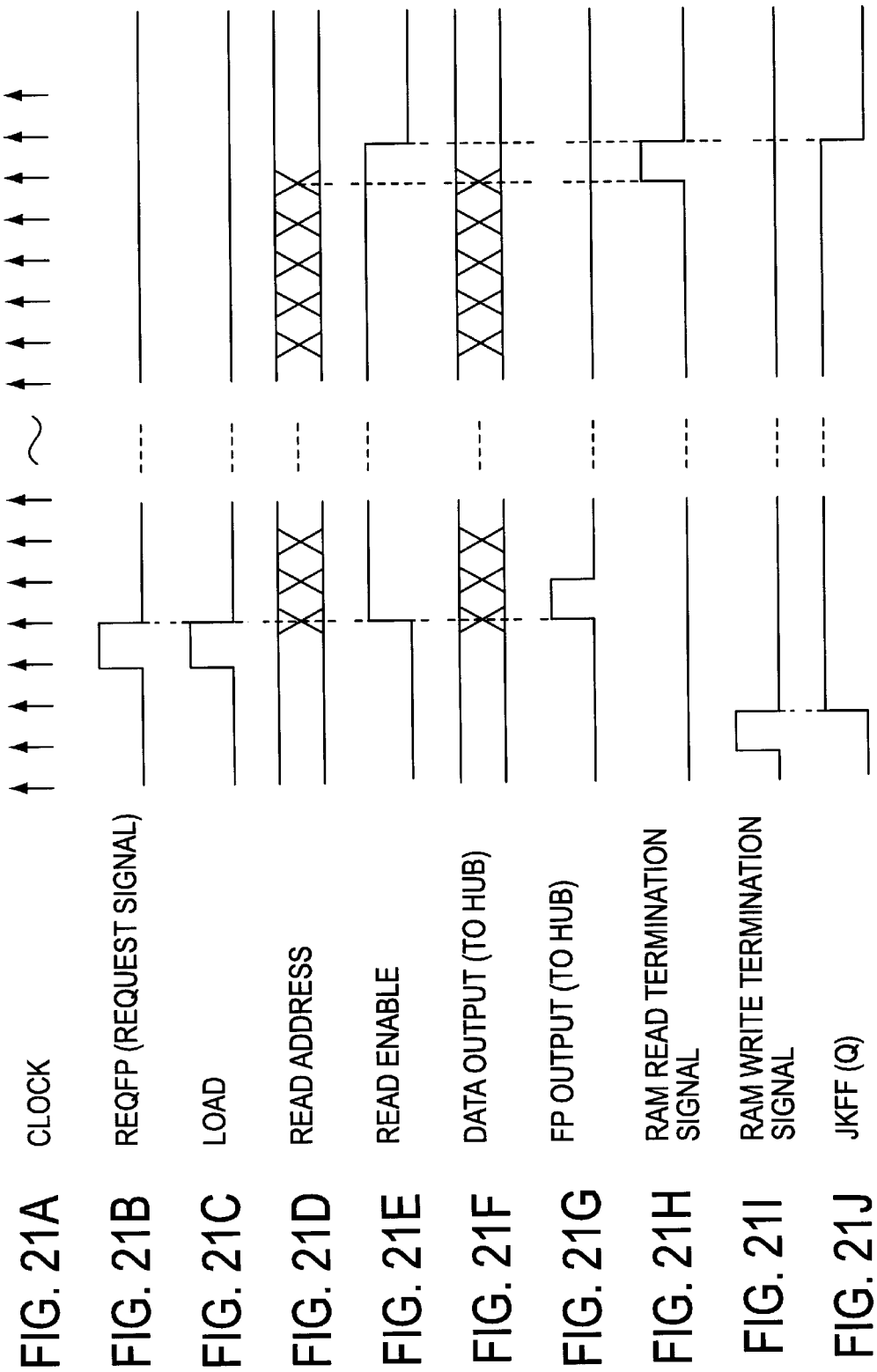
FIGS. 21(a) to 21(j) are timing charts for explaining the operation of the highest-priority fixed length cell transmitting apparatus according to the modification of the first embodiment of the present invention.

With the above described configuration, when the RAM write termination signal is input to the JK flip-flop circuit 110 of the previously described highest-priority fixed-length cell transmitting apparatus 1, as shown in FIG. 21(i), the output of the JK flip-flop 110 is maintained at a high level, as shown in FIG. 21(j). When the request signal is input from the fixed-length cell multiplexing apparatus 2 to the AND circuit 113-3 of the fixed-length cell read-inhibit control section 13, as shown in FIG. 21(b), the output of the AND circuit 113-3 is switched to the H-level, as shown in FIG. 21(c). As a result, the read counter 111' starts a loading operation. As a result, the read address is output to the fixed-length cell storage section 11 in accordance with the internal clock signal (see FIG. 21(a)), as shown in FIG. 21(d). Further, such a read enable signal as shown in FIG. 21(e) is output to the fixed-length cell storage section 11 via the decoder 112-3, whereby the highest-order fixed-length cells are sequentially read from the fixed-length cell storage section 11 (see FIG. 21(f)).

Subsequently, the read counter 111' increments its count value (0 to 52) corresponding to the length of the cell. That count value is decoded by the decoder 112-5, and the thus decoded value is output to the JK flip-flop 110 as a RAM read termination signal shown in FIG. 21(h). As shown in FIG. 21(j), the output of the JK flip-flop circuit 110 is switched to the L-level, whereby the reading of the cell is completed.

Figure 23:
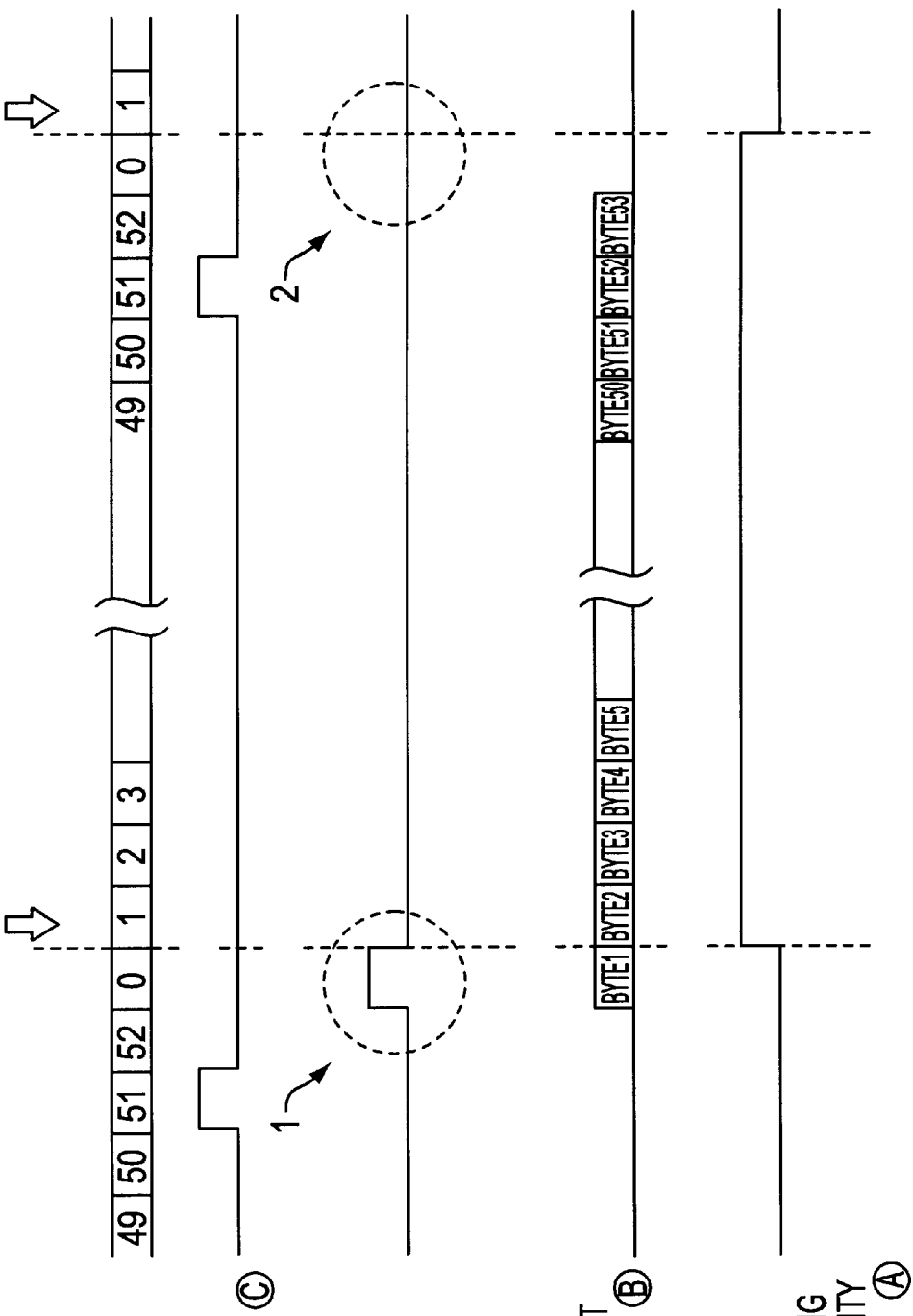
FIGS. 23(a) to 23(e) are timing charts for explaining the operation of a fixed-length cell multiplexing apparatus according to the modification of the first embodiment of the present invention.

In addition to the units 1, 1-1 to 1-n, 2, and 3 having the same function as those units previously described with reference to FIG. 16, the fixed-length cell multiplexing apparatus 2 is provided with a 53-counting counter as the request signal output section (a fixed-length cell read-inhibit request signal output section) 24, as shown in FIG. 22. As a result, when it is judged based on the storage amount information (xTxAF) from the storage amount notification section 32 that the storage amount is not in excess of the predetermined storage amount, the fixed-length cell multiplexing apparatus 2 repeatedly outputs a request (REQFP) signal to the fixed-length cell read control section 12 of the highest-priority fixed-length cell transmitting apparatus 1, as shown in FIG. 23(b), in synchronism with the timing of the read counter, as shown in FIG. 23(a). Upon receipt of the request signal, the highest-priority fixed-length cell transmitting apparatus 1 generates a frame pulse signal which represents the start of the highest-order fixed-length cell, as indicated by ① in FIG. 23(c). As shown in FIG. 23(d), the highest-order fixed-length cells are sequentially read from the fixed-length cell storage section 11, and the thus read highest-order fixed-length cells are sent to the fixed-length cell multiplexing apparatus 2.

If there are no highest-order fixed-length cells to be output when the highest-priority fixed-length cell transmitting apparatus 1 receives the request signal, the frame pulse signal representing the start of the highest-order fixed-length cell is not output, as indicated by ② in FIG. 23(c). Eventually, the highest-order fixed-length cell is not sent to the fixed-length cell multiplexing apparatus 2.

The request signal is output at the same timing so long as the storage amount notified by the storage amount notification section 32 does not exceed the predetermined storage amount. If the storage amount is in excess of the predetermined storage amount, the transmission of the request signal to the highest-priority fixed-length cell transmitting apparatus 1 is interrupted. As a result, the transmission of the highest-order fixed-length cell from the highest-priority fixed-length cell transmitting apparatus 1 is inhibited.

Figure 24:
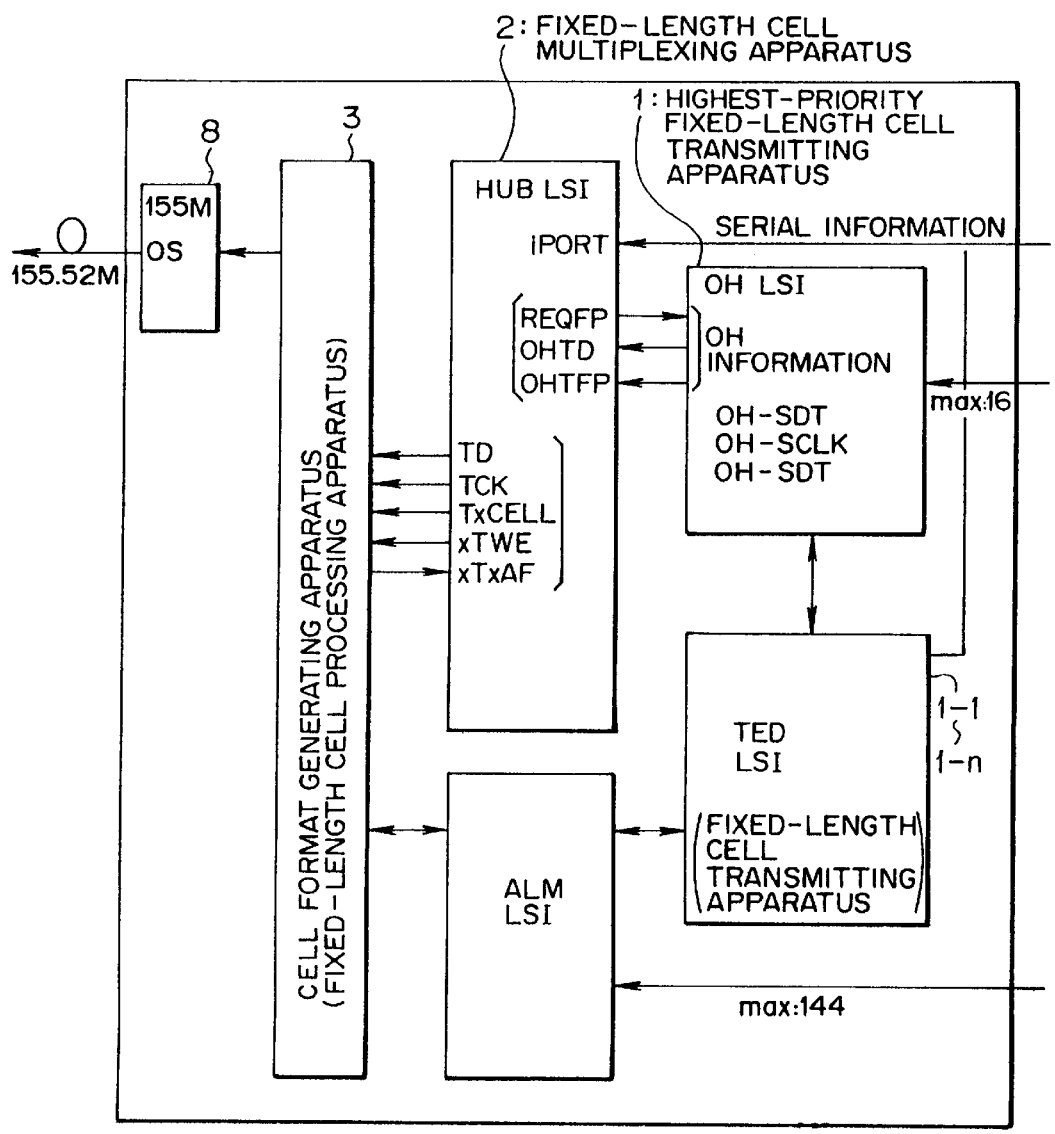
FIG. 24 is a block diagram showing the configuration of a peripheral portion of the fixed-length cell multiplexing apparatus according to the first embodiment of the present invention.

When the fixed-length cell multiplexing apparatus 2 receives, e.g., serial information, as shown in FIG. 24, that information is asynchronously input from the fixed-length cell transmitting apparatuses 1-1 to 1-n to the FIFO storage sections (FIFO) 21-1 to 21-n of the fixed-length cell multiplexing apparatus (HUB LSI) 2 (i-PORT) in the same manner as previously described with reference to FIG. 6.

When the fixed-length cells are input to (i.e., arrive at) the FIFO storage sections 21-1 to 21-n of the fixed-length cell multiplexing apparatus 2, arrival order data are written into the fixed-length cell arrival state storage section 25 of the FIFO control section 22 in the same manner as previously described with reference to FIGS. 10 to 13. The thus written data are read by the fixed-length cell arrival state storage control section 26, and the output cell determination section 27 determines one of the FIFO storage sections 21-1 to 21-n from which a fixed-length cell is to be read.

When more than two fixed-length cells are simultaneously input to (or arrive at) the fixed-length cell multiplexing apparatus 2, the output cell determination section 27 determines one of the FIFO storage sections 21-1 to 21-n from which a fixed-length cell is to be read, on the basis of an instruction, i.e., the select signal input from the outside, or the count value received from the simultaneous arrival counter 28 in the same manner as previously described with reference to FIGS. 14 and 15.

In this way, according to the fixed-length cell multiplex system (the fixed-length cell multiplex transmitting apparatus, the fixed-length cell multiplex transmission method, and fixed-length cell transmitting apparatus) according to the first embodiment of the present invention, the highest-priority fixed-length cell transmitting apparatus 1 is provided with the internal frames each corresponding to a single fixed-length cell, and the fixed-length cells are sent to the fixed-length cell multiplexing apparatus 2 in synchronism with the internal frames. Further, the fixed-length cell to be processed most preferentially (i.e., the highest-order fixed-length cell) is directly output to the fixed-length cell multiplexing apparatus 2 without the use of the FIFO storage sections 211 to 21-n. Hence, the other fixed-length cells are sequentially inserted into that interval between the highest-order fixed-length cells, whereby the highest-order fixed-length cell can be sent by multiplex transmission with the minimum delay. As a result, the other fixed-length cells can be efficiently sent by multiplex transmission.

The fixed-length cell multiplexing apparatus 2 monitors the storage amount (i.e., the state of the memory) of the fixed-length cell in the fixed-length cell processing apparatus 3. If the storage amount exceeds the predetermined storage amount, the transmission of the request signal in synchronism with the internal frames each corresponding a fixed-length cell to the highest-priority fixed-length cell transmitting apparatus 1 is interrupted (i.e., the fixed-length cell read-inhibit request signal is output). It is possible to prevent the highest-priority fixed-length cell from being abandoned due to congestion in the processing carried out by the fixed-length cell multiplexing apparatus 2 and subsequent units. Further, it is possible to send the highest-priority fixed-length cell with the minimum delay by multiplex transmission. Therefore, the other fixed-length cells can be efficiently sent by multiplex transmission.

The FIFO control section 22 is provided with the fixed-length cell arrival state storage section (RAM, etc.) 25 which stores the order of the arrival of the fixed-length cells at the FIFO storage sections 21-1 to 21-n. It is possible to accurately process the fixed-length cells in the arrival order by specifying each port number when the fixed-length cells are multiplexed, which makes it possible to improve the processing capability of the fixed-length cell multiplex transmission system.

The FIFO control section 22 is further provided with the output cell determination section 27 which determines the cell to be output. Hence, it is possible to arbitrarily change, by setting the output conditions from the outside, the priority levels of the cells of virtual channels to be read when the fixed-length cells simultaneously arrive at the fixed-length cell multiplexing apparatus 2 in accordance with the traffic of the fixed-length cell multiplex transmission system. Further, the required information can be quickly processed, which significantly contributes to the flexibility of construction of the fixed-length cell multiplex transmission system.

The output cell determination section 27 of the FIFO control section 22 is provided with the simultaneous arrival counter 28. It is possible to automatically change the priority levels of the fixed-length cells by incrementing the count value of the simultaneous arrival counter 28 when the fixed-length cells simultaneously arrive at the fixed-length cell multiplexing apparatus 2. As a result, it is possible to equally assign priorities to all the cells of the virtual channels without fixing the priority.

In the present embodiment, the request signal is sent from the fixed-length cell multiplexing apparatus 2 to the highest-priority fixed-length cell transmitting apparatus 1 on the basis of the information regarding the storage amount of the inside of the fixed-length cell processing apparatus 3. However, the request signal may be directly sent from the fixed-length cell processing apparatus 3 to the highest-priority fixed-length cell transmitting apparatus 1.

(c) Second Embodiment

Figure 25:
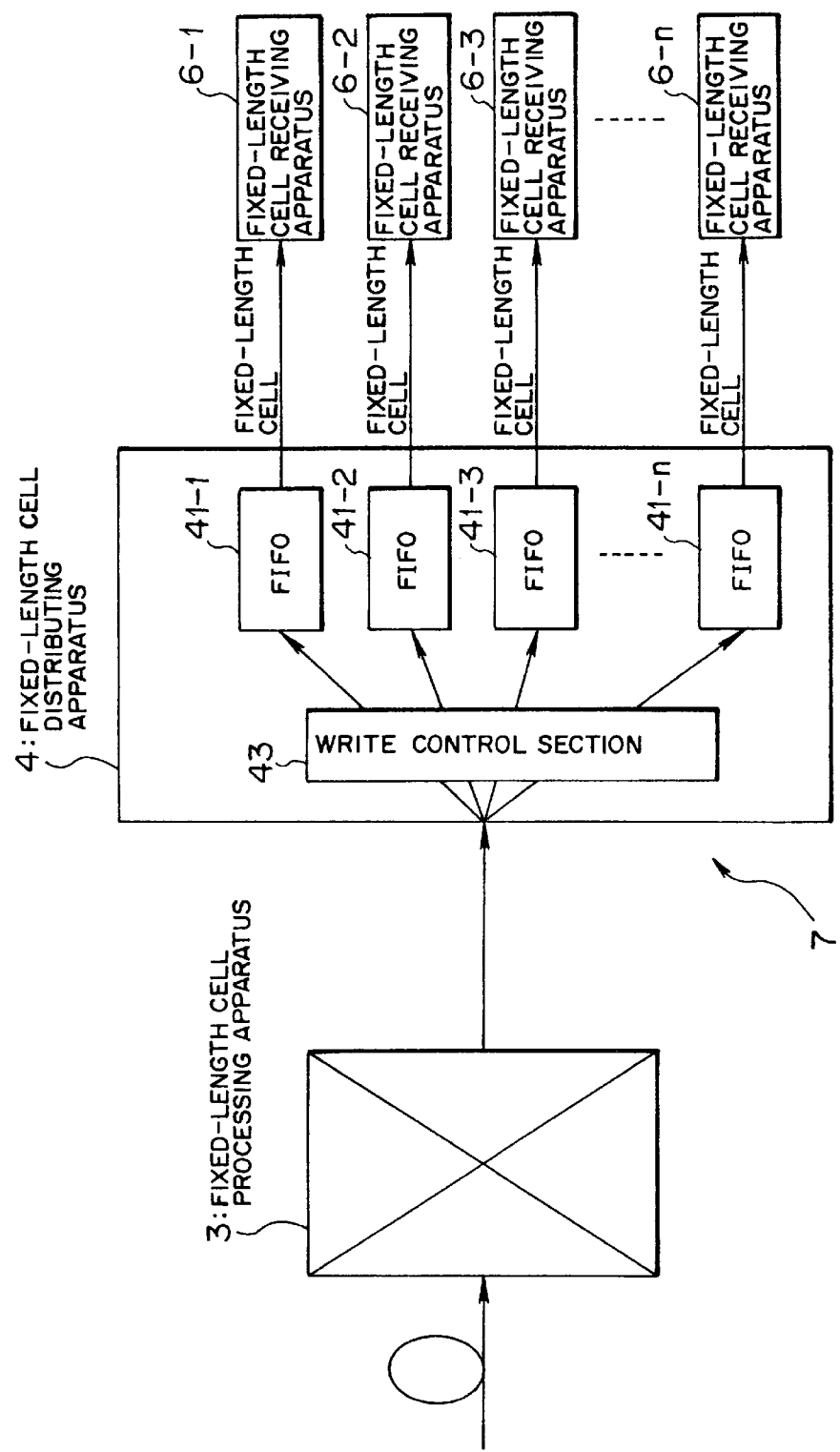
FIG. 25 is a block diagram showing the configuration of a fixed-length cell distributing apparatus according to a second embodiment of the present invention.
Figure 39:
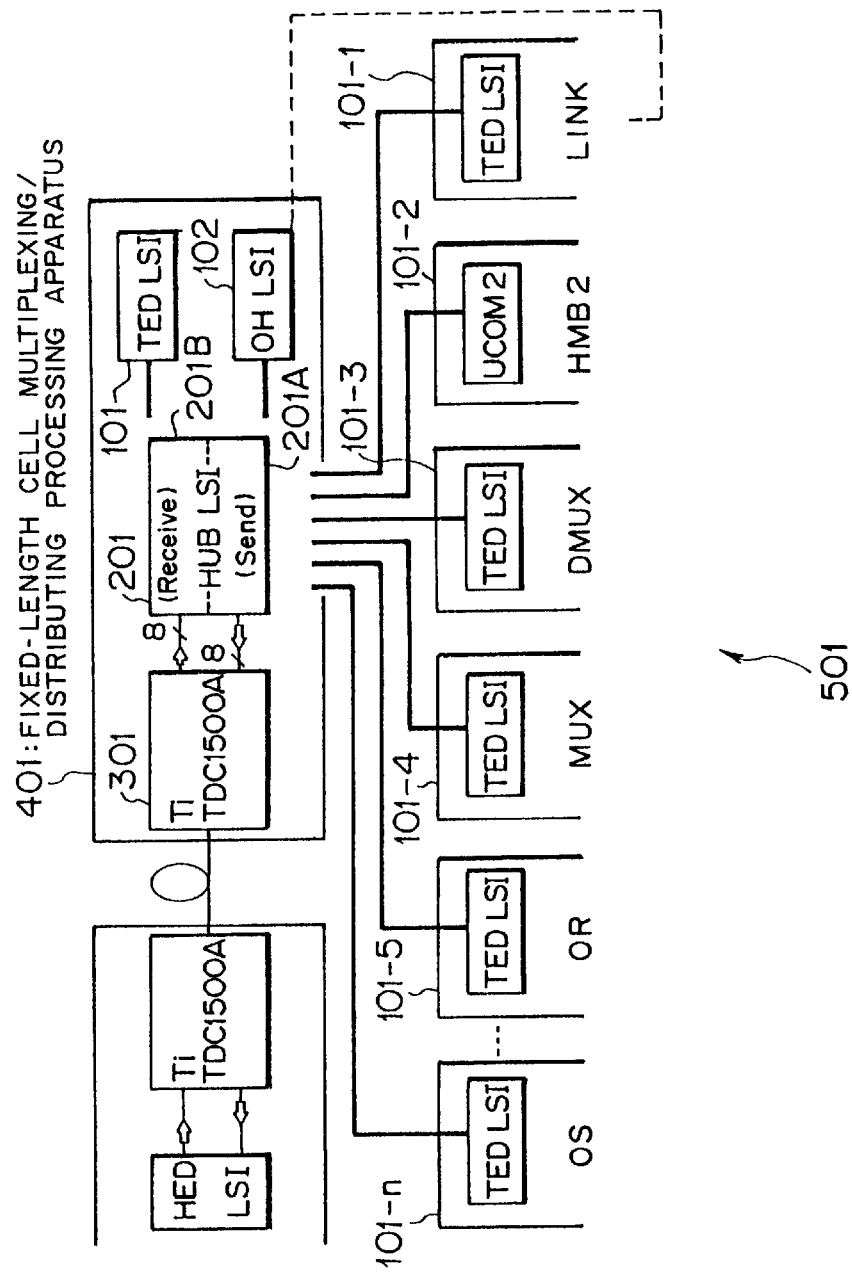
FIG. 39 is a block diagram showing one example of a fixed-length cell multiplexing/distributing system.
Figure 40:
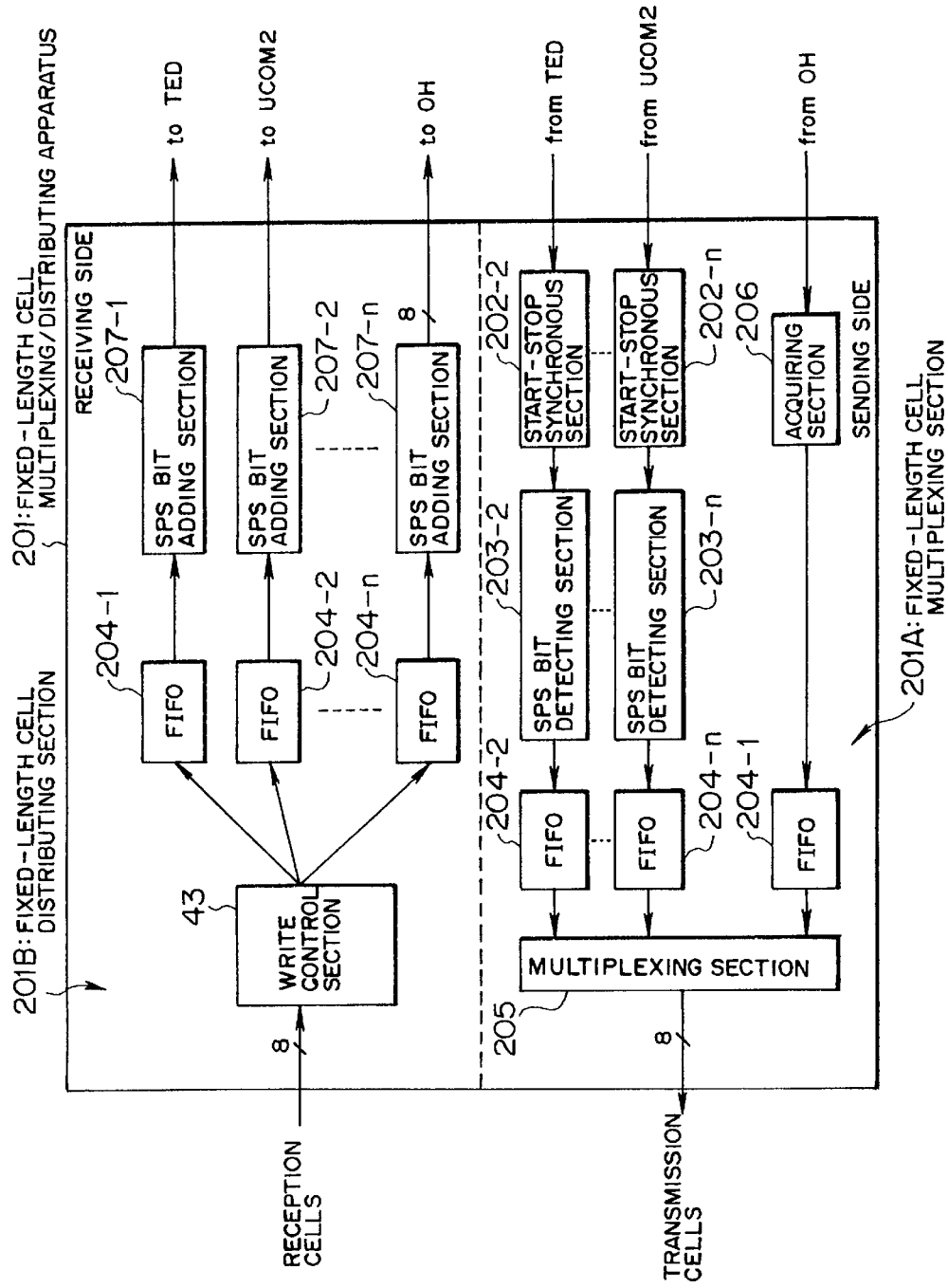
FIG. 40 is a block diagram showing the configuration of a fixed-length cell multiplexing/distributing device.
Figure 41:
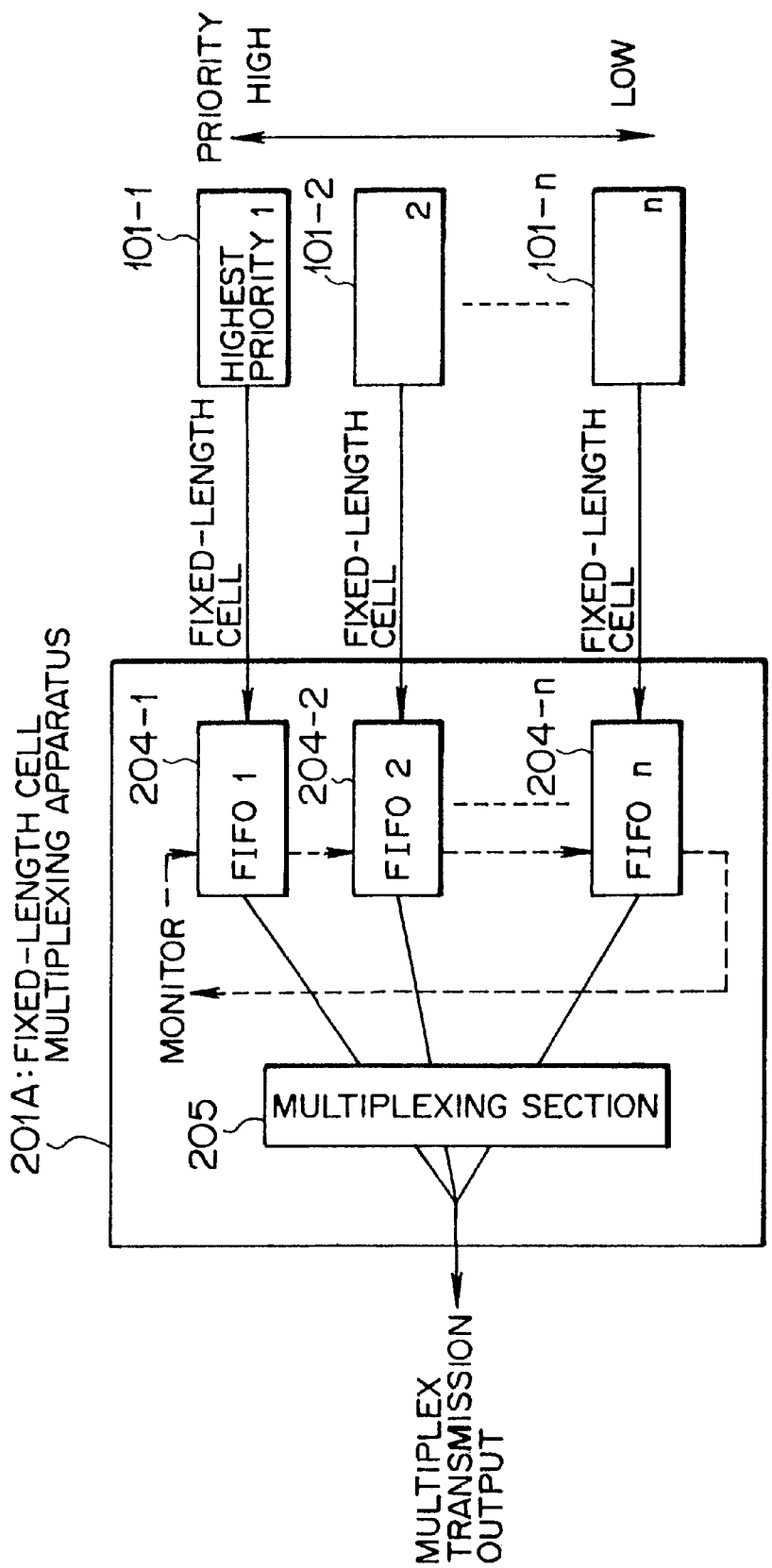
FIG. 41 is a block diagram showing the configuration of a fixed-length cell multiplexing apparatus.
Figure 42:
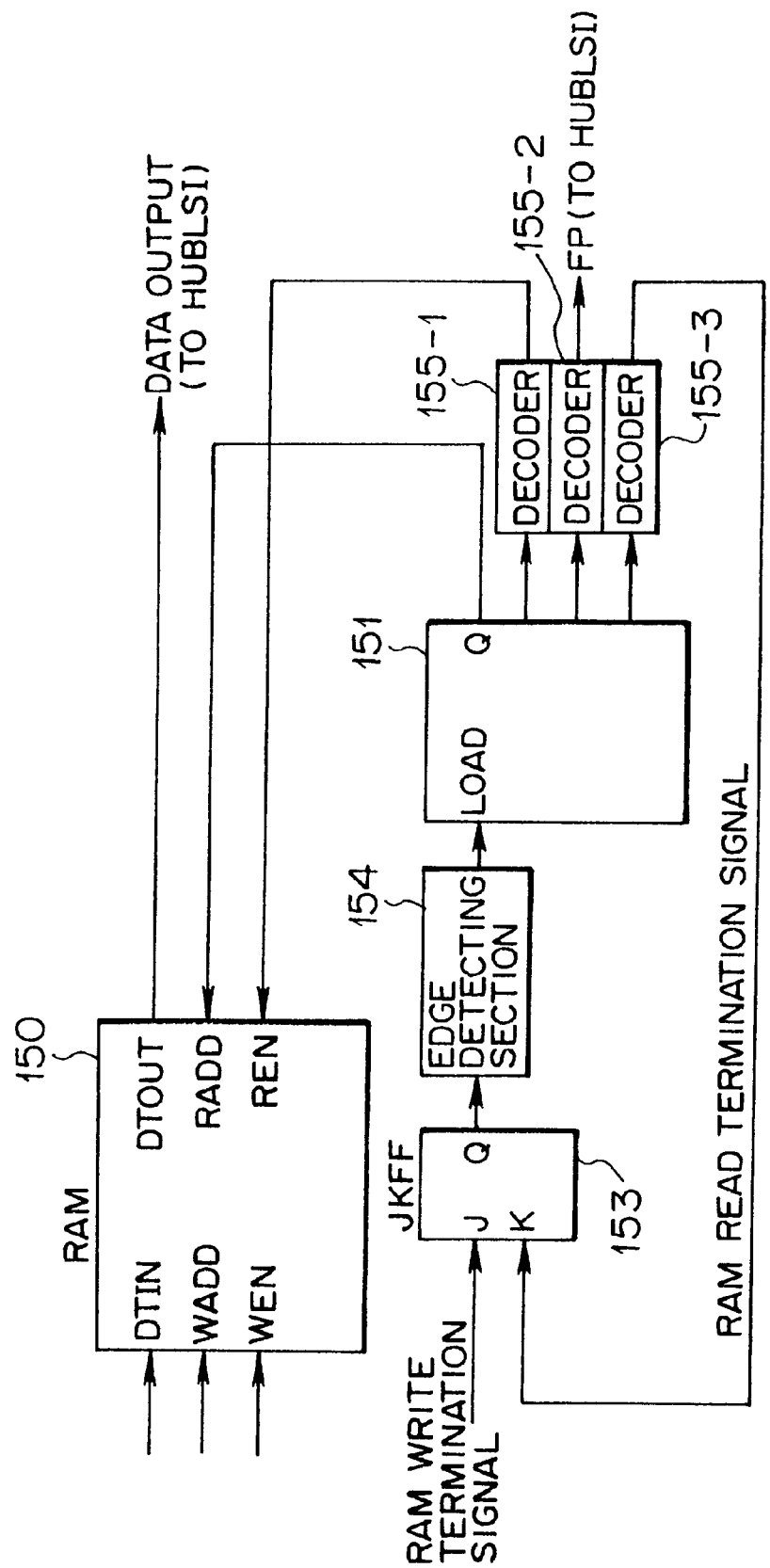
FIG. 42 is a block diagram showing the internal configuration of a highest-priority fixed-length cell transmitting apparatus.
Figure 43:
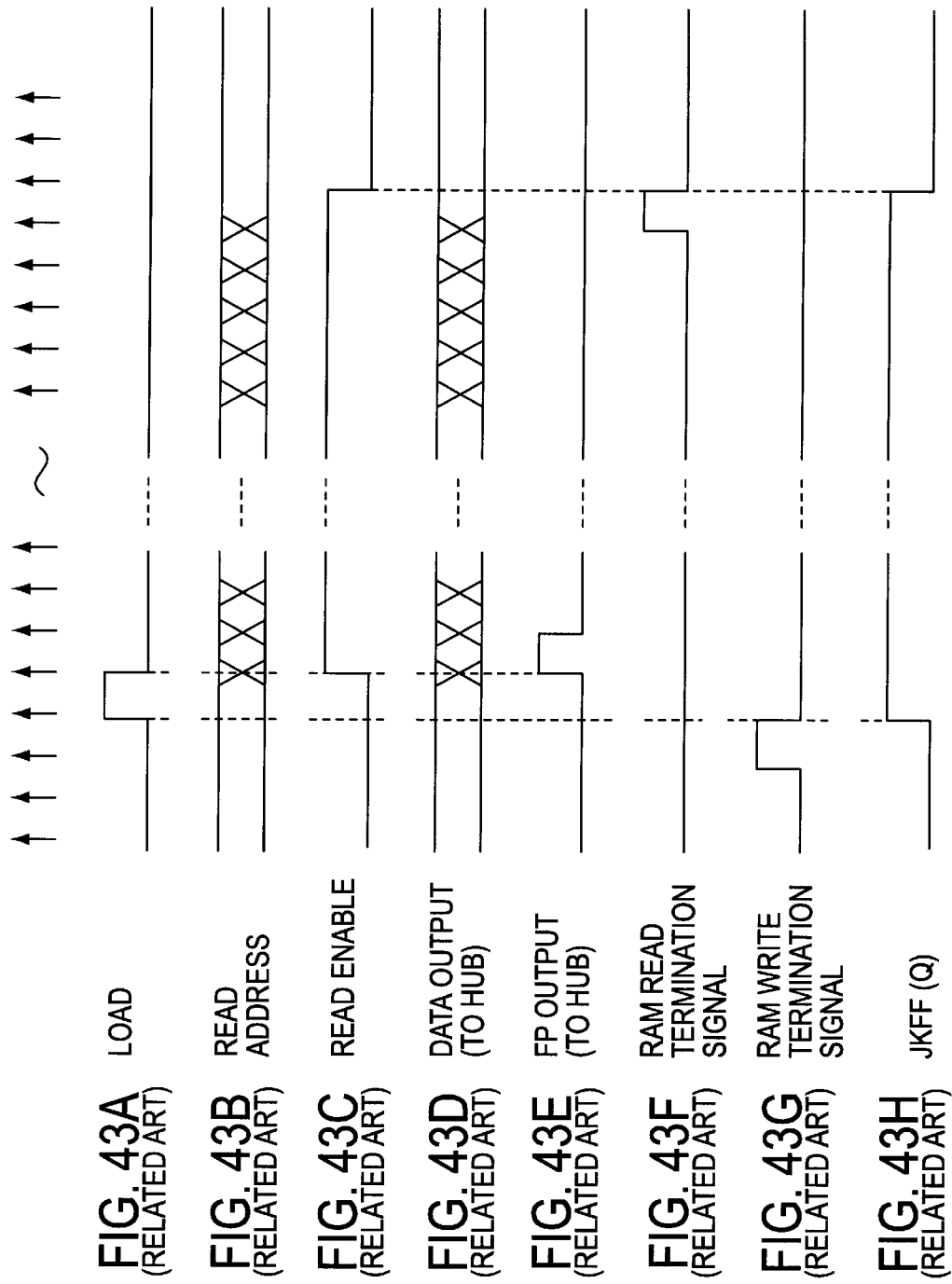
FIGS. 43(a) to 43(h) are timing charts for explaining the operation of the highest-priority fixed-length cell transmitting apparatus.

FIG. 25 is a block diagram showing the configuration of a fixed-length cell distributing system according to a second embodiment of the present invention. A fixed-length cell distributing system 7 shown in FIG. 25 corresponds to the fixed-length cell distributing section 201B in the previously described fixed-length cell multiplexing/distributing system 501 shown in FIG. 39. The data (cells) input through an optical cable or the like to the fixed-length distributing system 7 are processed in a fixed-length cell data multiplexing/distributing processing apparatus 401, and the thus processed data are distributed to the fixed-length cell transmitting/receiving devices 101-2 to 101-n.

As shown in FIG. 25, the fixed-length cell distributing system 7 comprises the fixed-length cell processing apparatus 3, a fixed-length cell distributing apparatus 4, and fixed-length cell receiving apparatuses 6-1 to 6-n.

The fixed-length cell processing apparatus 3 carries out required processing for the input fixed-length cell data, and sends the thus processed data to the fixed-length cell distributing apparatus 4. The fixed-length cell distributing apparatus 4 distributes the M-parallel fixed-length cell data to N ports (N>M). The fixed-length cell processing apparatus 3 comprises a write control section 43 and FIFO storage sections 41-1 to 41-n.

The write control section 43 detects information regarding the port number of the port to be output from the M-parallel fixed-length cell data. The input data are written into one of the FIFO storage sections 41-1 to 41-n corresponding to the detected port. The fixed-length cell data are written into, or read from, the FIFO storage sections 41-1 to 41-n in the order of input.

The fixed-length cell receiving apparatuses 6-1 to 6-n receive the fixed-length cell data respectively sent from the fixed-length cell distributing apparatus 4.

Figure 26:
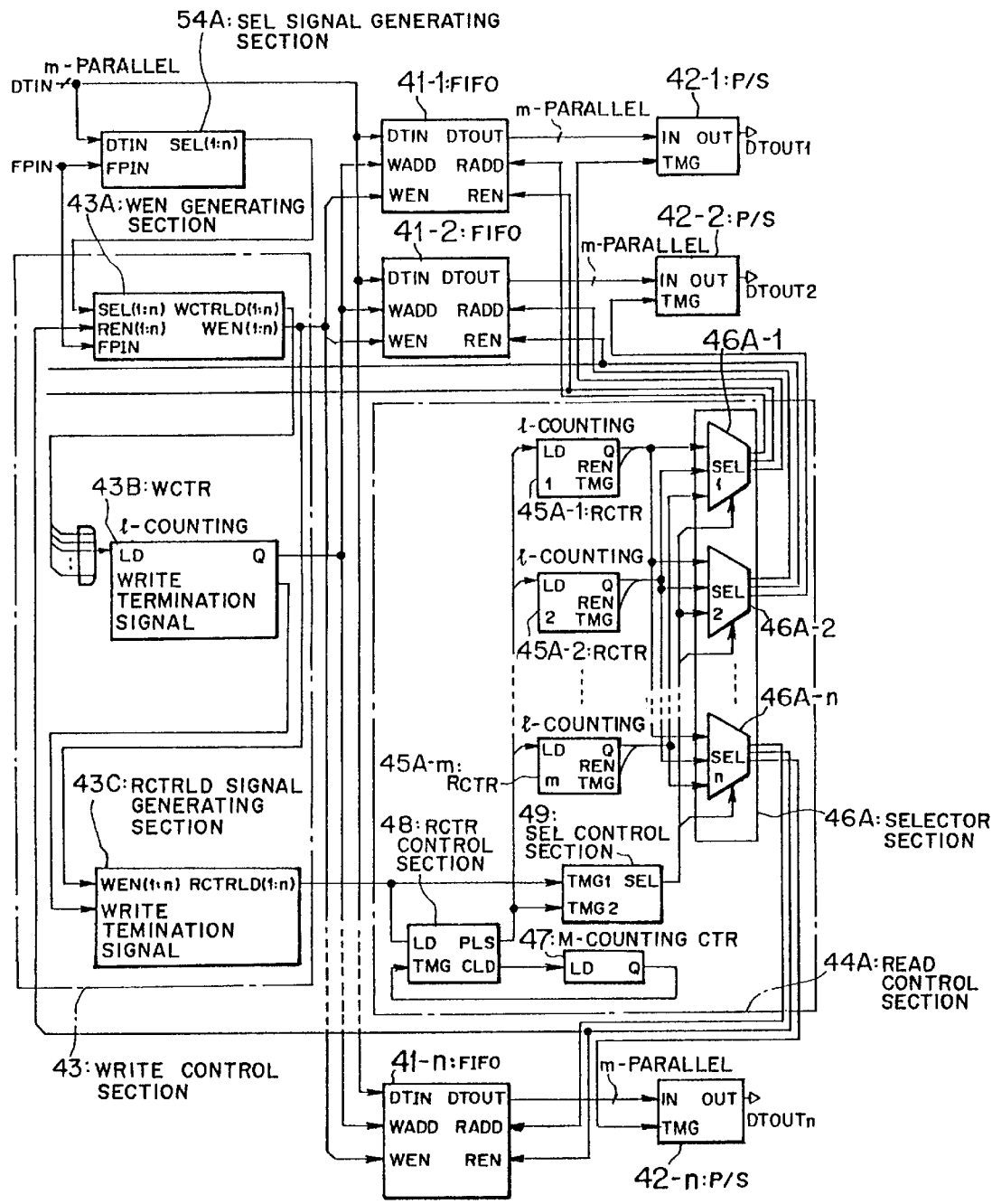
FIG. 26 is a block diagram showing the detailed configuration of a fixed-length cell distributing apparatus according to the second embodiment of the present invention.

FIG. 26 is a block diagram showing the detailed configuration of the previously described fixed-length cell distributing apparatus 4. The fixed-length cell distributing apparatus 4 comprises FIFO storage sections (RAMs) 41-1 to 41-n, parallel/serial (P/S) converters 42-1 to 42-n, the write control section 43, the read control section 44A, and a select (SEL) signal generating section 54A.

As previously described, the fixed-length cells are written into, or read from, the FIFO storage sections 41-1 to 41-n in the order of input. N FIFO storage sections 41-1 to 41-n are provided so as to correspond to the number of output ports (DTOUT 1 to n). The select signal generating section 54A detects a port number of the fixed-length cell from the received fixed-length cell data. The select signal generating section 54A generates a signal (a port selecting signal) corresponding to the detected port number. Port number information is detected from the cell data of m-parallel (m=M) in synchronism with frame pulse (FP) signals (in the order of port number; 1, 2, n, 2), as shown in FIGS. 27(a) and 27(b). From the detected data, one of the FIFO memory devices 41-1 to 41-n is determined into which the input cell is to be written, and the port select number is output to a write control section 43 which will be described later.

The write control section 43 detects the information regarding the port number of the port, to which the cell data are to be output, from the M-parallel fixed-length cell data, and writes the input data into the corresponding one of the FIFO storage sections 41-1 to 41-n. The write control section 43 comprises the write enable signal (WEN) generating section 43A, the write counter (WCTR) 43B, and the read counter load (RCTRLD) signal generating section 43C.

The write signal generating section 43A generates a write enable (WEN) signal and a write counter load (WCRTRLD) signal for each of the FIFO memory devices 41-1 to 41-n corresponding to the port, as shown in FIGS. 27(d) to 27(f). The write enable signal is output to the FIFO memory devices 41-1 to 41-n and the read counter load signal generating section 43C, whereas the write counter load signal is output to the write counter 43B.

The write counter 43B outputs its Q (data) output to FIFO memory devices 41-1 to 41-n as a write address (WADD) therefor, based on the information (i.e., the write counter load signal) received from the write signal generating section 43A. The write counter 43B notifies the read counter load signal generating section 43C that the cell data have been written into the FIFO memory devices 41-1 to 41-n (i.e., the write counter 43B sends a write termination signal to the read counter load signal generating section 43C). For example, when the write counter counts up as shown in FIG. 27(c) and a write address is sent to the FIFO memory devices 41-1 to 41-n, a write termination signal is generated and output to the read counter load signal generating section 43C, as shown in FIGS. 27(g) to 27(i).

Upon receipt of the write termination signal from the write counter 43B, the read counter load signal generating section 43C generates a read counter load signal on the basis of the write enable signal from the write signal generating section 43A. This read counter load signal is input to a read counter control section 48 and a SEL control section 49 which will be described later. The read counter load signal has control signals the number of which corresponds to the number of ports.

The previously described read control section 44A controls the reading of the fixed-length cell data from the FIFO storage sections 41-1 to 41-n. The read control section 44A comprises read counters (RCTR) 45A-1 to 45A-m, a selector (SEL) section 46A, an M-counting counter 47, the read counter control section 48, and the SEL control section 49. The read counters 45A-1 to 45A-m are capable of outputting a signal for reading fixed-length cell data from the FIFO storage sections 41-1 to 41-n. The number of read counters 45A-1 to 45A-m is fewer than the number of FIFO storage sections 41-1 to 41-n (i.e., the number of read counters 45A-1 to 45A-m is "m").

The selector section 46A is connected to the output side of the read counters 45A-1 to 45A-m and feeds an output received from the read counters 45A-1 to 45A-m to any of the FIFO storage sections 41-1 to 41-n as a cell read signal. The selector section 46A comprises selectors (SEL) 46A-1 to 46A-n, the number of which is n. The selectors 46A-1 to 46A-n divide the signals output from the read counters 45A-1 to 45A-m for each port in response to a write timing signal fed from a selector control section 49 which will be described later, as shown in FIGS. 27(o), 27(q), and 27(s). The thus-divided signals are output to the FIFO storage sections 41-1 to 41-n as read enable signals (REN).

The M-counting counter 47 starts its counting up operation in response to the completion of writing of the fixed-length cell data to the FIFO storage sections 41-1 to 41-n. For example, the count value of the M-counting counter 47 is incremented by one every time the M-counting counter 47 receives the write termination signal as shown in FIG. 27(j).

The read counter control section 48 increments the count values of the read counters (1-counting counters) 45A-1 to 45A-m which have ordinal number information corresponding to the count values of the M-counting counter 47 (0 to 1-1, in this embodiment). Upon receipt of the write termination signal, as shown in FIGS. 27(k) to 27(n), for example, the read counter control section 48 starts the counting action of the corresponding one of the read counters 45A-1 to 45A-m.

The selector control section 49 controls the selector section 46A on the basis of information received from the read counter control section 48. The selector control section 49 controls the selectors 46A-1 to 46A-n on the basis of a signal (TMG1), which is output from the read counter load signal generating section 43C and represents one of the FIFO storage sections 41-1 to 41-n into which the cell data have been written, and a signal (TMG2), which is output from the read counter control section 48 and represents that the counting operations of the read counters 45A-1 to 45A-m are started.

The fixed-length cell data written into the FIFO storage sections 41-1 to 41-n by the write control section 43 are read based on the read enable signal received from the selector section 46A for each of the port numbers, as shown in FIGS. 27(p), 27(r), and 27(t). Then, the thus read cell data are output to fixed-length cell receiving apparatuses 6-1 to 6-n.

The P/S converters 42-1 to 42-n are disposed so as to correspond to the FIFO storage sections 41-1 to 41-n. They respectively convert the m-parallel cell data received from the corresponding FIFO storage sections 41-1 to 41-n into serial data.

When input M-parallel fixed-length cell data are L bits long, each of the read counters 45A-1 to 45A-m may be made up of an L(=l)-counting counter (e.g., ATM cell is 53 bytes long, and hence the read counter may be made of a 53-counting counter). Alternatively, the read counters may be made up of a (L+α)-counting counter as will be described later.

Figure 28A:
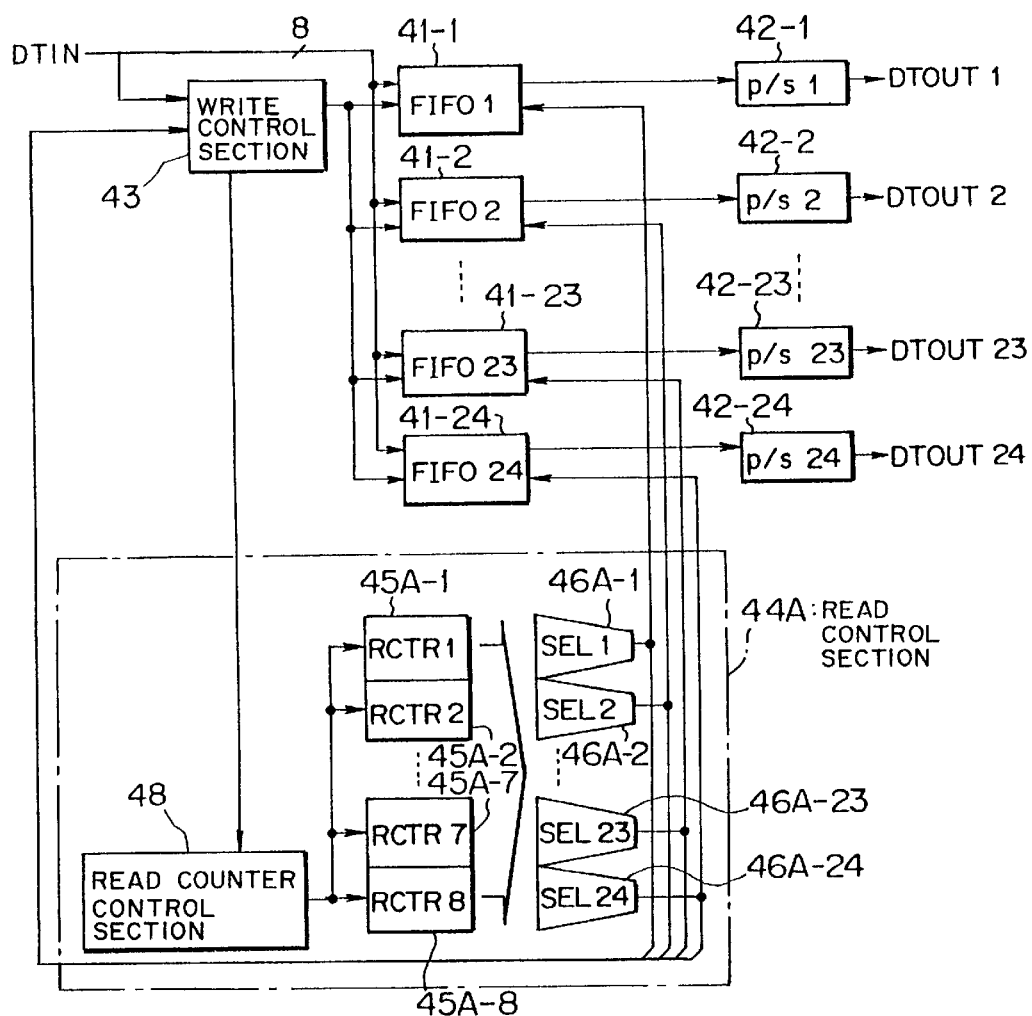
FIGS. 28(a) to 28(c) are block diagrams for explaining the operation of the fixed-length cell distributing apparatus according to the second embodiment of the present invention.
Figure 28B:
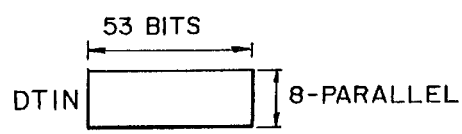
Figure 28C:
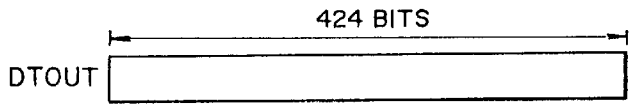

With regard to the write control operation of the fixed-length cell distributing apparatus 4 shown in FIG. 26, for example, the fixed-length cell data which are input as 8-parallel data strings (i.e., M=m=8 in FIG. 26) are input to the FIFO storage sections 41-1 to 41-24 and the write control section 43 for 24 ports (i.e., n=24 in FIG. 26), as shown in FIGS. 28(a) to 28(c). When the data are written into the FIFO storage sections 41-1 to 41-24, the write termination signal is generated by the write control section 43. This write termination signal is output to the read control section 44A.

With regard to the read control operation, when the previously described write termination signal is sent to the read control section 44A, the read counter load signal is output to the corresponding read counters 45A-1 to 45A-8, whereby the count values of the read counters 45A-1 to 45A-8 are incremented.

The count values of the read counters 45A-1 to 45A-8 are selectively output to the corresponding FIFO storage sections 41-1 to 41-24 as read enable signals by means of the selectors 46A-1 to 46A-24 (SEL 1 to 24). As a result, the cell data are sequentially read from the FIFO storage sections 41-1 to 41-n, and the data are converted into serial data by the P/S converters 42-1 to 42-24 (P/S 1 to 24). Then, the thus converted data are output.

At this time, the P/S converters 42-1 to 42-24 convert the cell data, which have been input as 8-parallel data of 53 bits long, into serial data which are 424 bits long, as shown in FIG. 28.

In this way, according to the previously described fixed-length cell distributing apparatus 4, the read control section 44A is provided with the selector section 46A, the M-counting counter 47, the read counter control section 48, and the selector control section 49, and hence the number of read counters 45A-1 to 45A-m is reduced. Hence, it is possible to significantly reduce the circuit scale without changing the distributing capability of the fixed-length cell distributing apparatus 4. The fixed-length cell distributing apparatus 4 of this type is very effective in distributing the fixed-length cell data to great many ports.

(c1) First Modification of Second Embodiment

FIG. 29 is a block diagram showing a first modification of the previously described fixed-length cell distributing apparatus 4. The fixed-length cell distributing apparatus 4 shown in FIG. 29 comprises P FIFO storage sections 41-1 to 41-P, P sets of P/S converters 42'-1 to 42'-P each including m P/S converters 42-1 to 42-m (m is a natural number), the write control section 43, the read control section 44C, and a select signal generating section 54B. P is the minimum integer greater than n/m (n is the number of output ports (DTOUT 1 to n)).

The read control section 44C comprises P sets of read control units 52-1 to 52-P each of which include m read counters 45A-1 to 45A-m and one read controller 51.

The read control section 44C controls the reading of the fixed-length cell from the FIFO storage sections 41-1 to 41-P. The read control units 52-1 to 52-P individually control the reading of cell data from the corresponding FIFO storage sections 41-1 to 41-P.

The read counters 45A-1 to 45A-m of the read control units 52-1 to 52-P are capable of outputting a timing signal for reading fixed-length cell data from the FIFO storage sections 41-1 to 41-P. For example, the read counters 45A-1 to 45A-m output the read address (RADD) and read enable (REN) signals to the read controller 51 in synchronism with, for example, the timing of an M (M=m)-counting counter 55 as shown in FIG. 30(a).

Upon receipt of a timing signal from the read counters 45A-1 to 45A-m, each read controller 51 time-division multiplexes the signal for reading the fixed-length cell data (i.e., the read address and read enable signals) with timing M times the speed of the signal for writing the fixed-length cell data, and the thus time-division multiplexed data are output to the corresponding FIFO storage sections 41-1 to 41-P. For example, the read address and read enable signals for use in the FIFO storage sections 41-1 to 41-P are output on the basis of those time-division multiplexed data, as shown in FIGS. 30(b) and 30(c).

The FIFO storage sections 41-1 to 41-P are the same as those previously described with reference to FIGS. 25 and 26. For example, in accordance with the read address and read enable signals received from the corresponding read controller 51, the written cell data are sequentially read for m ports, as shown in FIG. 30(d). The thus read cell data are temporarily latched in such a manner as shown in FIGS. 30(e), 30(g), and 30(i). Then, the cell data are output to each port as serial data, as shown in FIGS. 30(f), 30(h), and 30(j).

In addition to the functions as previously described with reference to FIG. 26, the select signal generating section 54B outputs the write address (of lower half) is output to the FIFO storage sections 41-1 to 41-P.

The P/S converters 42'-1 to 42'-P and the write control section 43 are the same as those previously described with reference to FIG. 26.

Figures 31A, 31B, 31C:
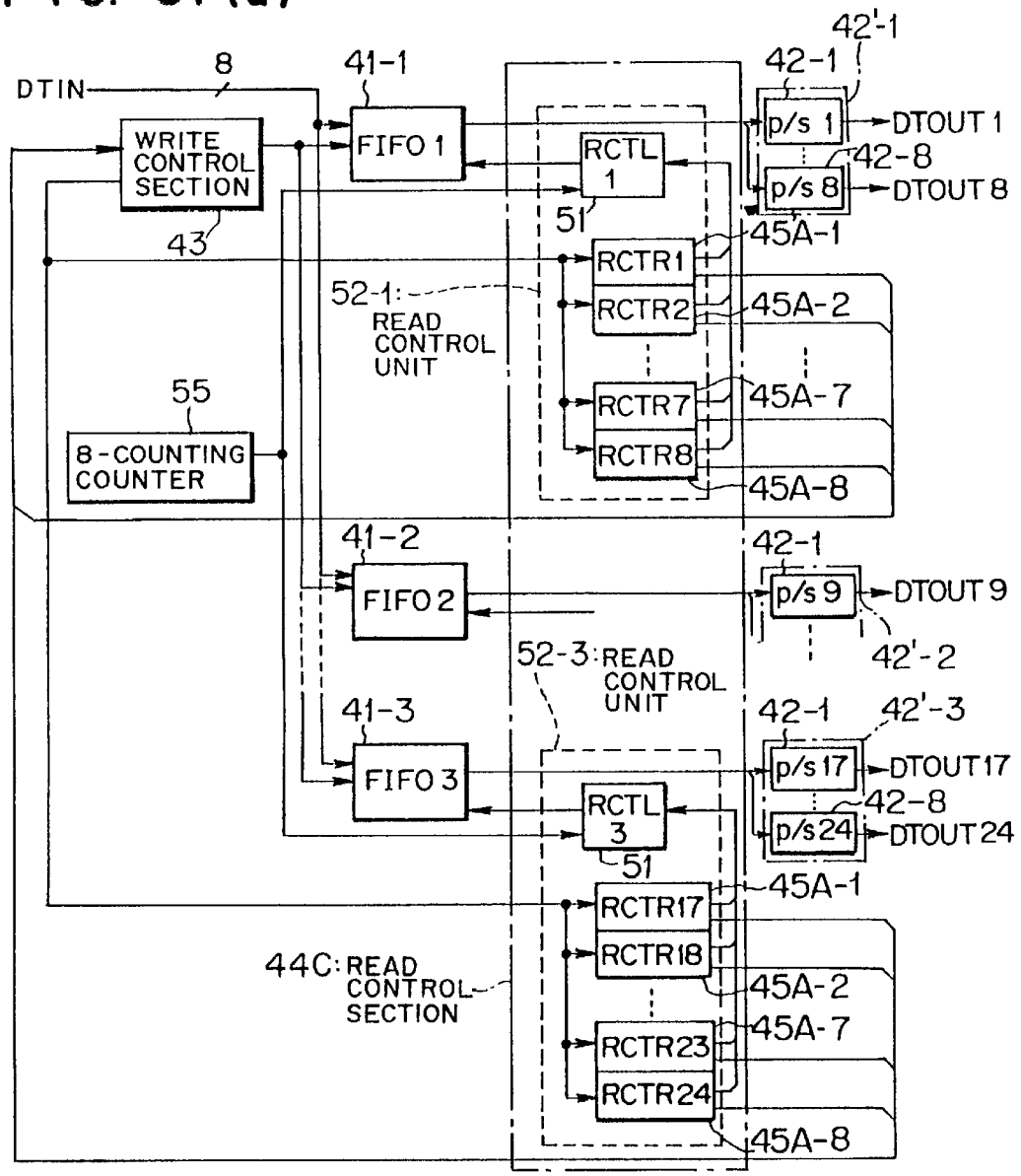
FIGS. 31(a) to 31(c) are diagrams for explaining the operation of the fixed-length cell distributing apparatus according to the first modification of the second embodiment of the present invention.

With regard to the write control of the fixed-length cell distributing apparatus 4 shown in FIG. 29, for example, the fixed-length cell data which are input as 8-parallel data (i.e., m=M=8), as shown in FIGS. 31(a) to 31(c), are output to the FIFO storage sections 41-1 to 41-3 (FIFO 1–3; namely, P=n/m=24/8=3) and the write control section 43 for each of the ports (DTOUT 1 to 24), as previously described with reference to FIG. 28. When the data are written into the FIFO storage sections 41-1 to 41-3, the write control section 43 generates a write termination signal. The thus generated write termination signal is output to the read control section 44C.

With regard to the read control, the outputs (the read address and read enable signals) fed from the read counters 45A-1 to 45A-8 are time-division multiplexed 8 times as fast as the write signal by the read controllers (RCTL 1-3) 51-1 to 51-3 of the read control section 44C in synchronism with the timing of the 8-counting counter 55. The cell data are read from the FIFO storage sections 41-1 to 41-3 for each port on the basis of the time-division multiplexed signal, and the thus read data are output as serial data by way of the P/S converters 42-1 to 42-8 of the corresponding P/S converters 42'-1 to 42'-3.

Even in this case, each of the P/S converters 42-1 to 42-8 converts the cell data which are 53 bits long and are input as 8-parallel data into serial data which are 424 bits long.

In this way, according to the previously described fixed-length cell data distributing apparatus 4, all that is needed is to provide only the FIFO storage sections 41-1 to 41-3 with respect to the number of ports (24), which makes it possible to reduce the scale of the circuit to a much greater extent.

(c2) Second Modification of Second Embodiment

Figure 32:
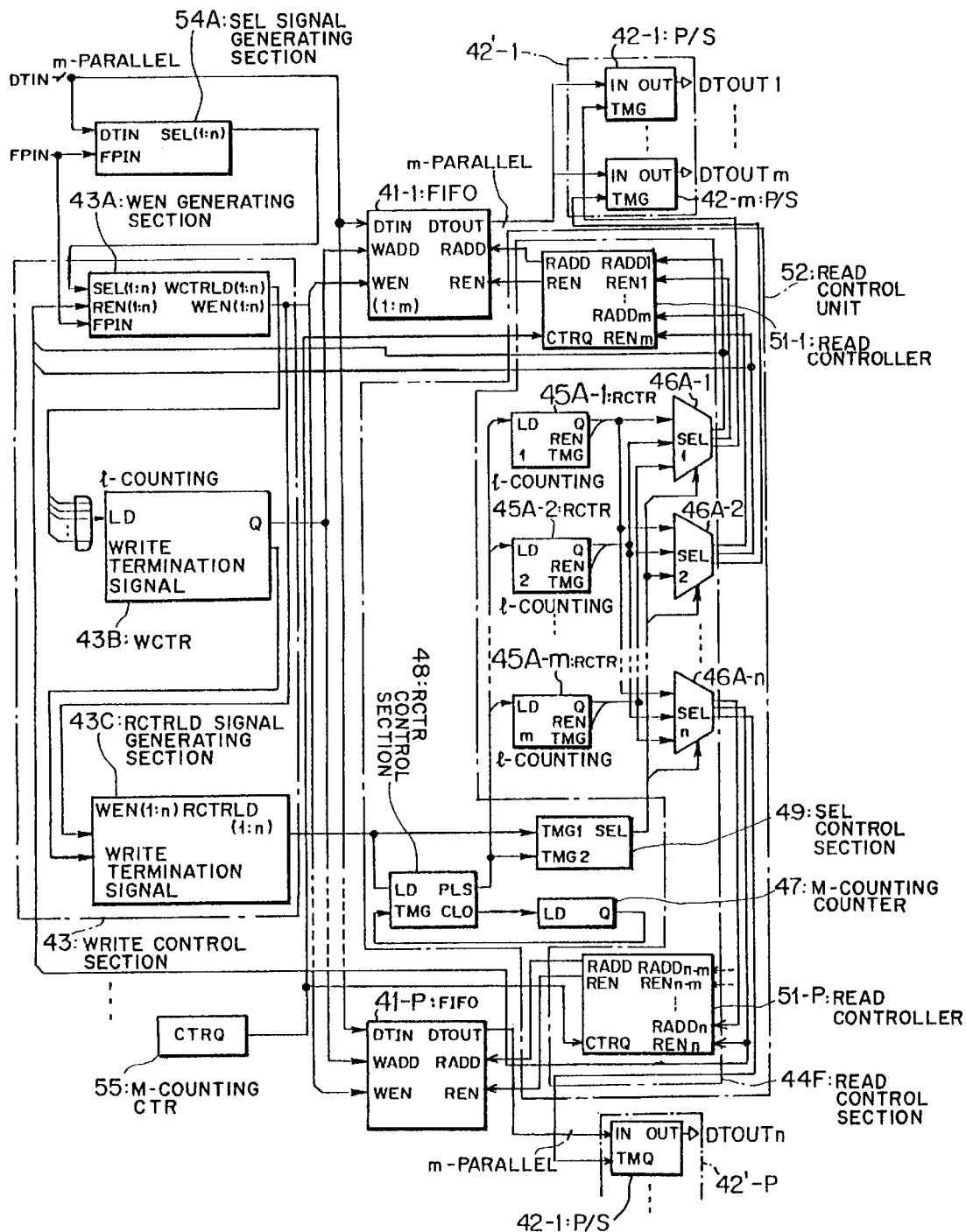
FIG. 32 is a block diagram showing a fixed-length cell distributing apparatus according to a second modification of the second embodiment of the present invention.

FIG. 32 is a block diagram showing a second modification of the previously described fixed-length cell distributing apparatus 4. The fixed-length cell distributing apparatus 4 shown in FIG. 32 comprises P FIFO storage sections 41-1 to 41-P, P/S converters 42'-1 to 42'-P including m P/S converters 42-1 to 42-m (m is a natural number), the write control section 43, a read control section 44F, and the select signal generating section 54A.

The read control section 44F comprises m read counters 45A-1 to 45A-m, n timing signal selectors (SEL) 46A-1 to 46A-n, and a read control unit 52 including P read controllers 51-1 to 51-P.

Specifically, the fixed-length cell distributing apparatus 4 shown in FIG. 32 is arranged so as to have both functions of the fixed-length cell distributing apparatus 4 previously described with reference to FIG. 26 (the distributing apparatus having a fewer number of read counters 45A-1 to 45A-m) and the fixed-length cell distributing apparatus 4 previously described with reference to FIG. 29 (the distributing apparatus having a reduced number of FIFO storage sections 41-1 to 41-P) by combination thereof.

The fixed-length cell distributing apparatus 4 shown in FIG. 32 carries out the write control which is the same as that is previously described with reference to FIGS. 28 and 31. For read control, for example, the read counter signals counted by the read counters (RCTR) 45A-1 to 45A-8, as shown in FIGS. 33(a) to 33(c), are divided port by port by the timing signal selectors (SEL) 46A-1 to 46A-24. The thus divided counter signals are output to the read controllers (RCTL) 51-1 to 51-3.

In the read controllers 51-1 to 51-3, the data output from the timing selectors 46A-1 to 46A-24 are synchronized to the timing of the 8-bits counter 55, and the data are time-division multiplexed at 8 times as fast as the write signal. The thus multiplexed fixed-length cell data of the FIFO storage sections 41-1 to 41-3 are subjected to the processing which is the same as that is shown in FIG. 32. In the end, the data are output as serial data.

Thus, according to the previously described fixed-length cell distributing apparatus 4, the number of the FIFO storage sections 41-1 to 41-P and the number of the read counters 45A-1 to 45A-m are reduced compared to the number of ports (24). Therefore, it is possible to considerably reduce the size of the circuit scale without changing the function of distributing the fixed-length cell data.

(c3) Third Modification of Second Embodiment

Figure 34:
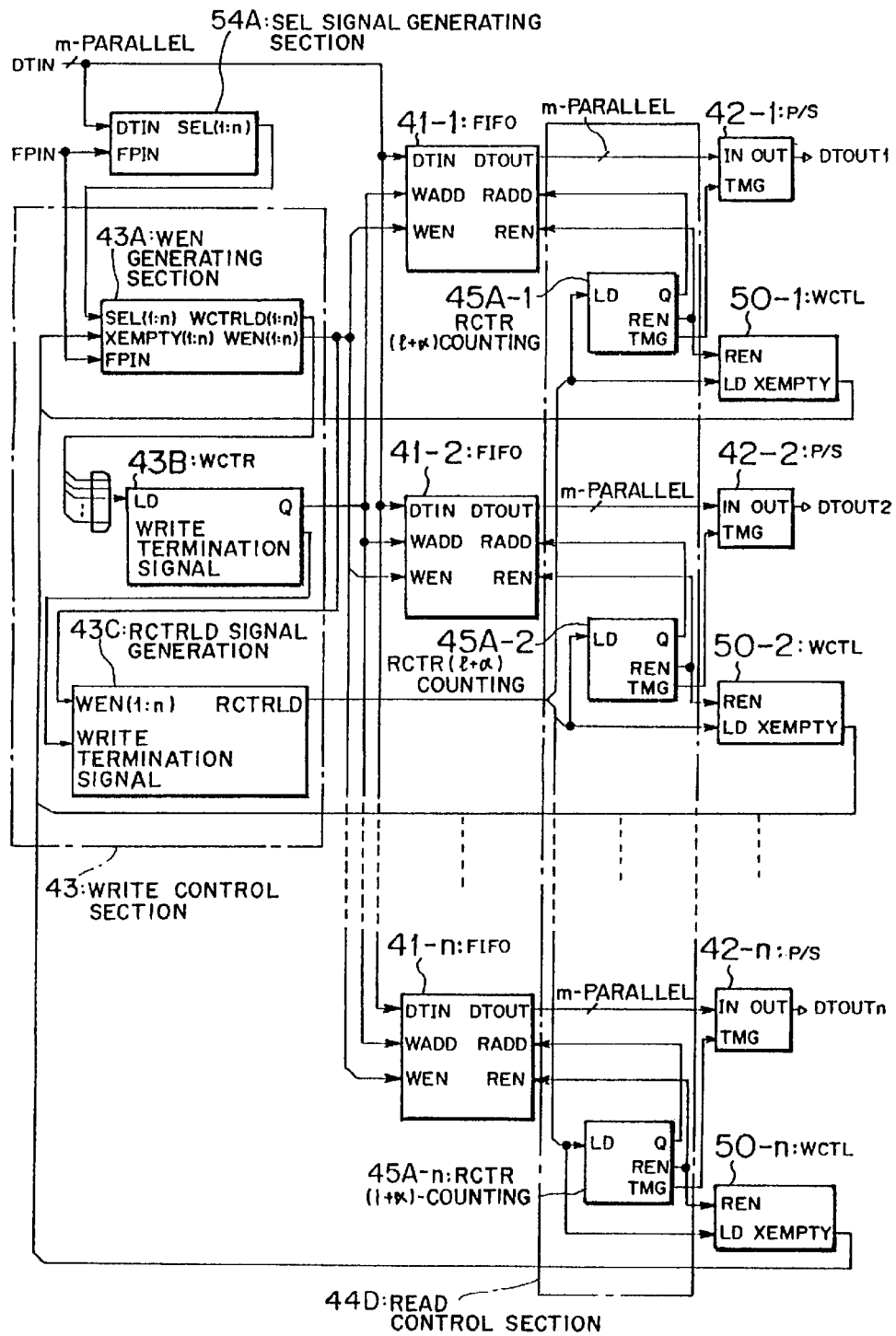
FIG. 34 is a block diagram showing a fixed-length cell distributing apparatus according to a third modification of the second embodiment of the present invention.

FIG. 34 is a block diagram showing a third modification of the previously described fixed-length cell distributing apparatus 4. The fixed-length cell distributing apparatus 4 shown in FIG. 34 comprises FIFO storage sections 41-1 to 41-n for n ports, the P/S converters 42-1 to 42-n, the write control section 43, a read control section 44D, empty condition detecting sections (XEMPTYs) 50-1 to 50-n, and the select signal generating section 54A.

Figure 44:
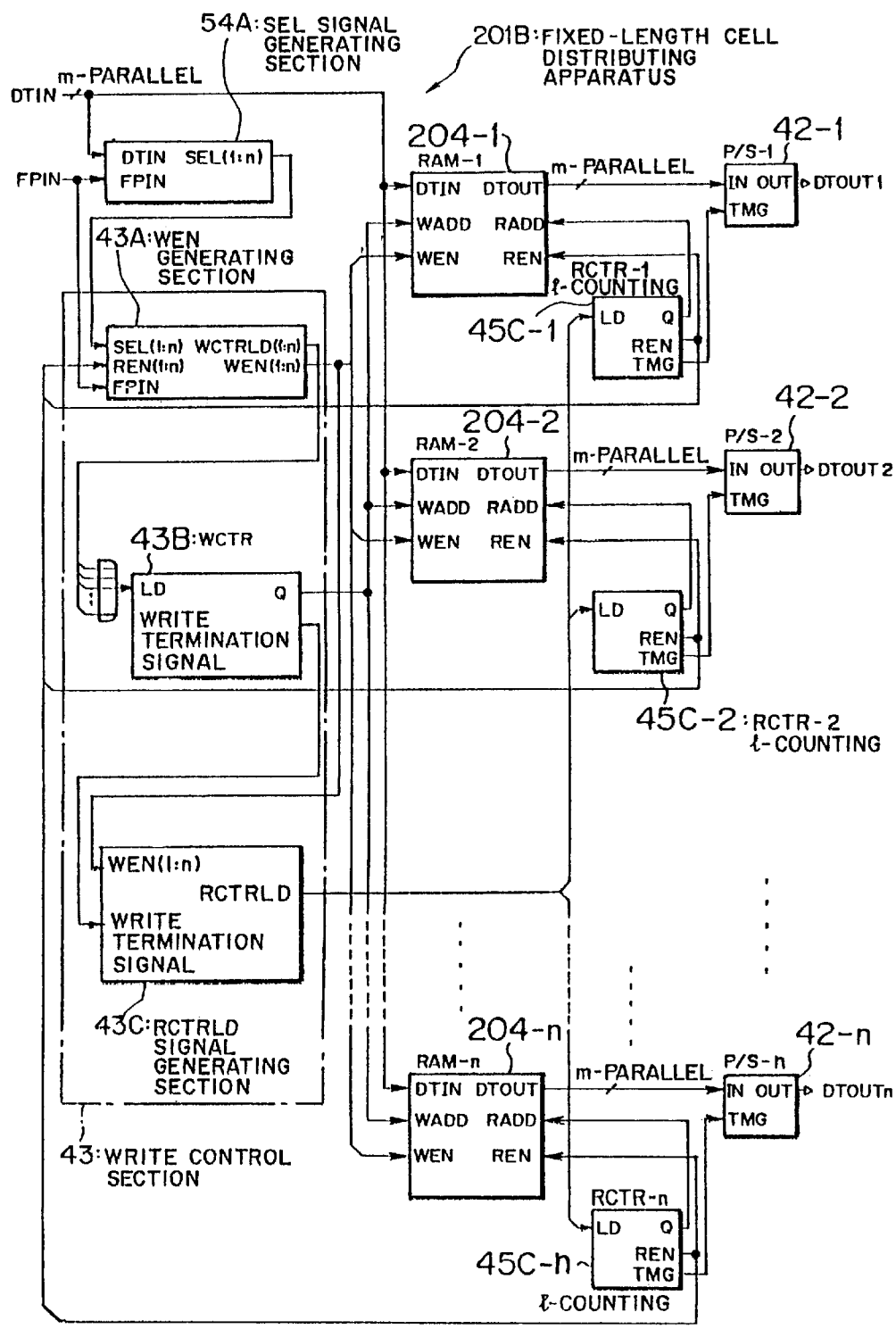
FIG. 44 is a block diagram showing the configuration of a fixed-length cell distributing apparatus.

That is, the fixed-length cell distributing apparatus 4 is arranged so as to distribute the fixed-length cell data using a guard time by addition of the empty condition detecting sections 50-1 to 50-n to the general fixed-length cell distributing apparatus 201B (see FIG. 44).

Therefore, the read control section 44D is provided with (L+α)-counting read counters 45A-1 to 45A-n which read the fixed-length cell data (the cell data which are L-bits long) from the FIFO storage sections 41-1 to 41-n and inhibit the reading of the next fixed-length cell data for a period of predetermined guard time (e.g., α) after the reading of the fixed-length cell data.

The empty condition detecting sections 50-1 to 50-n output a signal which enables the write control section 43 to write the fixed-length cell data to the FIFO storage sections when the FIFO storage sections 41-1 to 41-n become empty during the guard time. As shown in FIGS. 35(a) to 35(f), when the cell data are written into the FIFO storage sections 41-1 to 41-n as previously described with reference to FIGS. 28 and 31, a write termination signal is output, as shown in FIGS. 35(g) to 35(i). For the data having port number 2, when the empty condition detecting sections 50-1 to 50-n receive the write termination signal (i.e., while the data are present in the FIFO storage sections 41-1 to 41-n), the XEMPTY signals of the empty condition detecting sections 50-1 to 50-n become the H-level.

Simultaneously, the read counters 45A-1 to 45A-n are incremented by the write termination signal. When the count value of the read counters reaches a value corresponding to the sum of α (i.e., the guard time; see a vertically striped part) and the read counter signal, as shown in FIG. 35(k), the XEMPTY signal changes from the H-level (i.e., the state in which the FIFO storage sections 41-1 to 41-n store the data) to the L-level (i.e., the state in which the FIFO storage sections 41-1 to 41-n are empty).

When the fixed-length cell data for the port number 2 is input, the signal from the empty condition detecting section 50-2 is switched to the H-level. However, the data are not read during the guard time, and hence the fixed-length cell data of the port number 2 are read when the guard time is finished. As a result, the read enable signal is generated, and the serial data for the port number 2 are output, as shown in FIG. 35(l).

If the FIFO storage sections 41-1 to 41-n are empty (EMPTY) during the guard time, only one cell is written into the FIFO storage sections 41-1 to 41-n. However, the next fixed-length cell data which arrive at the same port are not written into the FIFO storage sections 41-1 to 41-n.

The length of the guard time (α) is set such that the ratio of the guard time (α) to the data to be read becomes an integer. (It is particularly preferred that the ratio between the length of the guard time and the data length be 1:1).

The FIFO storage sections 41-1 to 41-n, the P/S converters 42-1 to 42-n, the write control section 43, and the select signal generating section 54A operate in the same manner as those previously described with reference to FIG. 26. The read counter load signal generating section 43C also operates in the same way as that shown in FIG. 29.

Figure 36A:
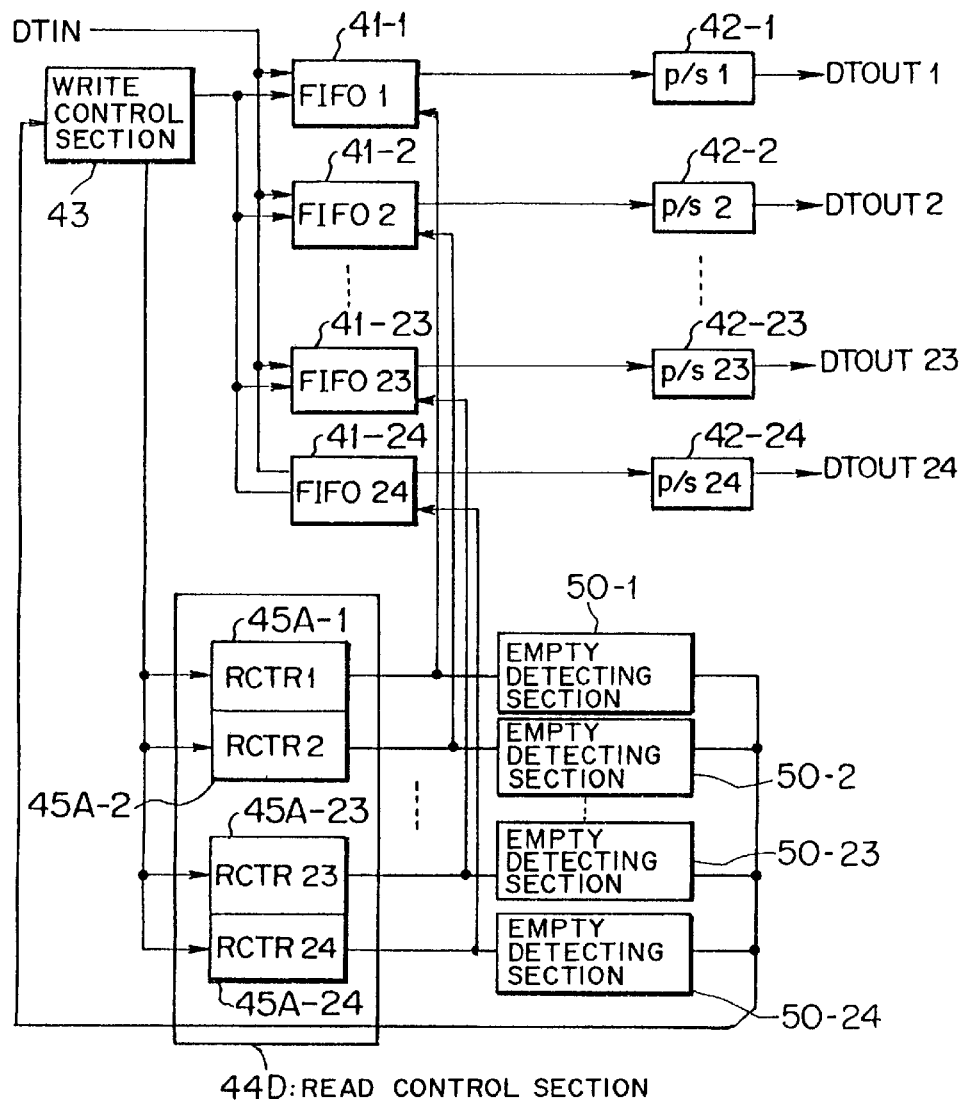
FIGS. 36(a) to 36(c) are diagrams for explaining the operation of the fixed-length cell distributing apparatus according to the third modification of the second embodiment of the present invention.
Figure 36B:
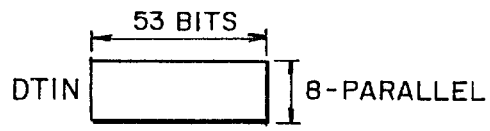
Figure 36C:
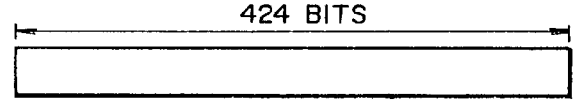

With regard to the write control of the fixed-length cell distributing apparatus 4D shown in FIG. 34, for example, the fixed-length cell data which are input in groups of 8 parallel data strings as shown in FIGS. 36(*a*) to 36(*c*) are input to the FIFO storage sections 41-1 to 41-24 (FIFO 1–24) and the write control section 43 for each port. When the cell data are written into the FIFO storage sections 41-1 to 41-24, the write control section 43 generates a write termination signal, and a read counter load signal is output to the read control section 44D on the basis of the write termination signal.

The read control will be described, focusing on the fixed-length cell data of the port number 2. When the previously described read counter load signal is sent to the read control section 44D, each of the read counters 45A-1 to 45A-24 reaches the value corresponding to the sum of α and the read counter load signal in the order of their designation numbers, as shown in, e.g., FIG. 35(*k*). This information (i.e., a signal indicating that the sum of a and the read counter load signal has been counted up) and the information regarding the presence/absence of the data in the FIFO storage sections 41-1 to 41-24 detected by the empty condition detecting sections 50-1 to 50-24, the data are output.

As described above, the previously described fixed-length cell distributing system is provided with the (L+α)-counting read counters 45A-1 to 45A-n and the empty condition detecting sections 50-1 to 50-n. Hence, it is possible to ensure only an interval of α between the cell data to be read, which makes it possible to easily distinguish the cell data from each other. Further, it is possible to accept the writing of the fixed-length cell data into the FIFO storage sections 41-1 to 41-n during the guard time, which in turn results in improved processing capability of the fixed-length cell distributing system.

(c4) Fourth Modification of Second Embodiment

Figure 37:
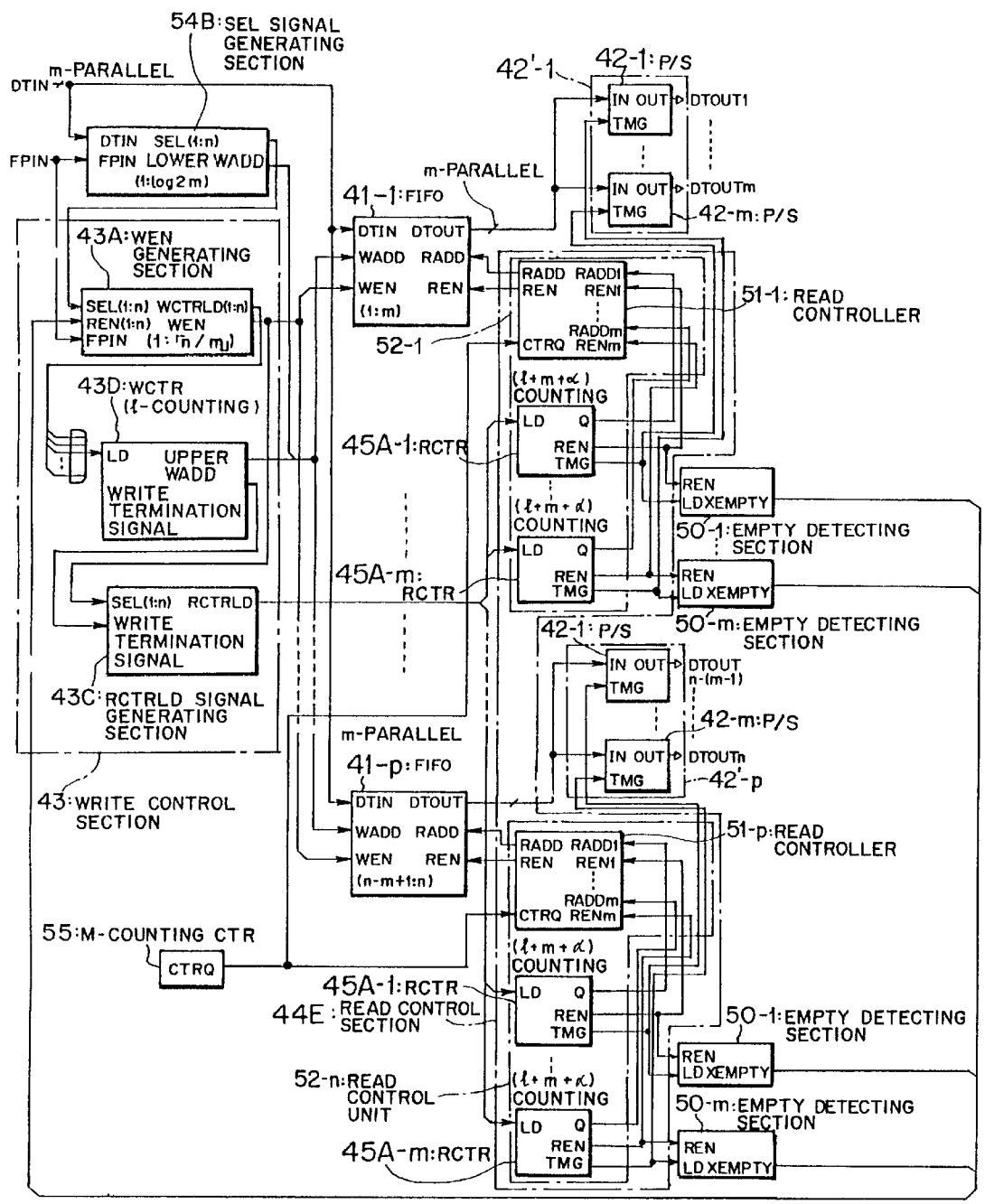
FIG. 37 is a block diagram showing a fixed-length cell distributing apparatus according to a fourth modification of the second embodiment of the present invention.

FIG. 37 is a block diagram showing a fourth modification of the previously described fixed-length cell distributing apparatus 4. The fixed-length cell distributing apparatus shown in FIG. 37 comprises the FIFO storage sections 41-1 to 41-P, P P/S converting sections 42'-1 to 42'-P including P/S converters 42-1 to 42-m, the write control section 43, a read control section 44E, P empty condition detecting sections 50-1 to 50-m, and the select signal generating section 54B.

Specifically, the fixed-length cell distributing apparatus 4 shown in FIG. 37 is arranged so as to carry out a distributing operation by providing the time-division multiplexed fixed-length cell data with a guard time as a result of addition of the empty condition detecting sections 50-1 to 50-m to the read counters 45A-1 to 45A-m of the fixed-length cell distributing apparatus 4 shown in FIG. 32.

The fixed-length cell distributing apparatus 4 carries out the write control in the same manner as previously described with reference to FIG. 29. On the other hand, with regard to the read control, the data output from the read counter 45A (RCTR 1 to 24) is time-division multiplexed at 8 times as fast as the write signal by the read control controllers 51-1 to 51-3 (RCTL 1 to 3, i.e., m=8, n=24, and P=3 in this modification) in synchronism with the timing of the 8-counting counter 55, as shown in, e.g., FIGS. 38(*a*) to 38(*c*).

Subsequently, the data are output from the FIFO storage sections 41-1 to 41-3 (FIFO 1 to 3) to the respective ports on the basis of the time-division multiplexed data. The thus output data have undergone the guard time processing in the same manner as previously described with reference to FIG. 34.

If the FIFO storage sections 41-1 to 41-3 are empty during the guard time, only one fixed-length cell data item is written into the FIFO storage sections 41-1 to 41-3. However, the next fixed-length cell data item which arrives at the same port is not written into the FIFO storage sections 41-1 to 41-3.

In this way, according to the previously described fixed-length cell distributing apparatus, the number of FIFO storage sections 41-1 to 41-P is reduced compared to the number of ports (24). Further, the read counters 45A-1 to 45A-m are added with the empty condition detecting sections 50-1 to 50-m. As a result, the configuration of the circuit related to the FIFO storage sections 41-1 to 41-P can be simplified. Moreover, since the fixed-length cell data to be output to the ports can be provided with the guard time, it becomes possible to easily identify the start end (boundary) of the fixed-length cell data. It is possible to accept the writing of the fixed-length cell data into the FIFO storage sections 41-1 to 41-P during the guard time. Therefore, even in such a case, the processing capability of the fixed-length cell multiplex transmission system can be improved.

What is claimed is:

1. A fixed-length cell multiplex transmission apparatus, comprising:

a plurality of fixed-length cell transmitting apparatuses, each of which sends a fixed-length cell; and a fixed-length cell multiplexing apparatus which multiplexes the fixed-length cells received from said fixed-length cell transmitting apparatuses and outputs the thus multiplexed cells, wherein one of said plurality of fixed-length cell transmitting apparatuses is configured as a highest-priority fixed-length cell transmitting apparatus which sends a fixed-length cell to be sent most preferentially, said highest-priority fixed-length cell transmitting apparatus comprises:

a fixed-length cell storage section for storing the fixed-length cell; and a fixed-length cell read control section which reads the fixed-length cell from said fixed-length cell storage section in synchronism with internal frames each corresponding to a single fixed-length cell, and said fixed-length cell multiplexing apparatus comprises:

a plurality of FIFO storage sections in which the fixed-length cells received from said fixed-length cell transmitting apparatuses other than said highest-priority fixed-length cell transmitting apparatus are written, and from which the fixed-length cells are read, in the order of arrival;

an FIFO control section which controls the writing of the fixed-length cells into, and the reading of the same from, said plurality of FIFO storage sections; and a multiplexing section which directly outputs the fixed-length cell received from said highest-priority fixed-length cell transmitting apparatus without storing it, and outputs the fixed-length cells, which are stored after having been received from said fixed-length cell transmitting apparatuses other than said highest-priority fixed-length cell transmitting apparatus, at a timing other than the timing at which said highest-priority fixed-length cell transmitting apparatus outputs the fixed-length cell.

2. A fixed-length cell multiplex transmission apparatus, comprising:

a plurality of fixed-length cell transmitting apparatuses, each of which sends a fixed-length cell;

a fixed-length cell multiplexing apparatus which multiplexes the fixed-length cells received from said fixed-length cell transmitting apparatuses and outputs the thus multiplexed cells; and a fixed-length cell processing apparatus which receives the multiplexed cells output from said fixed-length cell multiplexing apparatus and subjects the thus received cells to desired processing, wherein said fixed-length cell processing apparatus comprises:

a storage section for fixed-length cell processing which sequentially stores the multiplexed output from said fixed-length cell multiplexing apparatus; and a storage amount information notification section which carries out the notification of information regarding the storage amount of said storage section for fixed-cell processing, one of said plurality of fixed-length cell transmitting apparatuses is configured as a highest-priority fixed-length cell transmitting apparatus which sends a fixed-length cell to be sent most preferentially, said highest-priority fixed-length cell transmitting apparatus comprises:

a fixed-length cell storage section for storing the fixed-length cell;

a fixed-length cell read control section which reads the fixed-length cell from said fixed-length cell storage section in synchronism with internal frames each corresponding to a single fixed-length cell; and a fixed-length cell read-inhibit request signal output section which inhibits the fixed-length cell read control section from reading the fixed-length cell when it is judged, based on the storage amount information received from said storage amount information notification section of said fixed-length cell processing apparatus, that the storage amount of said storage section for fixed-length cell processing is in excess of a predetermined storage amount, said fixed-length cell multiplexing apparatus comprises:

a plurality of FIFO storage sections in which the fixed-length cells received from said fixed-length cell transmitting apparatuses other than said highest-priority fixed-length cell transmitting apparatus are written, and from which the fixed-length cells are read, in the order of arrival; and a multiplexing section which directly outputs the fixed-length cell received from said highest-priority fixed-length cell transmitting apparatus without storing it, and outputs the fixed-length cells, which are stored after having been received from said fixed-length cell transmitting apparatuses other than said highest-priority fixed-length cell transmitting apparatus, at a timing other than the timing at which said highest-priority fixed-length cell transmitting apparatus outputs the fixed-length cell.

3. The fixed-length cell multiplex transmission apparatus according to claim 2, wherein said storage amount information notification section of said fixed-length cell processing apparatus has a structure so as to notify said fixed-length cell multiplexing apparatus of the storage amount, said fixed-length cell multiplexing apparatus is provided with a fixed-length cell read-inhibit request signal output section which outputs a fixed-length cell read-inhibit request signal to said fixed-length cell read-inhibit request signal output section of said highest-priority fixed-length cell transmitting apparatus, when it is judged, based on the storage amount information received from said storage amount information notification section, that the storage amount of said storage section for fixed-length cell processing is in excess of a predetermined storage amount, and said fixed-length cell read-inhibit request signal output section of said highest-priority fixed-length cell transmitting apparatus inhibits the control performed by said fixed-length cell read control section, upon reception of said fixed-length cell read-inhibit request signal.

4. The fixed-length cell multiplex transmission apparatus according to claim 1, wherein said FIFO control section of said fixed-length cell multiplexing apparatus comprises:

a fixed-length cell arrival state storage section which simultaneously stores the arrival state of a fixed-length cell from each of said fixed-length cell transmitting apparatuses other than said highest-priority fixed-length cell transmitting apparatus;

a fixed-length cell arrival state storage control section which operates upon arrival of a fixed-length cell from any one of said fixed-length cell transmitting apparatuses so as to store the arrival state of the fixed-length cell into said fixed-length cell arrival state storage section, and which reads the arrival state from said fixed-length cell arrival state storage section in accordance with a predetermined read request signal; and an output cell determining section which operates, when the arrival state of the fixed-length cell which has been transmitted from said any other fixed-length cell transmitting apparatus is read out from said fixed-length cell arrival state store section, so as to determine one of said FIFO storage sections from which the fixed-length cell is to be read out.

5. The fixed-length cell multiplex transmission apparatus according to claim 2, wherein said FIFO control section of said fixed-length cell multiplexing apparatus comprises:

a fixed-length cell arrival state storage section which simultaneously stores the arrival state of a fixed-length cell from each of said fixed-length cell transmitting apparatuses other than said highest-priority fixed-length cell transmitting apparatus;

a fixed-length cell arrival state storage control section which operates upon arrival of a fixed-length cell from any one of said fixed-length cell transmitting apparatuses so as to store the arrival state of the fixed-length cell into said fixed-length cell arrival state storage section, and which reads the arrival state from said fixed-length cell arrival state storage section in accordance with a predetermined read request signal; and an output cell determining section which operates, when the arrival state of the fixed-length cell which has been transmitted from said any other fixed-length cell transmitting apparatus is read out from said fixed-length cell arrival state store section, so as to determine one of said FIFO storage sections from which the fixed-length cell is to be read out.

6. The fixed-length cell multiplex transmission apparatus according to claim 4, wherein said output cell determining section is configured so as to determine one of said FIFO storage sections from which the fixed-length cell is to be read out, based on an instruction given by an external signal.

7. The fixed-length cell multiplex transmission apparatus according to claim 5, wherein said output cell determining section is configured so as to determine one of said FIFO storage sections from which the fixed-length cell is to be read out, based on an instruction given by an external signal.

8. The fixed-length cell multiplex transmission apparatus according to claim 4, wherein said output cell determining section comprises a simultaneous arrival counter, which increments its count value when it is judged that fixed-length cells have arrived simultaneously from a plurality of fixed-length cell transmitting apparatuses other than said highest-priority fixed-length cell transmitting apparatus, and based on the count value of said simultaneous arrival counter, one of said FIFO storage sections is determined from which the fixed-length cell is to be read out.

9. The fixed-length cell multiplex transmission apparatus according to claim 5, wherein said output cell determining section comprises a simultaneous arrival counter, which increments its count value when it is judged that fixed-length cells have arrived simultaneously from a plurality of fixed-length cell transmitting apparatuses other than said highest-priority fixed-length cell transmitting apparatus, and based on the count value of said simultaneous arrival counter, one of said FIFO storage sections is determined from which the fixed-length cell is to be read out.

10. A fixed-length cell multiplex transmission method for use in a system which includes a plurality of fixed-length cell transmitting apparatuses, each of which sends a fixed-length cell, a fixed-length cell multiplexing apparatus which multiplexes the fixed-length cells received from the fixed-length cell transmitting apparatuses and outputs the thus multiplexed cells, wherein one of said plurality of fixed-length cell transmitting apparatuses is configured as a highest-priority fixed-length cell transmitting apparatus for sending a fixed-length cell to be sent most preferentially, the method comprising the steps of:

sending the fixed-length cell from said highest-priority fixed-length cell transmitting apparatus in synchronism with internal frames each corresponding to a single fixed-length cell;

asynchronously sending the fixed-length cells from said fixed-length cell transmitting apparatuses other than said highest-priority fixed-length cell transmitting apparatus;

storing, in said fixed-length cell multiplexing apparatus in the order of arrival, the fixed-length cells received from said fixed-length cell transmitting apparatuses other than said highest-priority fixed-length cell transmitting apparatus;

outputting directly the fixed-length cell received from said highest-priority fixed-length cell transmitting apparatus without storing it; and outputting the fixed-length cells, which are stored after having been received from said fixed-length cell transmitting apparatuses other than said highest-priority fixed-length cell transmitting apparatus, at a timing other than the timing at which said highest-priority fixed-length cell transmitting apparatus outputs the fixed-length cell.

11. The fixed-length cell multiplex transmission method according to claim 10, wherein the transmission state of the fixed-length cell from said highest-priority fixed-length cell transmitting apparatus is controlled in accordance with the state of a unit to which cells are transmitted from said fixed-length cell multiplexing apparatus.

12. The fixed-length cell multiplex transmission method according to claim 11, wherein when the unit to which cells are transmitted from said fixed-length cell multiplexing apparatus is in a congested state, the M-parallel fixed-length cell data-length cell from said highest-priority fixed-length cell transmitting apparatus is inhibited.

13. A fixed-length transmitting apparatus for sending a fixed-length cell to a fixed-length cell multiplexing apparatus which multiplexes fixed-length cells and outputs the thus multiplexed cells, the fixed-length transmitting apparatus comprising:

a fixed-length cell storage section for storing the fixed-length cell to be sent to said fixed-length cell multiplexing apparatus; and a fixed-length cell read control section which reads the fixed-length cell from said fixed-length cell storage section in synchronism with internal frames each corresponding to a single fixed-length cell when the fixed-length cell is sent to said fixed-length cell multiplexing apparatus.

14. The fixed-length cell transmitting apparatus according to claim 13, further comprising a fixed-length cell read inhibit control section which inhibits the control performed by said fixed-length cell read control section when a unit to which cells are transmitted from said fixed-length cell multiplexing apparatus is in a congested state.

15. A fixed-length cell multiplexing apparatus which multiplexes a fixed-length cells output from a plurality of fixed-length cell transmitting apparatuses, each sending a fixed-length cell, and outputs the thus multiplexed cells, said multiplexing apparatus comprising:

a plurality of FIFO storage sections in which the fixed-length cells received from said fixed-length cell transmitting apparatuses other than a highest-priority fixed-length cell transmitting apparatus are written, and from which the fixed-length cells are read, in the order of arrival, said highest-priority fixed-length cell transmitting apparatus sending a fixed-length cell to be sent most preferentially in synchronism with internal frames each corresponding to a single fixed-length cell;

an FIFO control section which controls the writing of the fixed-length cells into, and the reading of the same from, said plurality of FIFO storage sections; and a multiplexing section which directly outputs the fixed-length cell received from said highest-priority fixed-length cell transmitting apparatus without storing it, and outputs the fixed-length cells, which are stored after having been received from said fixed-length cell transmitting apparatuses other than said highest-priority fixed-length cell transmitting apparatus, at a timing other than the timing at which the highest-priority fixed-length cell transmitting apparatus outputs the fixed-length cell.

16. A fixed-length cell distributing apparatus which distributes M-parallel fixed-length cell data to N ports (N>M), the distributing apparatus comprising:

FIFO storage sections the number of which is N, in which the fixed-length cells are written, and from which the fixed-length cells are read, in the order of input;

parallel/serial converters provided so as to respectively correspond to said FIFO storage sections;

a write control section for detecting information regarding a port, to which the fixed-length cell data are to be output, from the M-parallel fixed-length cell data and for writing the fixed-length cell data to said FIFO storage section corresponding to the detected output port; and a read control section which reads the fixed-length cell data from said FIFO storage section, wherein said read control section further comprises:

M read counters each capable of outputting a timing signal for reading the fixed-length cell data from said FIFO storage section;

a selector disposed on the output side of the M read counters for feeding an output from said M read counters to any of said FIFO storage sections as a cell read signal;

an M-counting counter which carries out a counting operation in response to the completion of writing of the fixed-length cell data to said FIFO storage section;

a read counter control section for incrementing the read counters which have ordinal number information corresponding to the count values of said M-counting counter; and a selector control section which controls said selector on the basis of information received from said read counter control section.

17. The fixed-length cell distributing apparatus according to claim 16, wherein when the length of said M-parallel fixed-length cell data is L, said read counter is configured so as to serve as an L-counting read counter.

18. The fixed-length cell distributing apparatus according to claim 16, wherein when the length of said M-parallel fixed-length cell data is L, said read counter is configured so as to serve as an $(L+\alpha)$-counting read counter.

19. A fixed-length cell distributing apparatus which distributes the M-parallel fixed-length cell data to N ports (N>M), said distributing apparatus comprising:

FIFO storage sections the number of which is N, in which the fixed-length cells are written, and from which the fixed-length cells are read, in the order of input;

parallel/serial converters provided so as to respectively correspond to said FIFO storage sections;

a write control section for detecting information regarding a port, to which the fixed-length cell data are to be output, from the M-parallel fixed-length cell data and for writing the fixed-length cell data to said FIFO storage section corresponding to the detected output port; and a read control section which reads the fixed-length cell data from said FIFO storage section, wherein said read control section further comprises:

M read signal supply sections which outputs a signal for reading the fixed-length cell data from said FIFO storage section; and a read signal selecting section which selects a read signal fed from said read signal supply section and feeds the thus selected read signal to a desired FIFO storage section.

20. A fixed-length cell distributing apparatus which distributes the M-parallel fixed-length cell data to N ports (N>M), said distributing apparatus comprising:

FIFO storage sections the number of which is P and in which the fixed-length cells corresponding to the number of M ports are written, and from which the fixed-length cells are read, in the order of input (P is the minimum integer greater than N/M);

parallel/serial converters whose total number is P×M and in which M parallel/serial converters are provided for each of said FIFO storage sections:

a write control section for detecting information regarding a port, to which the fixed-length cell data are to be output, from the M-parallel fixed-length cell data and for writing the fixed-length cell data to said FIFO storage section corresponding to the detected output port; and a read control section which reads the fixed-length cell data from said FIFO storage section, wherein said read control section comprises P read control units, each comprising:

M read counters each capable of outputting a timing signal for reading the fixed-length cell data from said FIFO storage section; and a read controller which receives timing signals from said read counters and which time division-multiplexes the signals for reading the fixed-length cell data at M times the speed of signals for writing the fixed-length cell data so as to output the thus time division multiplexed signals to said corresponding FIFO storage section.

21. The fixed-length cell distributing apparatus according to claim 20, wherein when the length of said M-parallel fixed-length cell data is L, said read counter is configured so as to serve as an (L+M)-counting read counter.

22. The fixed-length cell distributing apparatus according to claim 20, wherein when the length of said M-parallel fixed-length cell data is L, said read counter is configured so as to serve as an $(L+\alpha)$-counting read counter.

23. The fixed-length cell distributing apparatus according to claim 22, further comprising an empty detecting section which outputs a signal for allowing the writing of a cell by said write control section when said FIFO storage sections become empty while the count value of said read counter is in the range of $(L+1)$ to $(L+\alpha)$.

24. A fixed-length cell distributing apparatus which distributes the M-parallel fixed-length cell data to N ports (N>M), the distributing apparatus comprising:

FIFO storage sections the number of which is P, in which the fixed-length cells corresponding to the number of M ports are written, and from which the fixed-length cells are read, in the order of input (P is the minimum integer greater than N/M);

parallel/serial converters whose total number is P×M and in which M parallel/serial converters are provided for each of said FIFO storage sections;

a write control section for detecting information regarding a port, to which the fixed-length cell data are to be output, from the M-parallel fixed-length cell data and for writing the fixed-length cell data to said FIFO storage section corresponding to the detected output port; and a read control section which reads the fixed-length cell data from said FIFO storage section, wherein said read control section comprises a read control unit comprising:

M read counters each capable of outputting a timing signal for reading the fixed-length cell data from said FIFO storage section;

N timing signal selectors which selectively output timing signals fed from said read counters; and P read controllers which receive the timing signals selected by each of said timing signal selector and which time division-multiplexes the signals for reading the fixed-length cell data at M times the speed of signals for writing the fixed-length cell data so as to output the thus time division multiplexed signal to said corresponding FIFO storage section.

25. The fixed-length cell distributing apparatus according to claim 24, wherein when the length of said M-parallel fixed-length cell data is L, said read counter is configured so as to serve as an $(L+\alpha)$-counting read counter.

26. A fixed-length cell distributing apparatus which distributes the M-parallel fixed-length cell data to N ports (N>M), the distributing apparatus comprising:

FIFO storage sections number of which is N, in which the fixed-length cells are written, and from which the fixed-length cells are read, in the order of input;

parallel/serial converters provided so as to respectively correspond to said FIFO storage sections;

a write control section for detecting information regarding a port, to which the fixed-length cell data are to be output, from the M-parallel fixed-length cell data and for writing the fixed-length cell data to said FIFO storage section corresponding to the detected output port; and a read control section which reads the fixed-length cell data from said FIFO storage section and inhibits the reading of the subsequent fixed-length cell data for a predetermined period of guard time after the reading of the current fixed-length cell data.

27. The fixed-length cell distributing apparatus according to claim 26, wherein when the length of said M-parallel fixed-length cell data is L, said read counter is configured so as to serve as an (L+α)-counting read counter.

28. The fixed-length cell distributing apparatus according to claim 26, further comprising an empty detecting section which outputs a signal for allowing the writing of a cell by said write control section when said FIFO storage sections become empty during the guard time.

* * * * *